(12) United States Patent
O'Keeffe

(10) Patent No.: US 10,564,266 B2
(45) Date of Patent: Feb. 18, 2020

(54) DISTRIBUTED LIDAR WITH FIBER OPTICS AND A FIELD OF VIEW COMBINER

(71) Applicant: James Thomas O'Keeffe, Newark, CA (US)

(72) Inventor: James Thomas O'Keeffe, Newark, CA (US)

(*) Notice: Subject to any disclaimer, the term of this patent is extended or adjusted under 35 U.S.C. 154(b) by 0 days.

(21) Appl. No.: 15/851,686

(22) Filed: Dec. 21, 2017

(65) Prior Publication Data

US 2019/0025412 A1 Jan. 24, 2019

Related U.S. Application Data

(63) Continuation of application No. PCT/US2017/053343, filed on Sep. 25, 2017.

(Continued)

(51) Int. Cl.
*G01S 7/481* (2006.01)
*G01S 17/93* (2006.01)
(Continued)

(52) U.S. Cl.
CPC .......... *G01S 7/4818* (2013.01); *G01S 7/4817* (2013.01); *G01S 7/4863* (2013.01); *G01S 7/497* (2013.01); *G01S 17/936* (2013.01)

(58) Field of Classification Search
CPC .......... G01S 17/10; G01S 17/42; G01S 17/89; G01S 17/936; G01S 7/4863;
(Continued)

(56) References Cited

U.S. PATENT DOCUMENTS

| 3,927,402 A | 12/1975 | Thompson |
| 4,464,115 A | 8/1984 | Simpson et al. |

(Continued)

FOREIGN PATENT DOCUMENTS

WO WO2016/011557 A1 1/2016

OTHER PUBLICATIONS

Vojnovik, "Notes on optical fibres and fibre bundles," 2012, 15 pages. (Year: 2012).*

(Continued)

*Primary Examiner* — Daniel L Murphy

(57) ABSTRACT

Large time-of-flight photodetector arrays can be expensive and one solution is to multiplex the detector array between several distinct fields of view, thereby increasing its utilization. In one embodiment, a vehicle-based distributed LIDAR is disclosed, comprising a plurality of coherent fiber optic image bundles (CFOBs) that transfer laser reflections from several fields of view (FOVs) around the vehicle to a shared remotely located detector array. An optical combiner functions to multiplex (e.g. timeshares) the FOVs from each coherent fiber bundle onto the remote detector array. Individual fibers in the CFOBs gather laser reflections from distinct portions of a FOV, thereby enabling correlation of the original reflection directions with fiber locations within a bundle. Unlike single fiber cables or incoherent multicore fiber cables, where the direction of incoming light is lost, the CFOBs transfer both the timing and direction of laser reflections from multiple FOVs to a shared detector array.

28 Claims, 33 Drawing Sheets

Related U.S. Application Data

(60) Provisional application No. 62/399,466, filed on Sep. 25, 2016, provisional application No. 62/441,627, filed on Jan. 3, 2017.

(51) Int. Cl.
  *G01S 7/497* (2006.01)
  *G01S 7/4863* (2020.01)

(58) Field of Classification Search
  CPC .... G01S 7/4816; G01S 7/4817; G01S 7/4818; G01S 7/497; G01S 7/4815
  USPC ...................................................... 356/4.01
  See application file for complete search history.

(56) References Cited

U.S. PATENT DOCUMENTS

| | | | |
|---|---|---|---|
| 4,627,734 A * | 12/1986 | Rioux | G01B 11/24 356/3.04 |
| 4,688,937 A | 8/1987 | Konig et al. | |
| 4,943,157 A * | 7/1990 | Reding | G01S 7/4818 250/227.29 |
| 5,231,401 A | 7/1993 | Kaman et al. | |
| 5,638,164 A | 6/1997 | Landau | |
| 5,914,826 A | 6/1999 | Smallwood | |
| 6,055,490 A | 4/2000 | Dunne | |
| 6,091,037 A | 7/2000 | Bachschmid | |
| 7,064,817 B1 | 6/2006 | Schmitt et al. | |
| 7,089,114 B1 | 8/2006 | Huang | |
| 7,299,892 B2 | 11/2007 | Radu et al. | |
| 7,446,733 B1 | 11/2008 | Hirimai | |
| 7,608,948 B2 | 10/2009 | Nearhoof et al. | |
| 8,666,104 B2 | 3/2014 | Ivey et al. | |
| 8,675,887 B2 | 3/2014 | Yuan et al. | |
| 8,752,969 B1 | 6/2014 | Kane et al. | |
| 8,786,835 B1 | 7/2014 | Reardon et al. | |
| 8,878,901 B2 | 11/2014 | Meinherz | |
| 8,948,591 B2 | 2/2015 | Scherbarth | |
| 9,002,511 B1 | 4/2015 | Hickerson et al. | |
| 9,069,059 B2 | 6/2015 | Vogt | |
| 9,097,800 B1 | 8/2015 | Zhu | |
| 9,121,703 B1 | 9/2015 | Droz | |
| 9,128,190 B1 | 9/2015 | Ulrich | |
| 9,199,643 B1 | 12/2015 | Zeng | |
| 9,279,796 B1 | 3/2016 | Weisberg | |
| 9,285,477 B1 | 3/2016 | Smith | |
| 9,383,753 B1 | 7/2016 | Templeton | |
| 9,625,582 B2 | 4/2017 | Gruver et al. | |
| 9,804,264 B2 | 10/2017 | Villeneuve | |
| 10,151,836 B2 | 12/2018 | O'Keeffe | |
| 10,185,027 B2 | 1/2019 | O'Keeffe | |
| 10,302,746 B2 | 5/2019 | O'Keeffe | |
| 10,408,940 B2 | 9/2019 | O'Keeffe | |
| 2005/0057741 A1 | 3/2005 | Anderson et al. | |
| 2005/0237218 A1 | 10/2005 | Tang et al. | |
| 2006/0104585 A1 | 5/2006 | Cho | |
| 2006/0161270 A1 | 7/2006 | Luskin et al. | |
| 2007/0024841 A1 | 2/2007 | Kloza | |
| 2007/0289860 A1 | 12/2007 | Newman et al. | |
| 2008/0068584 A1 | 3/2008 | Mori et al. | |
| 2009/0147239 A1 * | 6/2009 | Zhu | G01S 7/285 356/3.12 |
| 2009/0219962 A1 | 9/2009 | Meyers et al. | |
| 2009/0262760 A1 | 10/2009 | Krupkin et al. | |
| 2009/0273770 A1 | 11/2009 | Bauhahn et al. | |
| 2010/0026982 A1 | 2/2010 | Kludas et al. | |
| 2011/0181201 A1 | 7/2011 | Hollis | |
| 2013/0127854 A1 | 5/2013 | Shpunt et al. | |
| 2013/0222791 A1 | 8/2013 | Steffey et al. | |
| 2014/0240721 A1 | 8/2014 | Herschbach | |
| 2014/0270237 A1 | 9/2014 | Wang et al. | |
| 2014/0270264 A1 | 9/2014 | Wang et al. | |
| 2014/0350836 A1 | 11/2014 | Stettner et al. | |
| 2015/0185246 A1 | 7/2015 | Dakin et al. | |
| 2015/0192677 A1 | 7/2015 | Yu | |
| 2015/0247703 A1 | 9/2015 | Teetzel et al. | |
| 2015/0286340 A1 | 10/2015 | Send et al. | |
| 2015/0307020 A1 | 10/2015 | Salter et al. | |
| 2015/0378011 A1 | 12/2015 | Owechko | |
| 2016/0047896 A1 | 2/2016 | Dussan | |
| 2016/0245919 A1 | 8/2016 | Kalscheur et al. | |
| 2016/0282468 A1 | 9/2016 | Gruver et al. | |
| 2017/0024877 A1 | 1/2017 | Versace et al. | |
| 2017/0169703 A1 | 6/2017 | Carrasco et al. | |
| 2017/0176990 A1 | 6/2017 | Keller et al. | |
| 2018/0059248 A1 | 3/2018 | O'Keeffe | |
| 2018/0074175 A1 | 3/2018 | O'Keeffe | |
| 2018/0106890 A1 | 4/2018 | O'Keeffe | |
| 2018/0156896 A1 | 6/2018 | O'Keeffe | |
| 2019/0107711 A1 | 4/2019 | Blanche et al. | |
| 2019/0120939 A1 | 4/2019 | O'Keeffe | |
| 2019/0196579 A1 | 6/2019 | Shpunt et al. | |

OTHER PUBLICATIONS

O'Keeffe; U.S. Appl. No. 15/857,960 entitled "Planning a lidar scan with smart test vectors," filed Dec. 29, 2017.
O'Keeffe; U.S. Appl. No. 15/856,554 entitled "A vehicle-integrated system," filed Dec. 28, 2017.
Beger et al.; Data fusion of extremely high resolution aerial imagery and LiDAR data for automated railroad centre line reconstruction; ISPRS Journal of Photogrammetry and Remote Sensing; 66(6); pp. S40-51; Dec. 1, 2011.
Teo et al.; Pole-Like Road Object Detection From Mobile Lidar System Using a Coarse-to-Fine Approach; IEEE Journal of Selected Topics in Applied Earth Observations and Remote Sensing; 8(10); pp. 4805-4818; Oct. 2015.

* cited by examiner

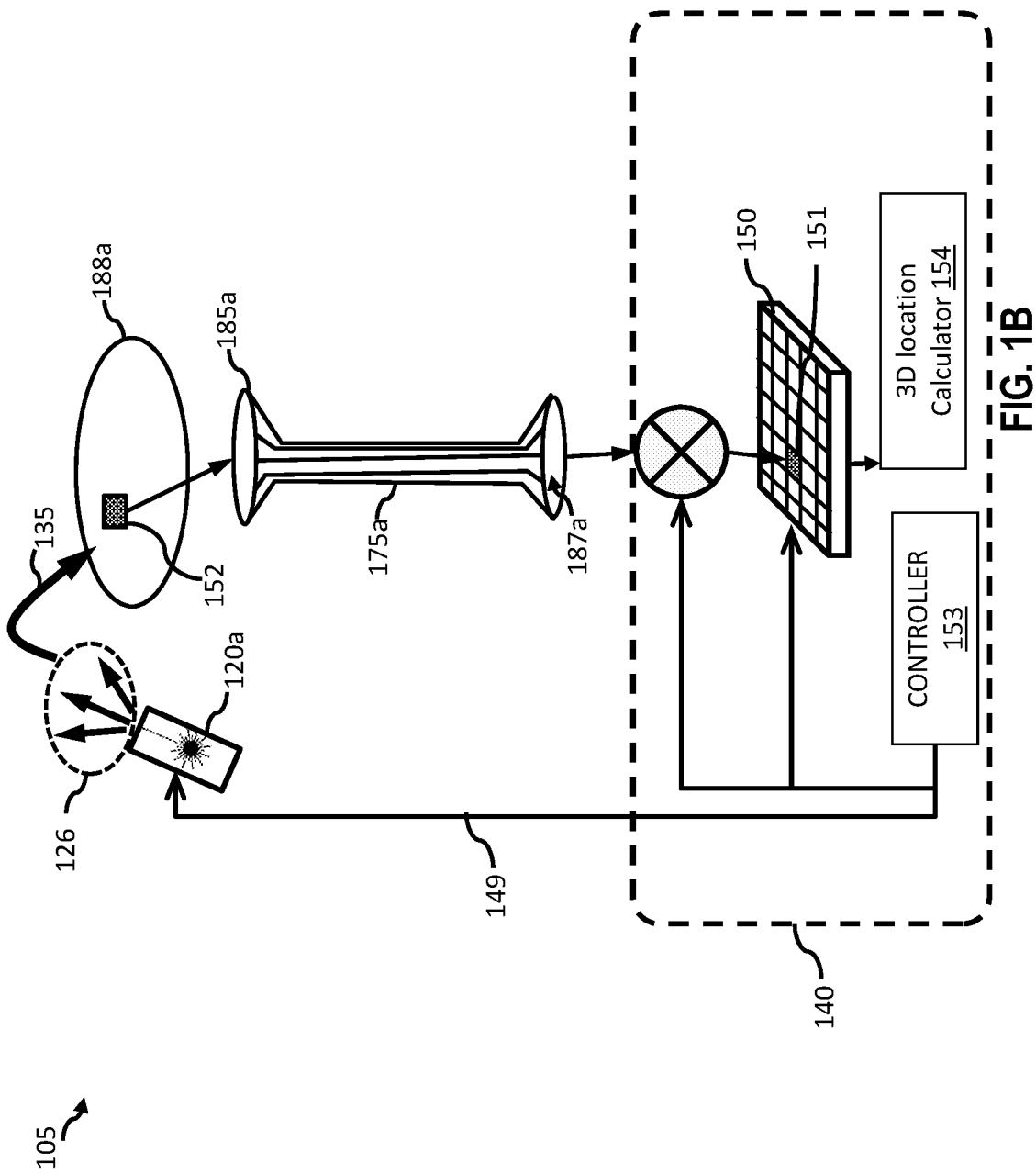

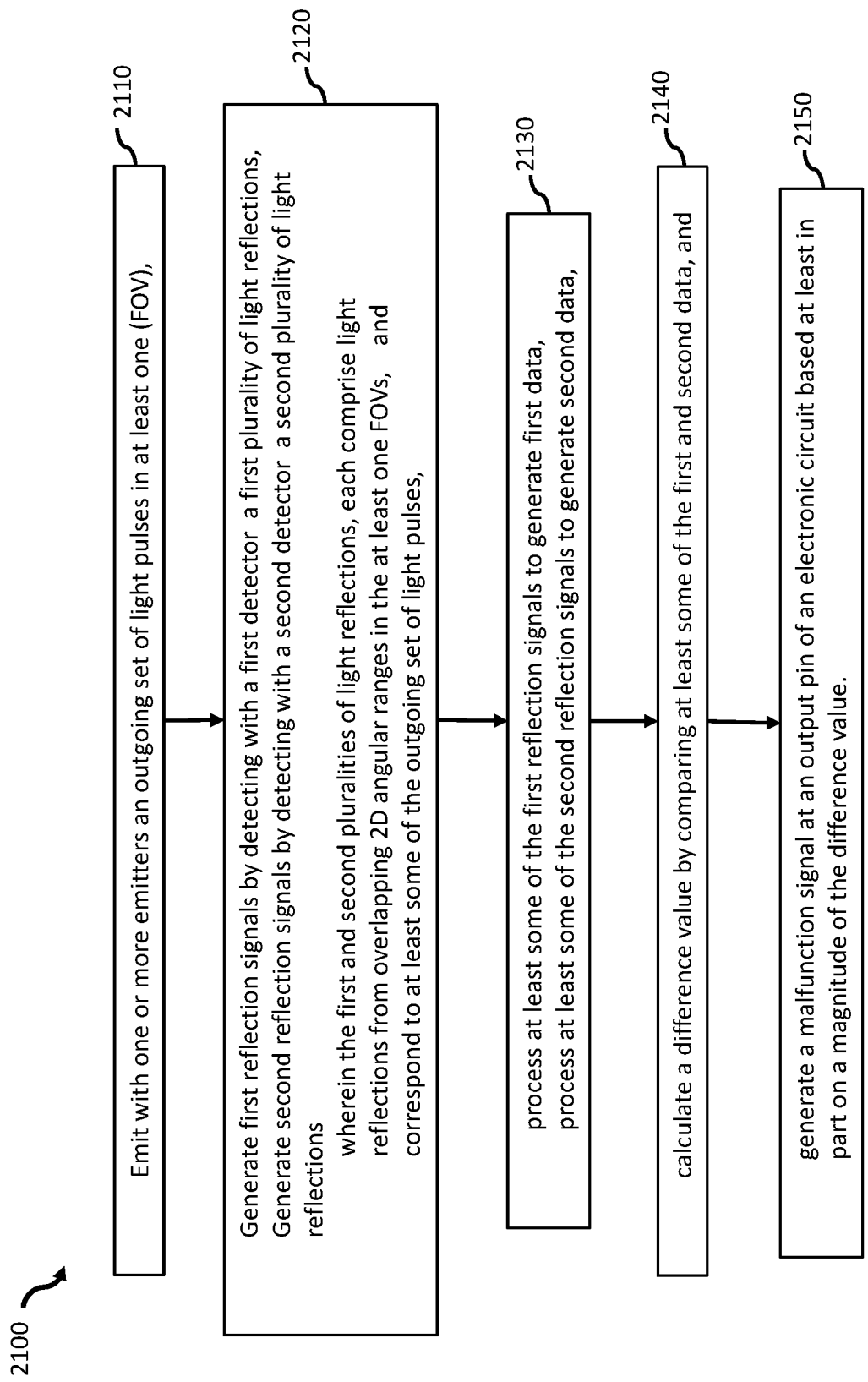

DISTRIBUTED LIDAR WITH FIBER OPTICS AND A FIELD OF VIEW COMBINER

CROSS-REFERENCE TO RELATED APPLICATIONS

This application is a continuation of International Application No. PCT/US 17/53343, filed Sep. 25, 2017, which claims the benefit of priority to each of: U.S. provisional patent application Ser. No. 62/399,466, filed on Sep. 25, 2016; and U.S. provisional patent application Ser. No. 62/441,627, filed on Jan. 3, 2017.

BACKGROUND

Light detection and ranging (LIDAR) is increasingly useful for providing range measurements in the vicinity of autonomous vehicles, robots and smart buildings. Traditionally, LIDAR systems have been placed on the exterior of host platforms (e.g., vehicles) with direct access to a FOV. While this is useful during research and development, external LIDAR placement with a single FOV poses challenges including aesthetics, long-term reliability and cost.

Flash LIDAR or time-of-flight (TOF) cameras are a class of scannerless LIDAR in which a laser or LED source illuminates a plurality of directions at once and a photodetector array such as a focal plane array (FPA) of avalanche photodiodes detects the timing of reflections from the plurality of directions. An ongoing challenge is that the photodetector array (e.g., single photon avalanche detector) can be the most expensive part of a flash LIDAR. Providing the LIDAR with an unobstructed view of the vicinity typically requires mounting the LIDAR on the exterior of the host platform, where it is subject to weather and damage. In a related aspect, external placement often only provides an unobstructed view of a portion of the surroundings. U.S. Patent Application Publication No. 2015/0192677 to Yu addresses this challenge by disclosing multiple LIDAR sensor around a vehicle to provide adequate coverage, but does not address the associated cost and weight penalty.

U.S. Pat. No. 9,069,059 to Vogt et al. discloses a LIDAR jammer that detects a laser emitter in the local environment by gathering light with an input lens into an input fiber optic cable coupled to a photodiode. While useful for laser detection somewhere in the surroundings, it does not address the challenge of constructing a detailed 3-D depth image. Therefore, the challenge of performing LIDAR measurements in a wide range of directions, while minimizing the number of LIDARs and protecting expensive LIDAR components remains.

SUMMARY

Within examples, systems and methods are provided to implement a distributed LIDAR that transfers light reflections from one or more fields of view (FOVs) around a vehicle to a remotely locate range calculating assembly, using one or more coherent fiber optic image bundles (CFOB). In one aspect, the coherent arrangement of fibers in each CFOB preserves the direction information associated with light reflections from an associated FOV at one end of the CFOB, thereby enabling the ranging subassembly to be remotely located from several FOVs, while providing range measurements for a plurality of directions in those FOVs.

An embodiment of the invention is a distributed optical LIDAR that gathers data from several FOVs around a host vehicle using a network of CFOBs and generates a digital, time-varying 3D point cloud that represents the 3D coordinates of the real world surfaces that are within the FOVs. The distributed LIDAR can comprise a light emitter and a lens with direct access to a FOV. The distributed LIDAR can further comprise a ranging subassembly with a photodetector array (e.g., a single photon detector array), that is remotely located from the FOV and coupled to the FOV by a coherent fiber optic image bundle (CFOB). The lens is operable to focus light reflections from the FOV onto an input surface of the CFOB. The CFOB comprises thousands of elongated fiber optic elements, arranged in a common sequence at both the input and an output surface. In one aspect, each fiber optic element is operable to gather light from a specific part of the FOV, thereby enabling recovery of the direction information within the FOV at the remote ranging subassembly.

In another embodiment, a vehicle based distributed LIDAR system is disclosed, operable to provide centralized range sensing using reflection from multiple fields of view around a vehicle (e.g., passenger vehicle or truck). The distributed LIDAR comprises laser emitters to illuminate a plurality of FOVs around the vehicle and a plurality of CFOBs to transfer laser reflections from objects in the FOVs to a remotely-located ranging subassembly. Unlike multiple discrete LIDARs, the ranging subassembly in a distributed LIDAR can receive laser reflections from several FOVs and is thereby shared by the several FOVs. Exemplary methods to share the remote located ranging subassembly among several FOVs include time multiplexing FOVs at the ranging subassembly or spatially combining several FOVs from around the vehicle at the remote ranging subassembly. In one aspect, the CFOBs function to transfer direction information regarding reflections from parts of each FOV, thereby enabling remote placement of the ranging subassembly (e.g., in a centralized location). In another aspect, the distributed LIDAR system can comprise an optical multiplexor to time multiplex light reflections from each CFOB onto a single, remotely-located, shared photodetector array in the ranging subassembly. The distributed LIDAR system with remote ranging subassembly can reduce the number of LIDARs required by multiplexing light reflections from several FOVs that are faithfully transferred to a shared remote photodetector array using CFOBs.

In various embodiments the LIDAR system can be a flash LIDAR system, wherein some or all of each FOV is illuminated at once. In other embodiments the LIDAR system can be a scanned LIDAR in which an emitter produces pulses of light in a sequence of specific directions within each FOV. In one aspect, of several embodiments a distributed LIDAR system contains a FOV combiner component operable to provide light reflections from multiple FOVs to a shared remote detector array. Exemplary FOV combiners include spatial FOV combiners (e.g., to spatially multiplex light reflections from several FOVs onto a remote detector array at once) and FOV multiplexors (e.g., a mechanical optical multiplexor, a solid state switchable mirror array or micromirror array) to time share multiple FOVs onto a common remote detector array.

In one embodiment a light detection and ranging system comprises, an emitter to generate an outgoing set of light pulses, a coherent fiber optic image bundle (CFOB) comprising, a plurality of elongated optical fibers with a common spatial sequence at an input surface and an output surface, wherein the CFOB is positioned to transmit a set of light reflections corresponding to the outgoing set of light pulses, from the input surface to the output surface, and a ranging subassembly comprising a detector, operably coupled to the output surface, to detect the set of light reflections, and electronic circuitry to compute for the set of light reflections a corresponding set of 3D locations indicative of reflection locations corresponding to the set of light reflections.

In a related second group of embodiments a LIDAR can comprise a remotely located ranging subassembly with two similar or identical photodetector arrays. A challenge associated with shared remote sensing (e.g., in vehicles) is malfunction detection and failsafe operation in the event of a malfunction. Embodiments provide for two photodetectors in a shared remote ranging subassembly to address the challenges of malfunction detection and failsafe operation of a remote light-based ranging subassembly. The two photodetector arrays can each receive light reflections from overlapping angular ranges in one or more FOVs (e.g., transferred using CFOBs) and thereby function to provide redundancy and confirmation of detected light reflections. The two photodetectors can receive pluralities of light reflections from a common or overlapping angular ranges in a common FOV and thereby enable system-error detection and failsafe operation while only requiring 2 detectors and not 2×N where N is the number of FOVs around the vehicle. A malfunction indicator in the ranging subassembly can calculate a difference value indicating a measure of difference between first reflection signals generated by a first detector and second reflection signals generated by a second detector and generate a malfunction signal at an output of the LIDAR when the difference value is greater than a threshold value.

In one embodiment a light detection and ranging system with malfunction indication capability comprises one or more emitters configured to produce an outgoing set of light pulses in a field of view, a first detector configured to detect a first plurality of light reflections corresponding to at least some of the outgoing set of light pulses and thereby generate first reflection signals, a second detector configured to detect a second plurality of light reflections and thereby generate second reflection signals, and electronic circuitry, configured to process at least some of the first and second reflection signals and generate a difference value indicating a measure of difference between the at least some of the first and second reflection signals, and configured to generate a malfunction signal when the difference value is greater than a threshold value.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

Advantages

Embodiments of the present disclosure are operable to provide the following exemplary advantages: In one advantage the disclosed LIDAR system with one or more CFOBs enables the majority of the LIDAR electronics to be remotely located (e.g., in the engine bay of a vehicle) while receiving and preserving the direction and timing data of light reflections. Embodiments of the distributed LIDAR with CFOBs can reduce the number and footprint of LIDAR components placed on the vehicle exterior. For example, lenses and CFOBs can be more easily integrated into the headlight assembly of an autonomous vehicle, than the LIDAR detector and signal processing electronics. Traditionally, LIDAR systems have been mounted on the exterior of host platforms (e.g., vehicles) where the ranging subassembly (e.g., comprising the photodetector and scanning mirror or photodetector array) receives light reflection directly from a single FOV. External placement can be useful during research and development. However in consumer applications, exterior mounting LIDARs, each with a single FOV poses challenges including aesthetics, long-term reliability and cost to cover multiple FOVs.

In another advantage CFOBs enable remote placement of the ranging subassembly, thereby providing protection for expensive components in a minor collision as well as protection from weather. EMI and vibration. Remote placement of the ranging subassembly can improve ranging accuracy, reliability while reducing environment-related damage and wear. LIDARs work by accurately sensing the time-of-flight of reflected light pulses. In many designs the range detection performance is sensitive to temperature variations and electromagnetic interference (EMI). The CFOBs enable the ranging subassembly to be located in a temperature and EMI controlled environment, away from direct exposure to the local environment (e.g., the exterior of a vehicle) with associated sun exposure and temperature ranges.

In another advantage, the CFOBs enable reflections from multiple FOVs to be detected with a shared photodetector array in a shared ranging subassembly, thereby reducing system cost, complexity, weight and number of LIDARs required to serve multiple FOVs.

In another advantage, the length of high-speed (e.g., CAT5e or Ethernet) cables from the LIDAR to other systems can be reduced (e.g., the LIDAR electronics can be placed close to the automotive ECU or a central computer vision controller). A car is an EMI filled environment, particular EMI sources include sparkplugs, and DC motors. Embodiments of a remote LIDAR with fiber image bundles enable data laser reflections to be optically aggregated in a network of CFOBS in a more EMI shielded location, thereby improving signal integrity. Fiber optic signals are inherently more resistant to electromagnetic interference.

In another advantage transferring laser reflections using a network of CFOBs to a shared photodetector array, may provide improved design flexibility, such as adapting the shape of FOVs, and spatially combining FOVs or time multiplex FOVs at the detector. For example, several locations around a vehicle may only require a small FOV (e.g., a 10×10 degree FOV to protect wheel from scraping curbs or doors from opening onto curbs). While these small regions may not justify a dedicated LIDAR, embodiments of the present disclosure can provide range detection using a plurality of small CFOBs in appropriate locations and spatially combining the small CFOBs at a shared detector array. Laser reflections from spatially combined FOVs can be time multiplexed with larger FOVs (e.g., a forward facing FOV). The size of the fiber optic image bundles can be adapted to provide for the specific needs of a location. In comparison, multiple discrete LIDARs may only offer the capabilities of each model number (e.g., a specific number of pixels for each model number).

In yet another advantage CFOBs can have a variety of sizes (e.g., diameters and numbers of fibers) thereby providing tailoring angular ranges for several FOVs around a vehicle. CFOBs can be combined to provide simultaneous transmission and combination of laser reflections to a single shared photodetector array in a remotely located ranging subassembly. Alternatively, separate image bundles can simultaneously transmit laser reflections onto a single detector array, providing spatial multiplexing of the image array. In several locations it may be advantageous to gather a few reflections from strategically important directions: e.g., backup detection, wheel-arch reflection detection.

DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 1B illustrates a distributed LIDAR system including a remotely located ranging subassembly and a fiber optic image bundle according to an embodiment of the present disclosure.

Figure 3A:
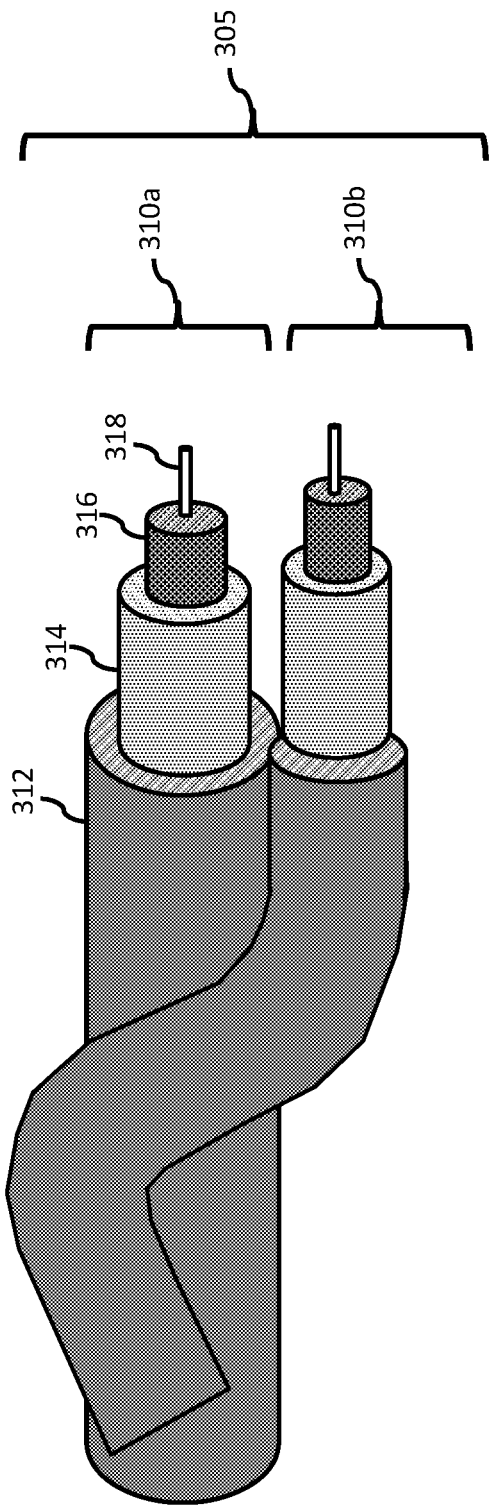

FIG. 3A illustrates fiber optic cable 305 comprising two optical fibers 310a and 310b for the purpose of comparison and contrasting with coherent optical fiber image bundles.

Figure 3B:
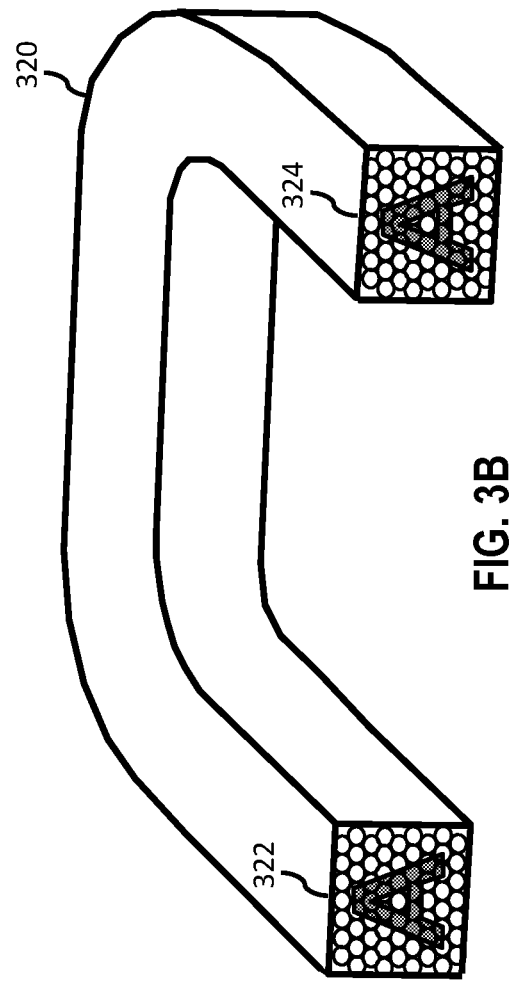

FIG. 3B illustrates a fused coherent fiber optic image bundle, operable to carry laser reflections to a remote photodetector array according to an embodiment of the resent disclosure.

Figure 3C:
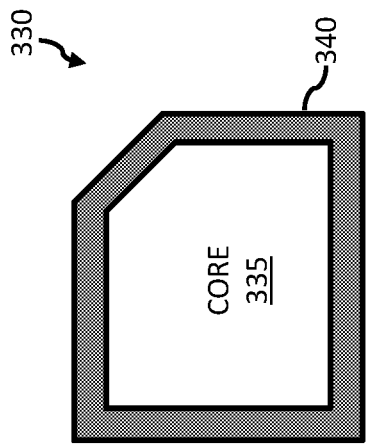

FIG. 3C illustrates a monofiber used in a coherent fiber optic image bundle including a fiber core and fiber cladding.

Figure 3D:
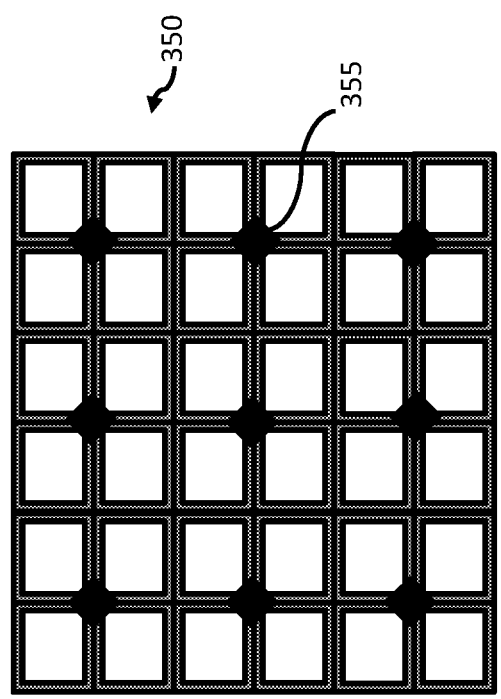

FIG. 3D illustrates a multi-fiber boule used to construct a coherent fiber optic image bundle according to several embodiments of the present disclosure.

Figure 3E:
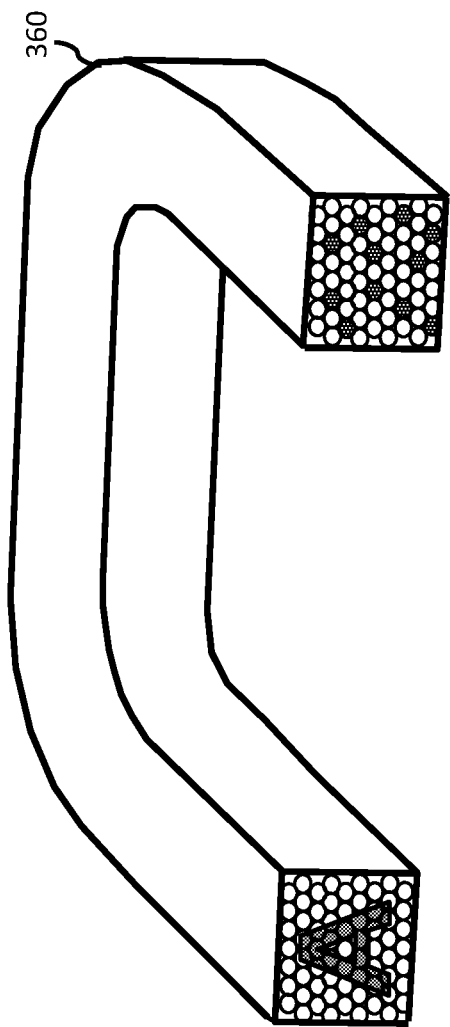

FIG. 3E illustrates an incoherent fiber optic bundle.

Figure 3F:
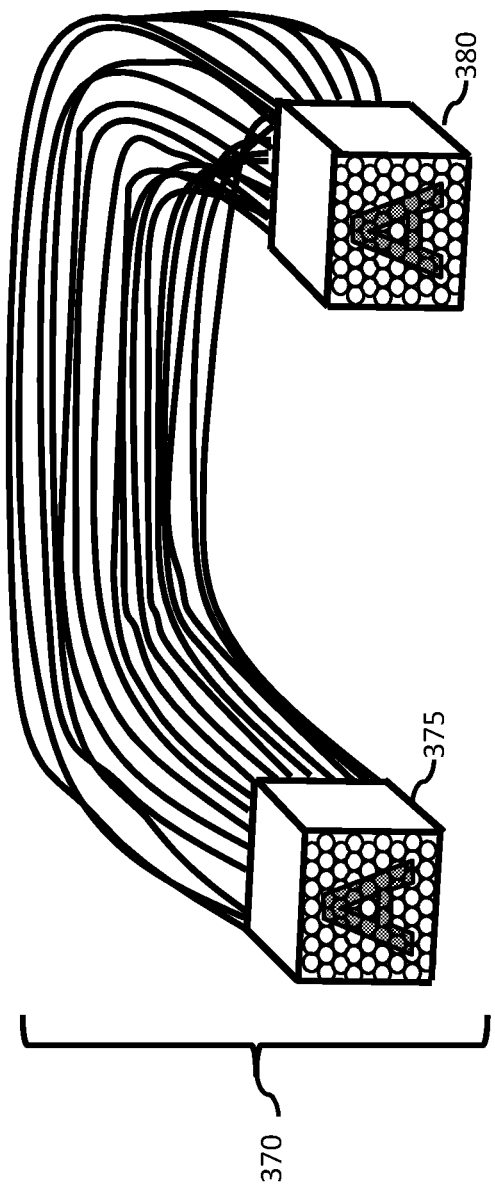

FIG. 3F illustrates a flexible coherent fiber optic image bundle, operable to carry laser reflections to a remote photodetector array according to an embodiment of the present disclosure.

Figure 4A:
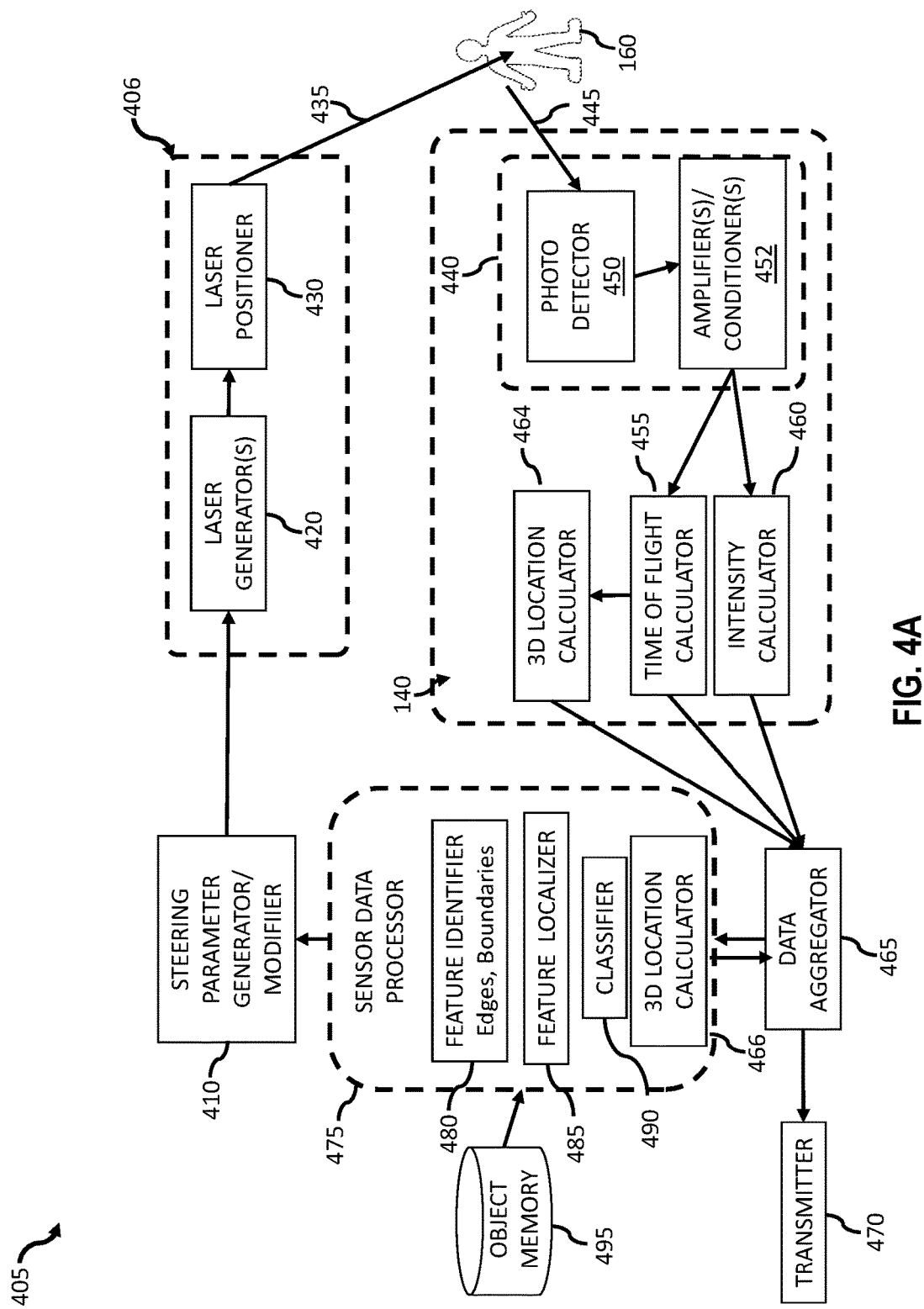
Figure 4B:
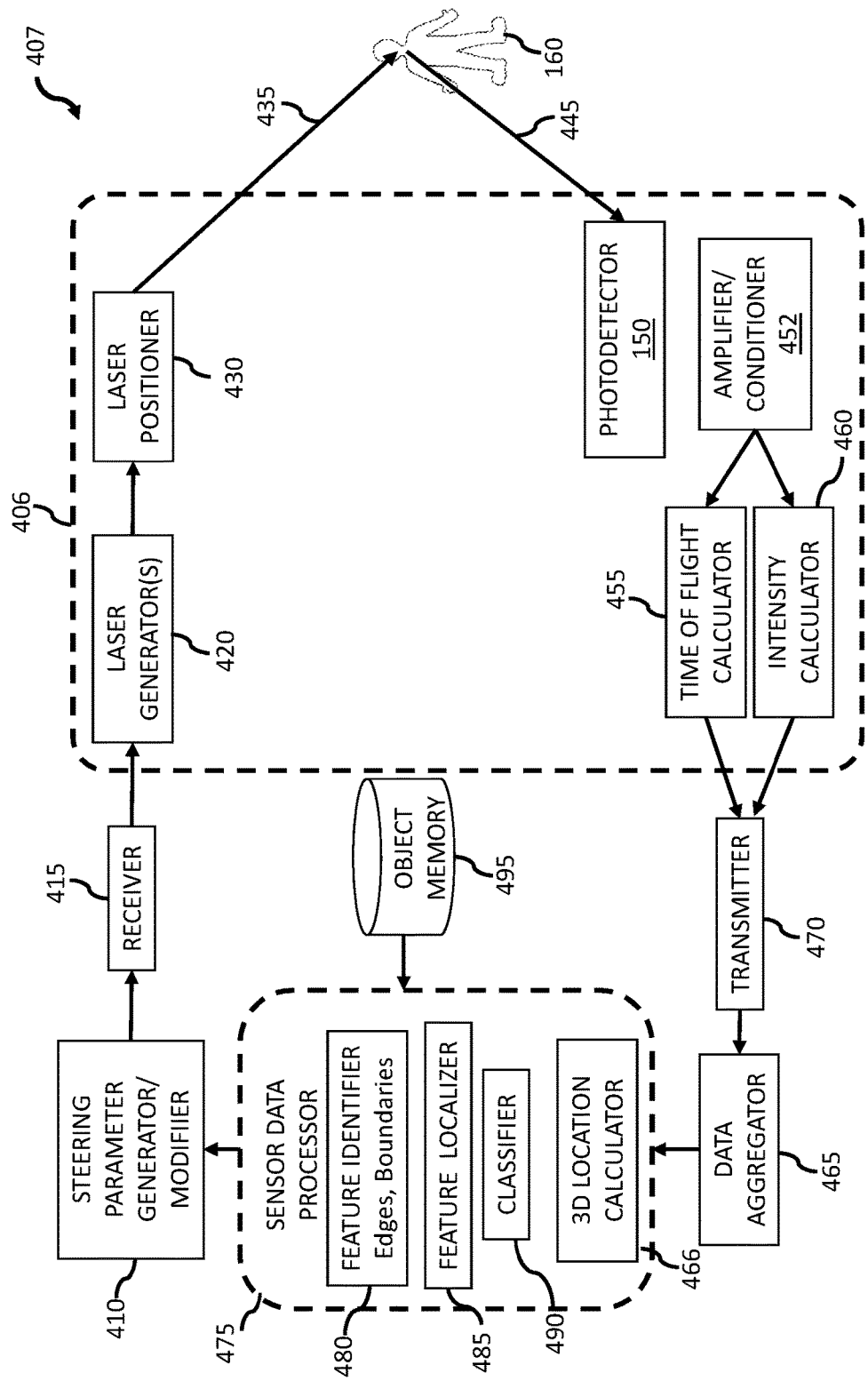

FIGS. 4A and 4B are functional diagrams illustrating several components of an exemplary dynamically steerable laser range finder in accordance with an embodiment of the present disclosure.

Figure 5:
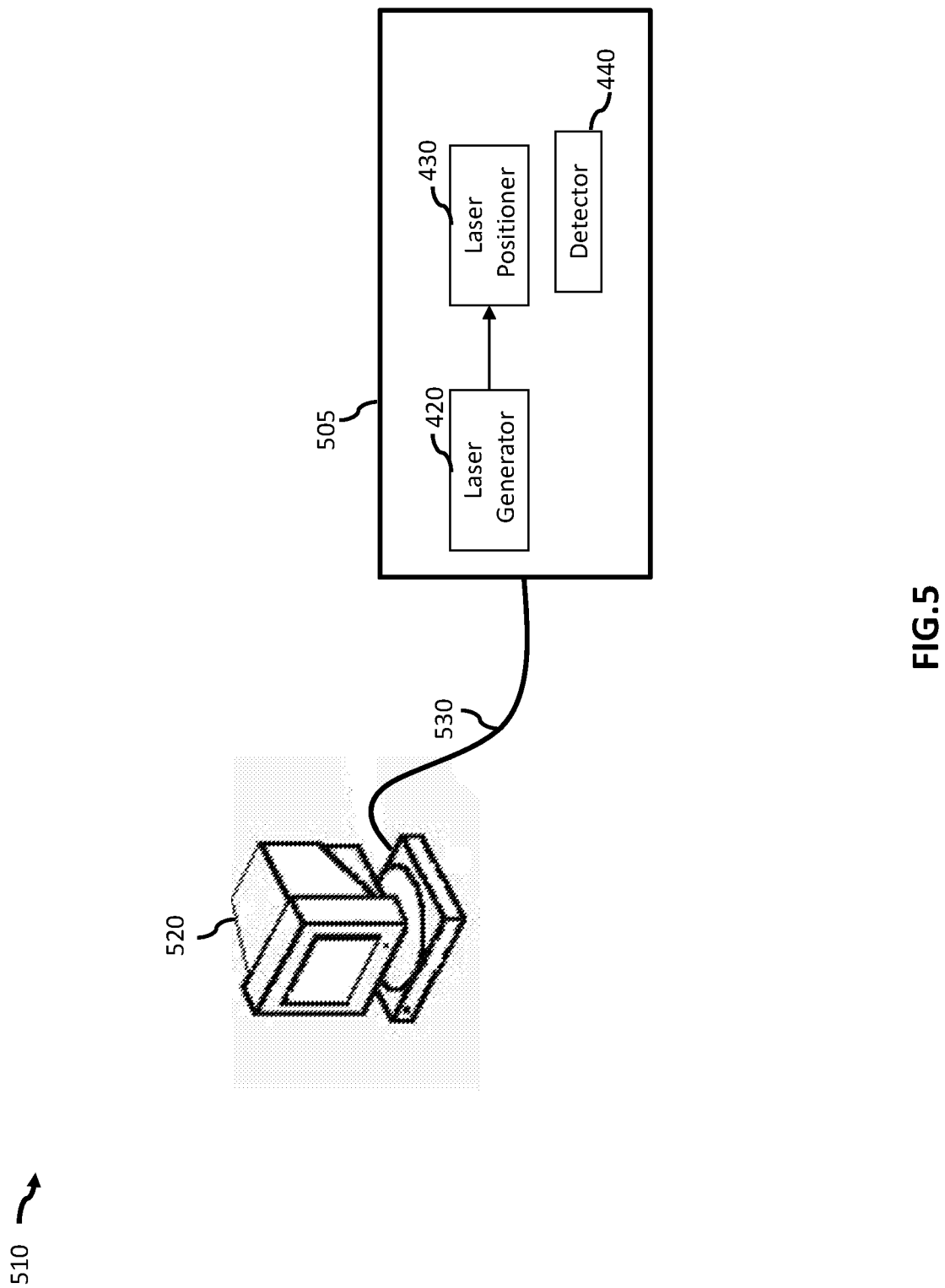

FIG. 5 illustrates an exemplary laser range finding system including a processing subassembly and a steerable laser assembly connected by a communication link, according to an embodiment of the present disclosure.

Figure 6:
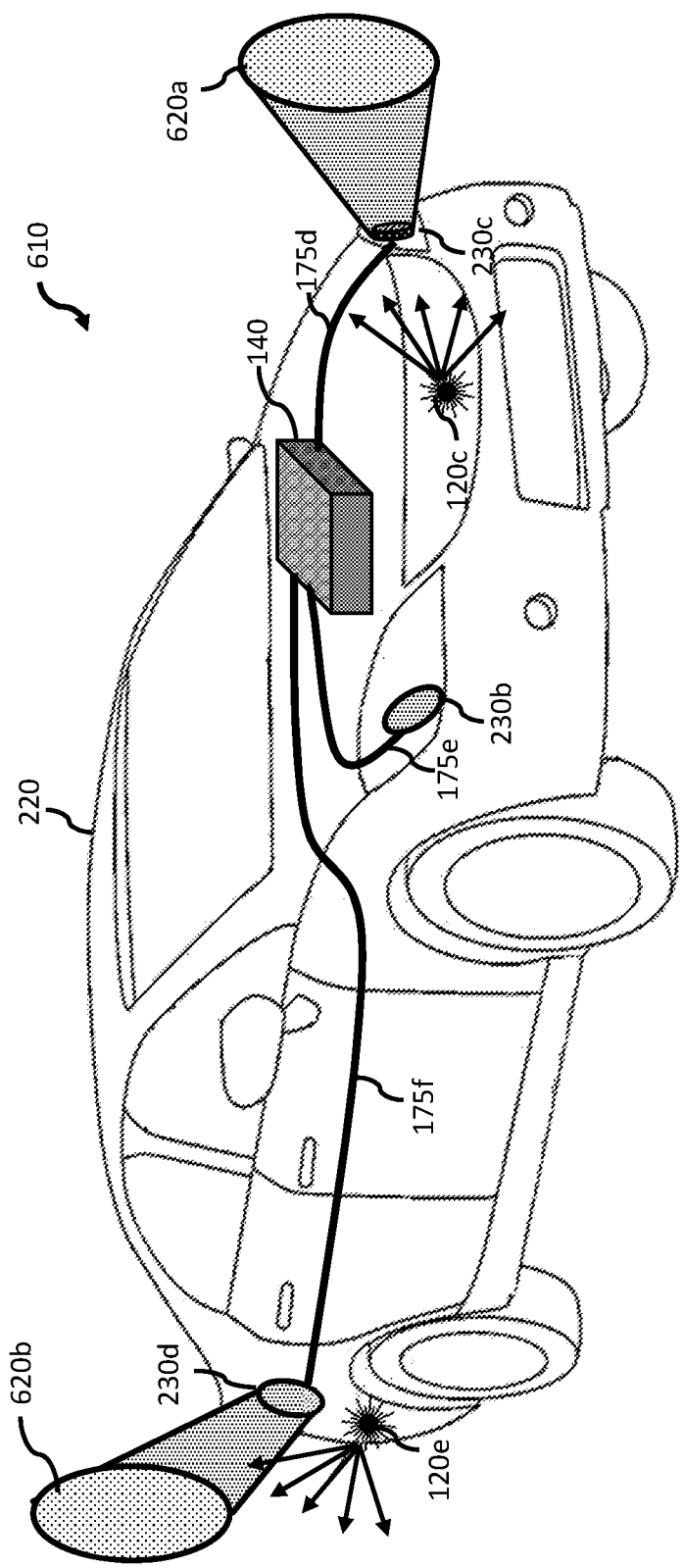

FIG. 6 illustrates a vehicle-based distributed LIDAR system with a remote ranging subassembly and a plurality of fiber optic image bundles, according to an embodiment of the present disclosure.

Figure 7:
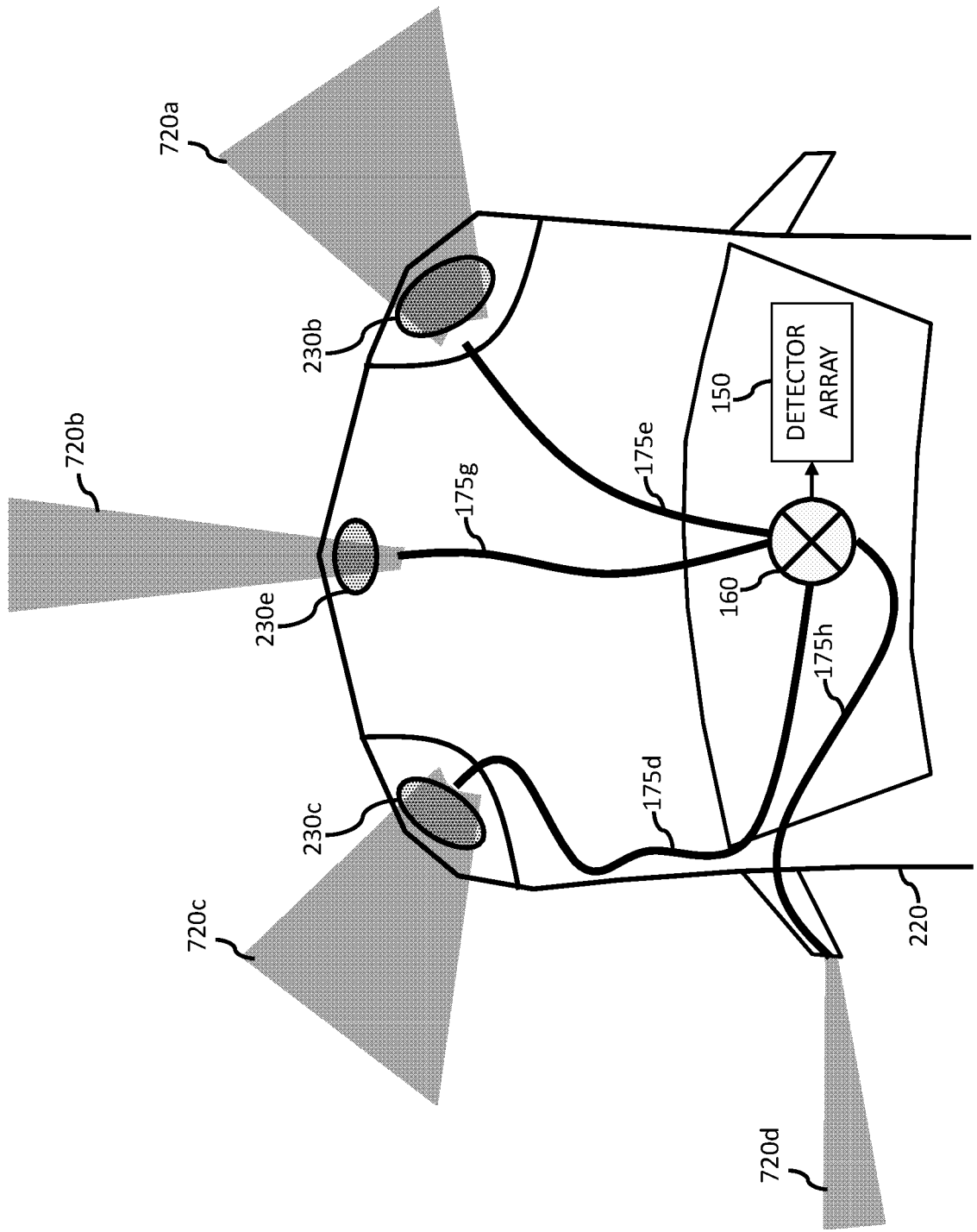

FIG. 7 illustrates a vehicle-based distributed LIDAR system with a remote detector array and a plurality of fiber optic image bundle, according to an embodiment of the present disclosure.

Figure 8:
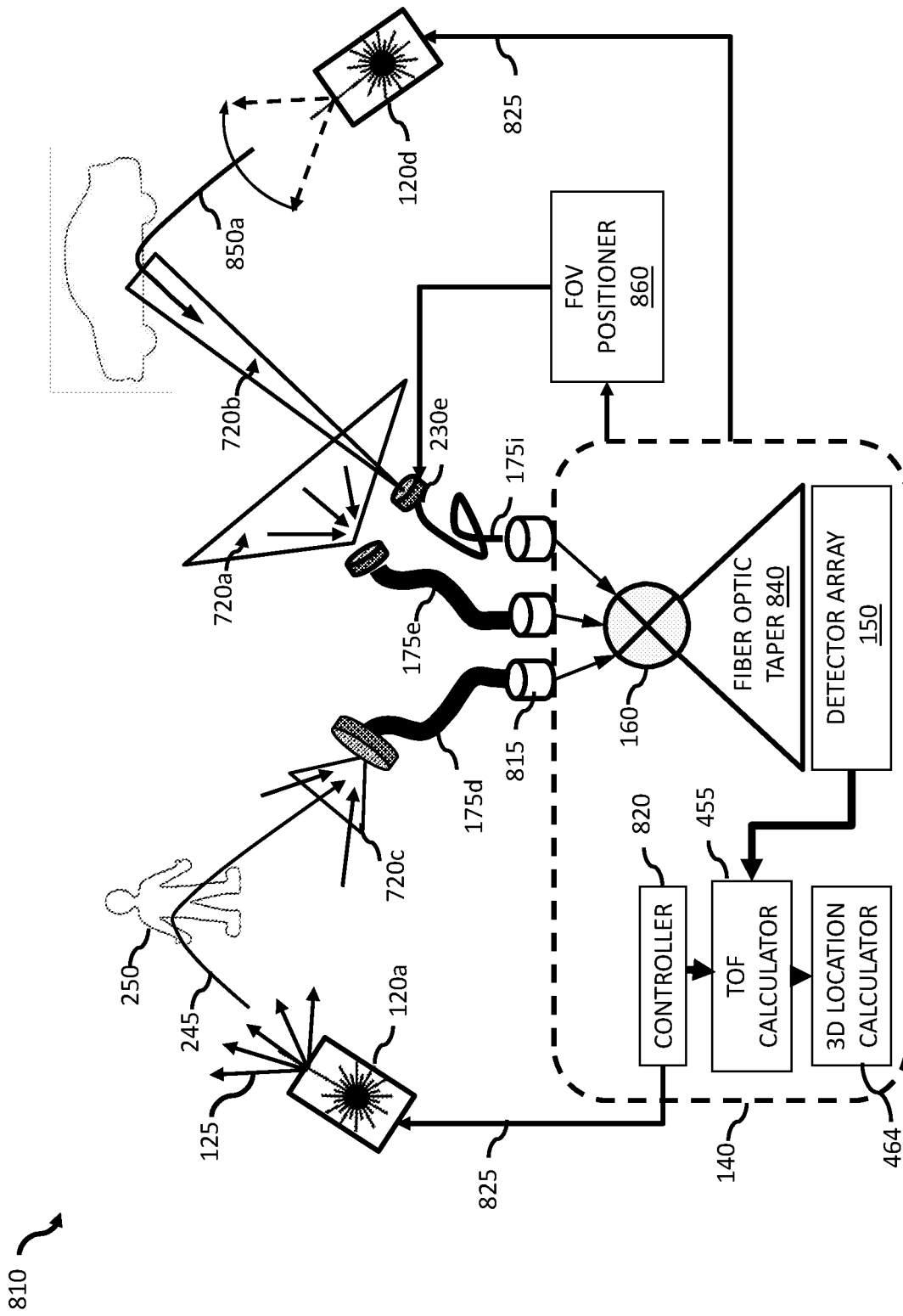

FIG. 8 illustrates several components of a distributed LIDAR system with a remote ranging subassembly and a plurality of fiber optic image bundles, according to an embodiment of the present disclosure.

Figure 9:
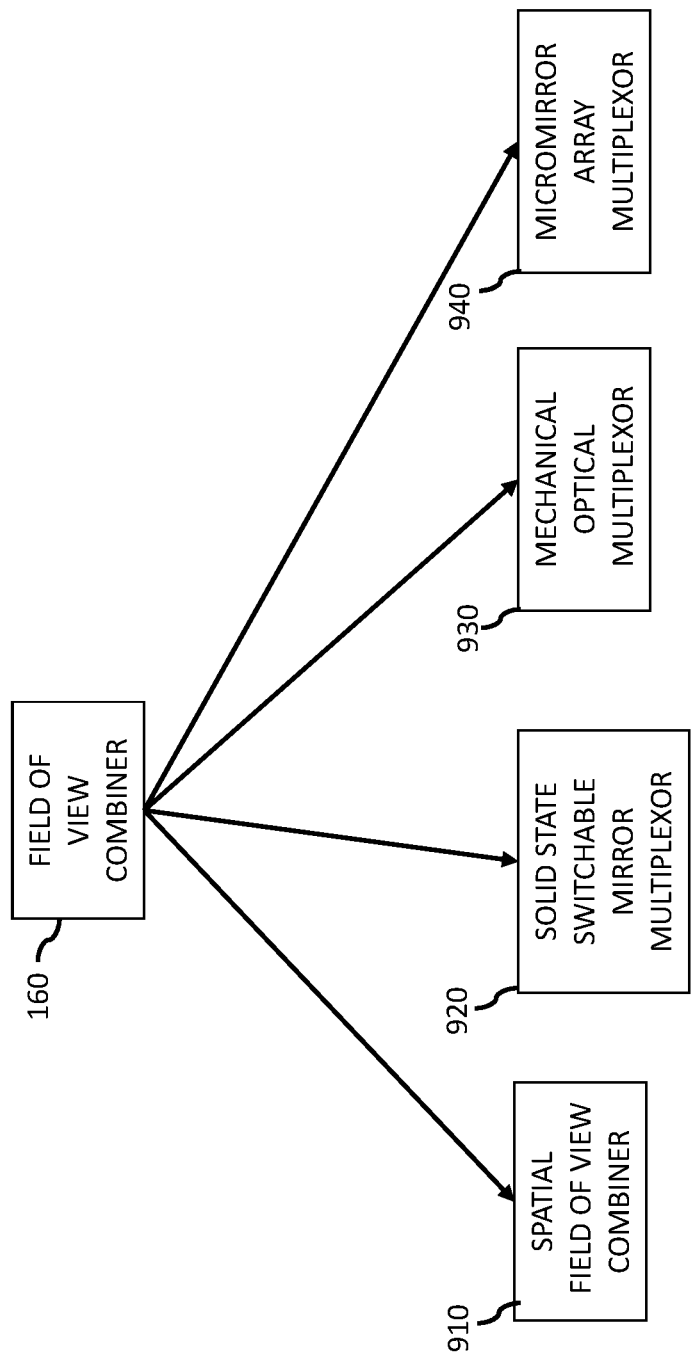

FIG. 9 illustrates a plurality of exemplary FOV combiners operable to combine or multiplex laser reflections from fiber optic image bundles, according to an embodiment of the present disclosure.

Figure 10A:
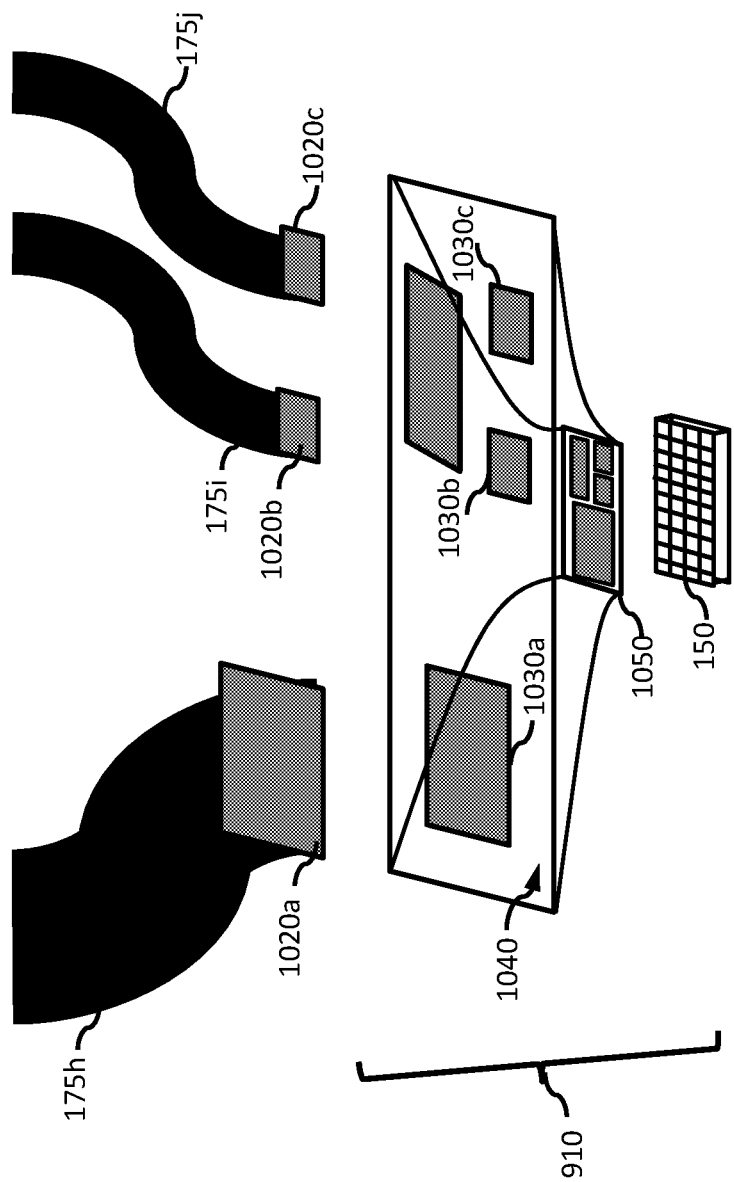
Figure 10B:
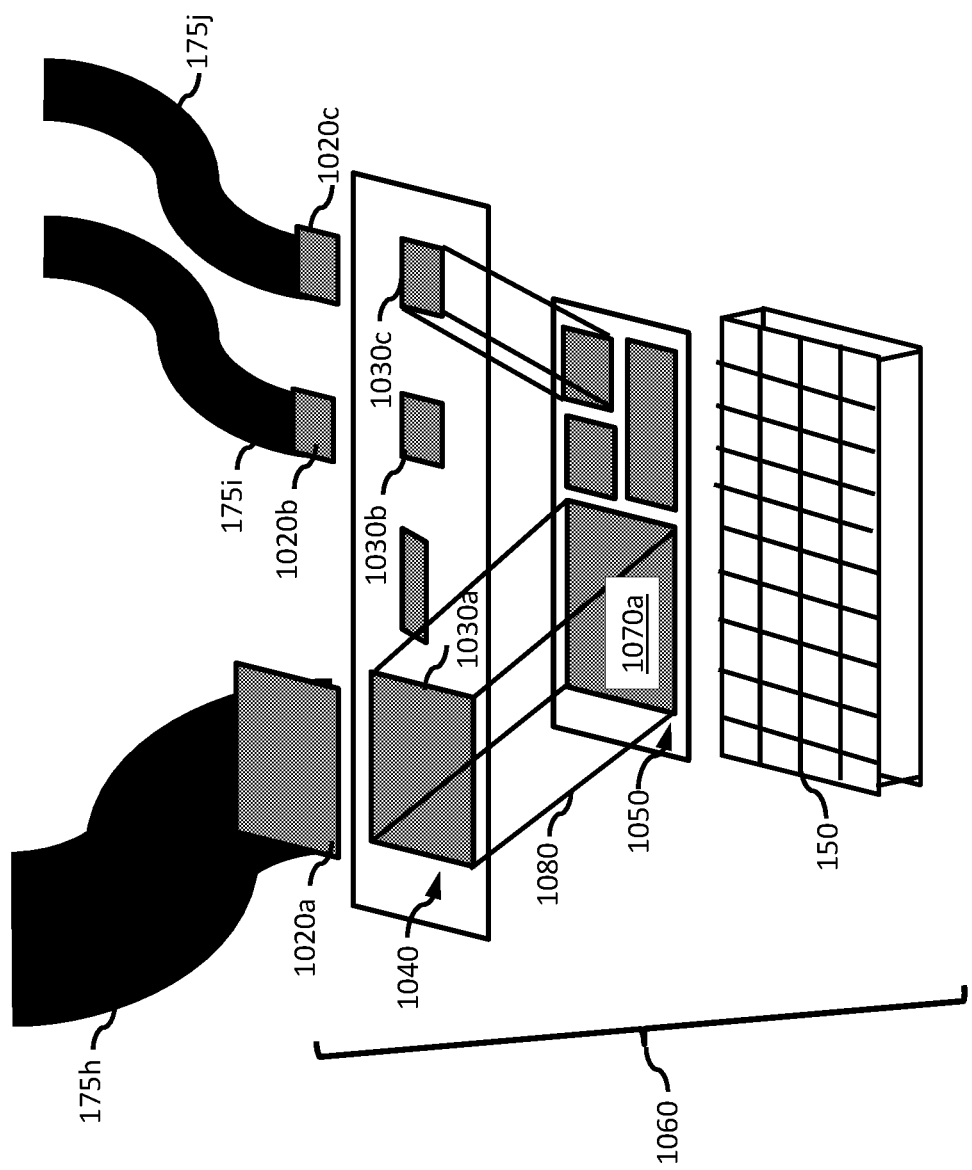

FIGS. 10A and 10B illustrate spatial FOV combiners, according to an embodiment of the present disclosure.

Figure 11:
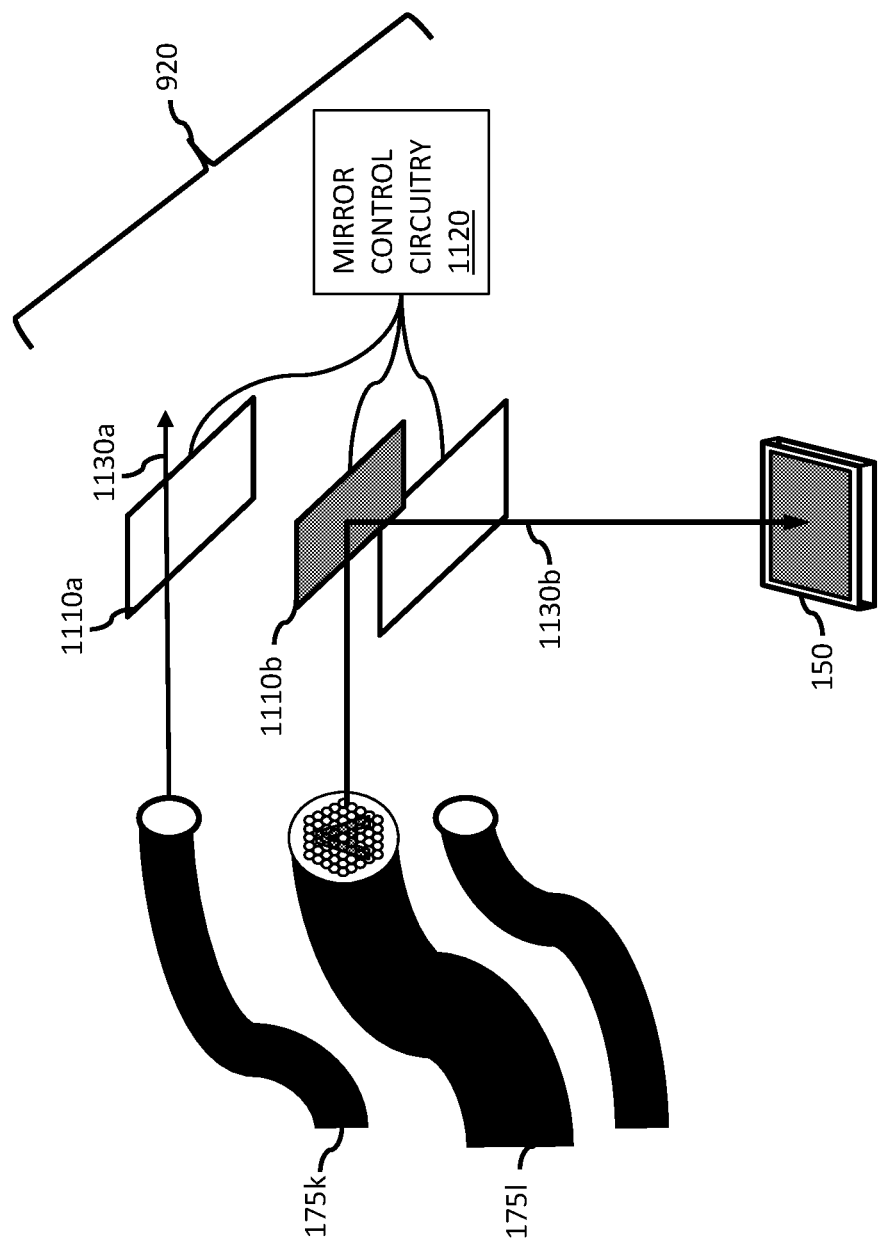

FIG. 11 illustrates a solid-state switchable mirror multiplexor, according to an embodiment of the present disclosure.

Figure 12:
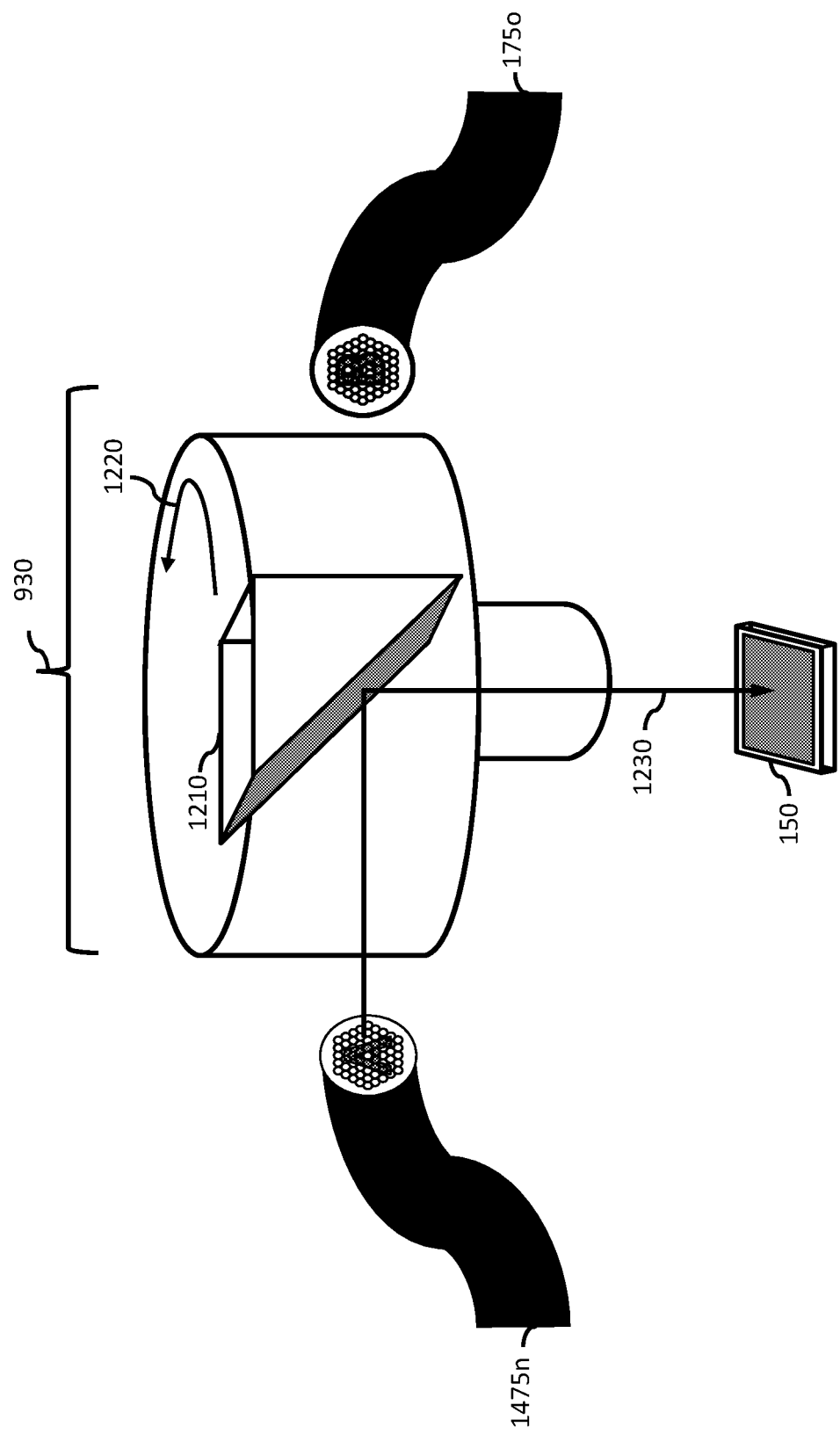

FIG. 12 illustrates a mechanical optical multiplexor operable to multiplex light reflections from a plurality of fiber optic image bundles according to an embodiment of the present disclosure.

Figure 13:
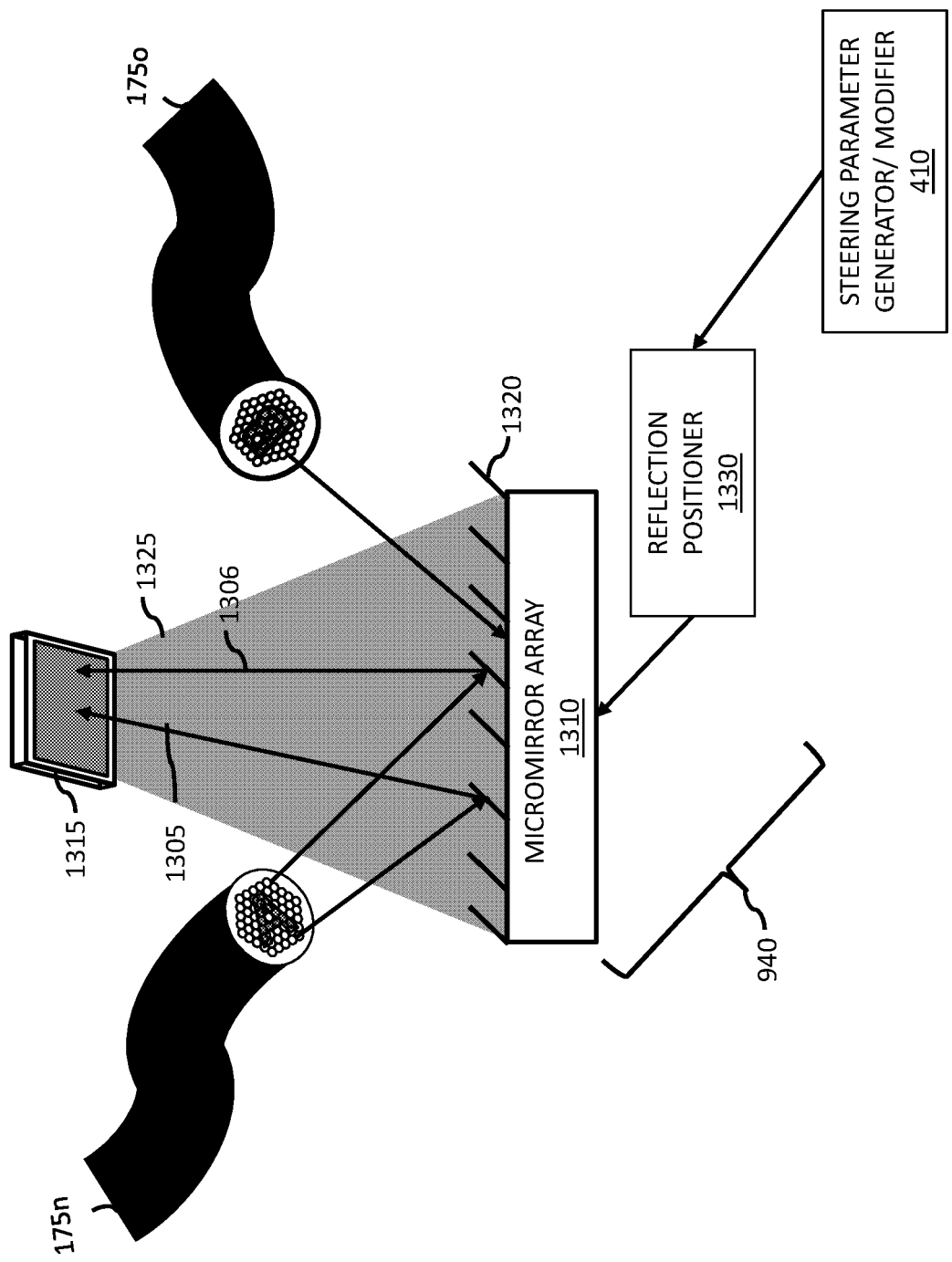

FIG. 13 illustrates a micromirror array multiplexor operable to multiplex laser reflections from a plurality of fiber optic image bundles onto a remote photodetector array, according to an embodiment of the present disclosure.

Figure 14A:
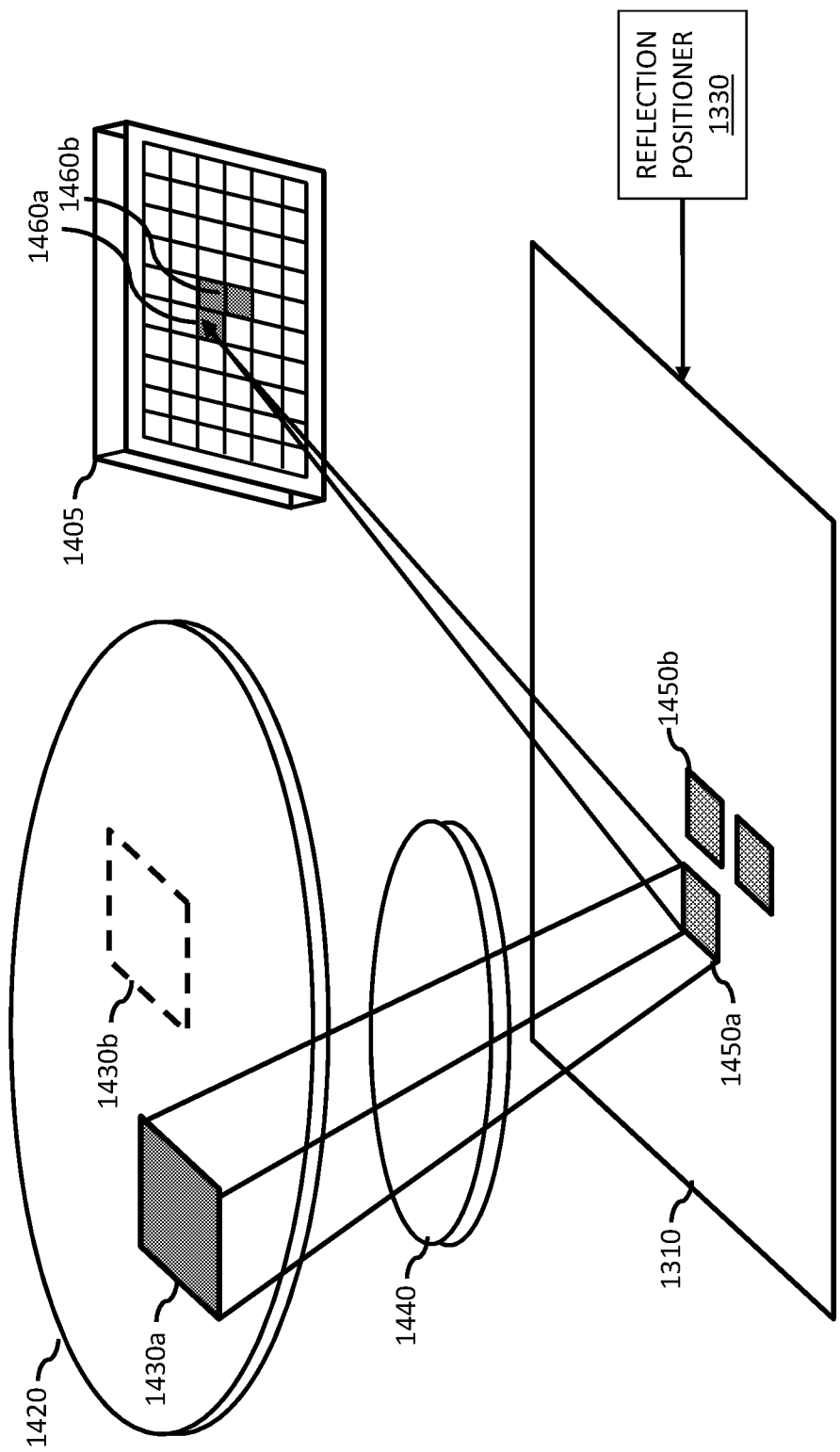

FIG. 14A illustrates a micromirror array operable to focus portions of a FOV onto a detector array according to an embodiment of the present disclosure.

Figure 14B:
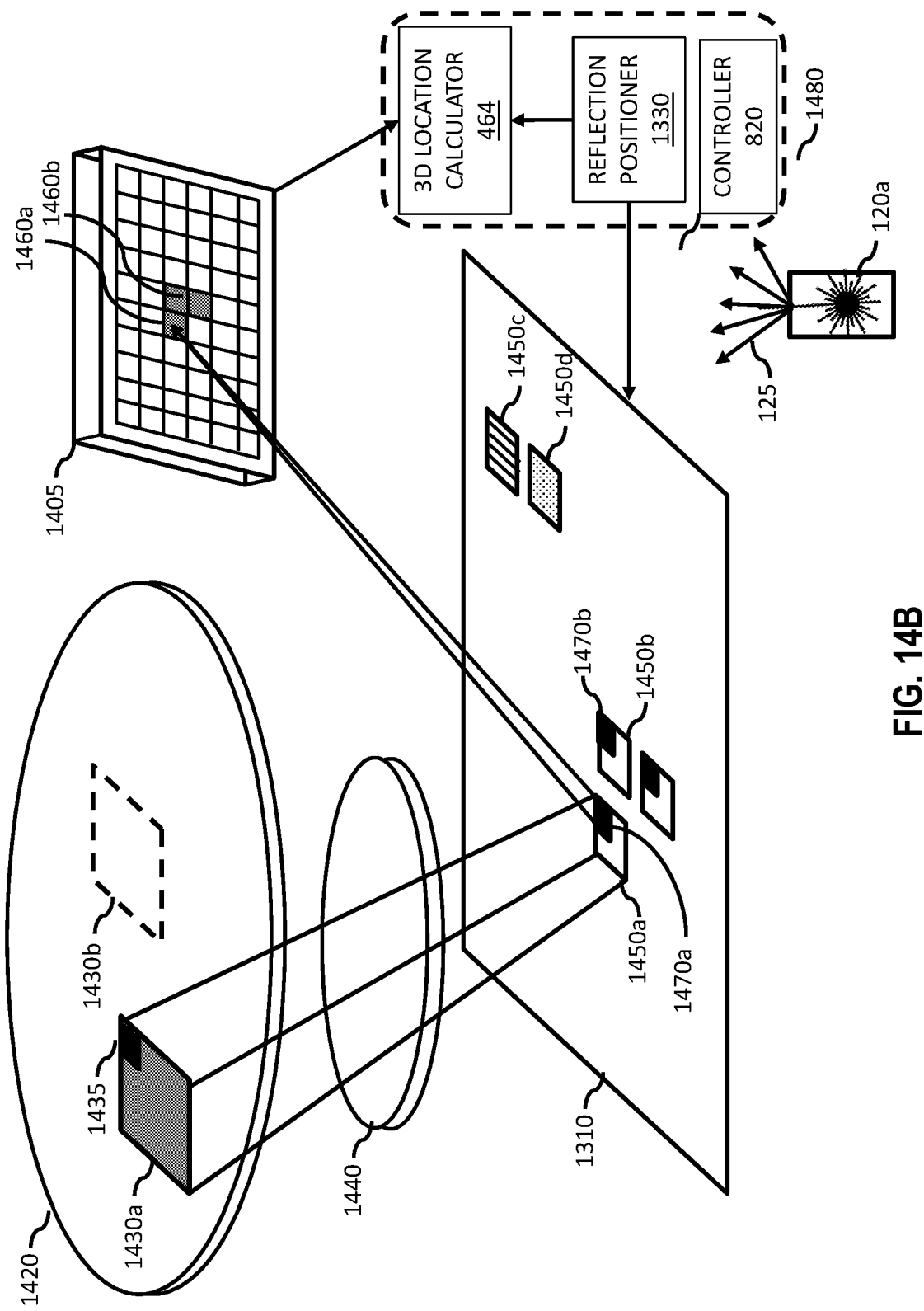

FIG. 14B illustrates a micromirror array operable to focus portions of a FOV onto a detector array according to an embodiment of the present disclosure.

Figure 15A:
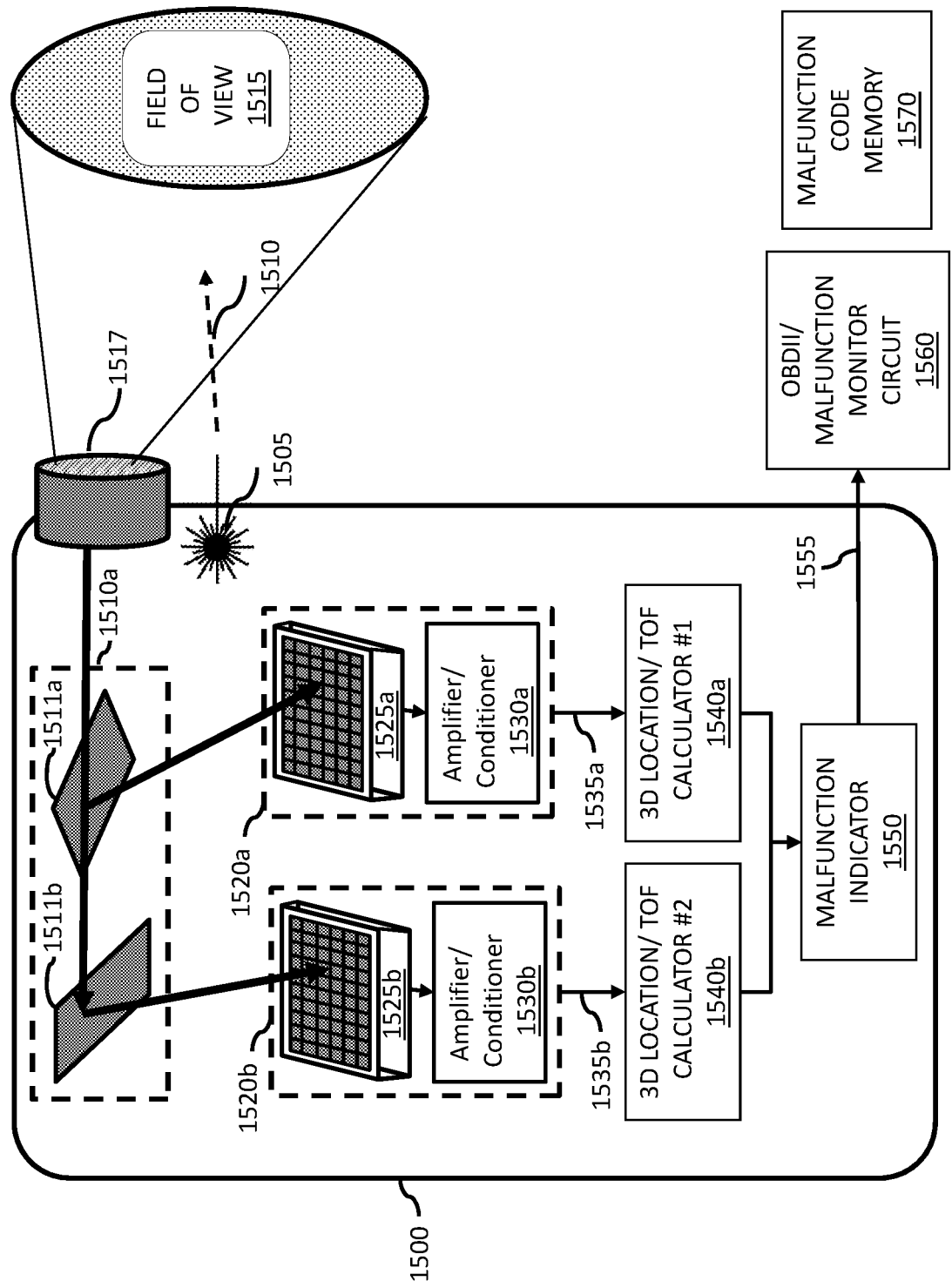

FIG. 15A illustrates a LIDAR system that directs light reflections to one of two detectors and comprises a malfunction indicator circuit, in accordance with an embodiment of the present disclosure.

Figure 15B:
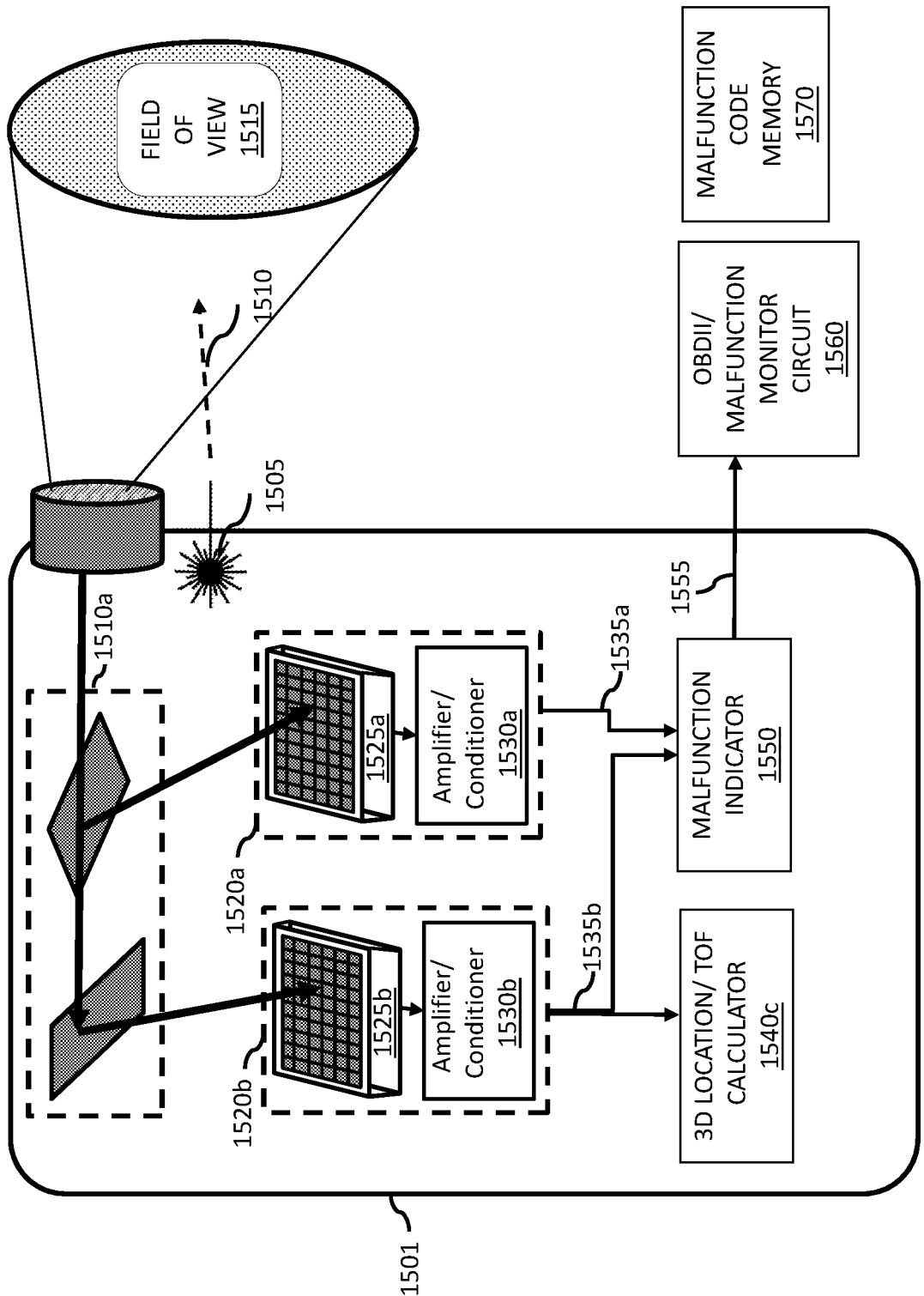

FIG. 15B illustrates a LIDAR system that directs light reflections to one of two detectors and comprises a malfunction indicator circuit, in accordance with an embodiment of the present disclosure.

Figure 15C:
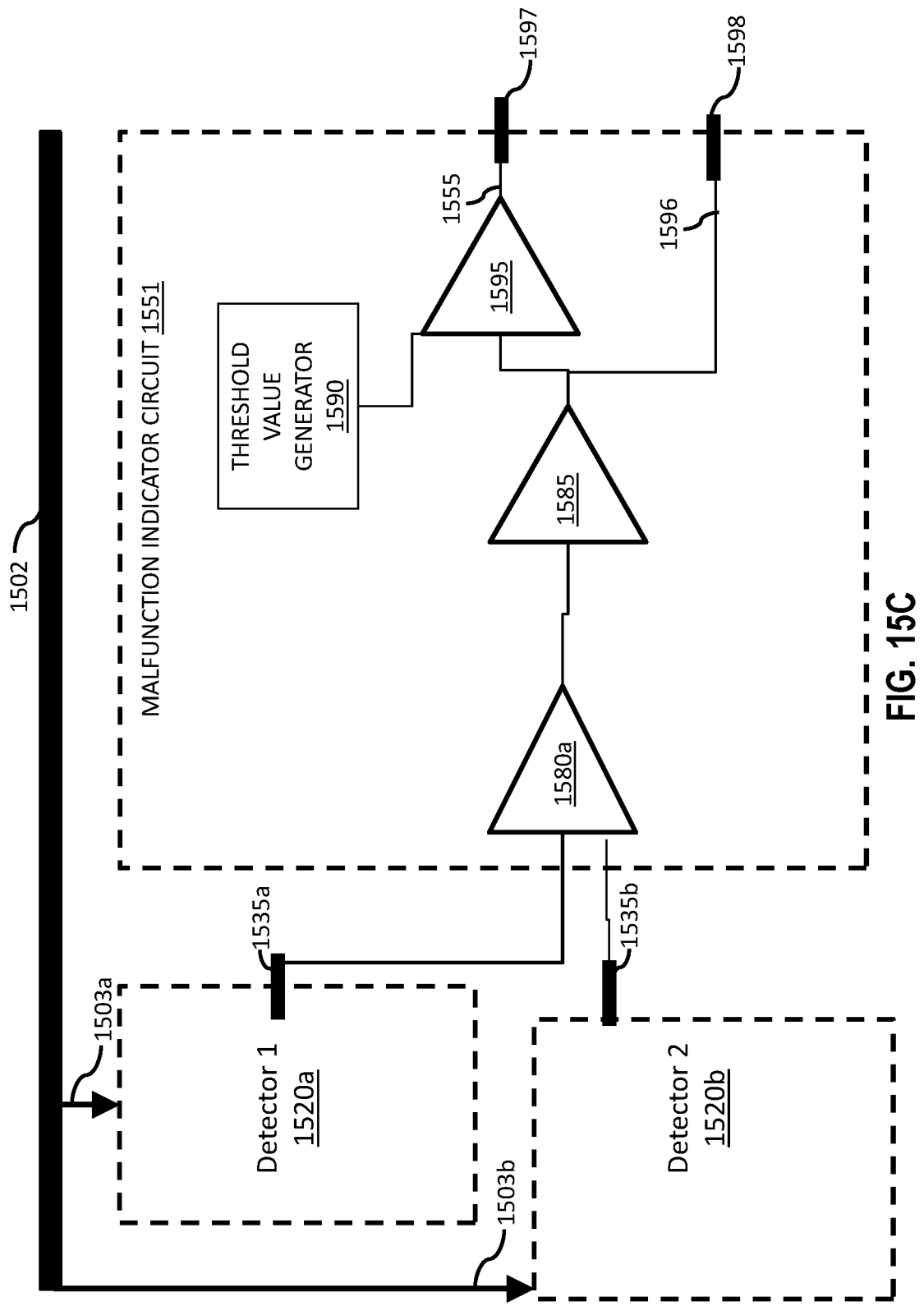
Figure 15D:
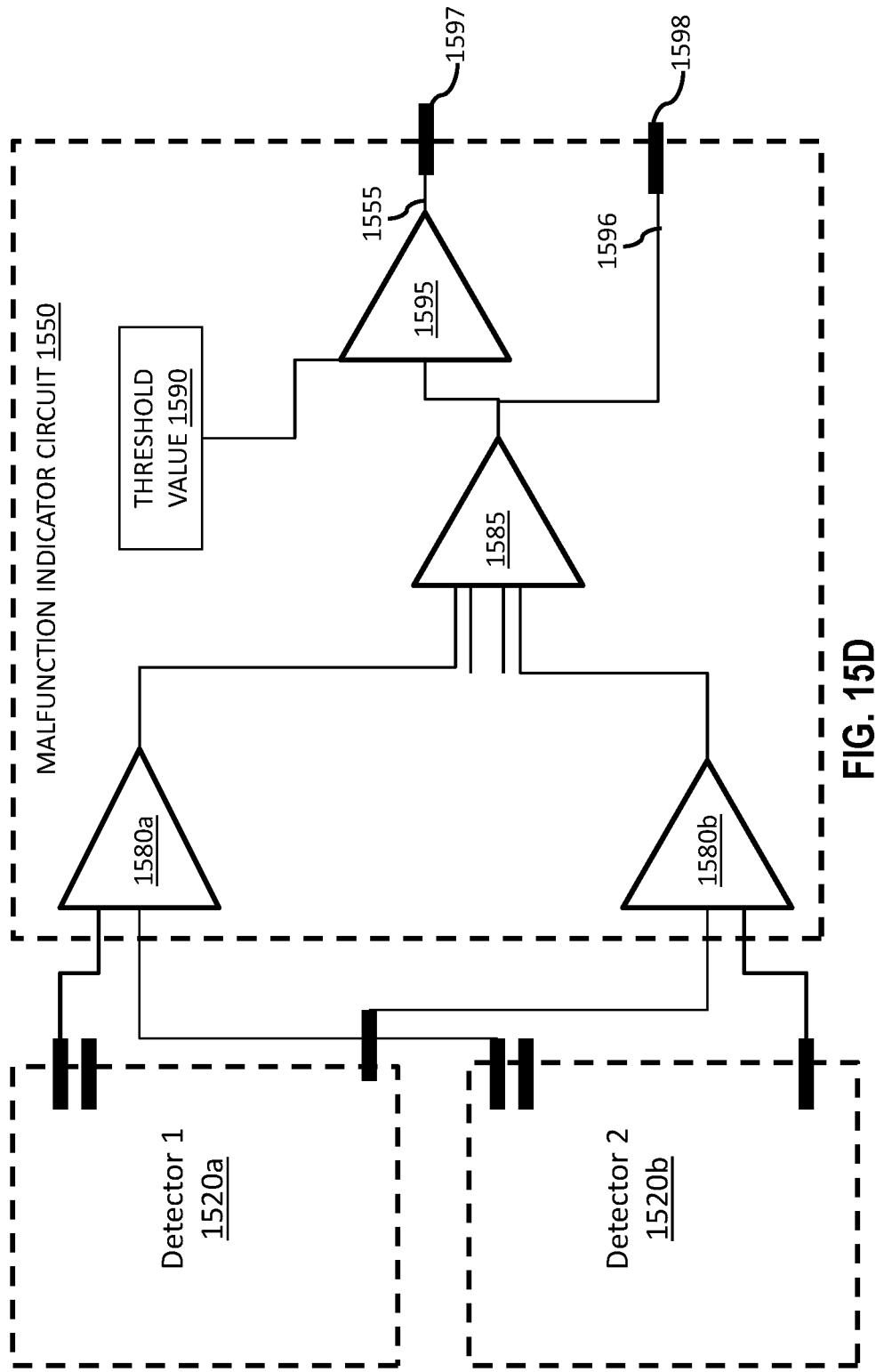

FIGS. 15C and 15D illustrate exemplary malfunction indicator circuits, in accordance with an embodiment of the present disclosure.

Figure 16:
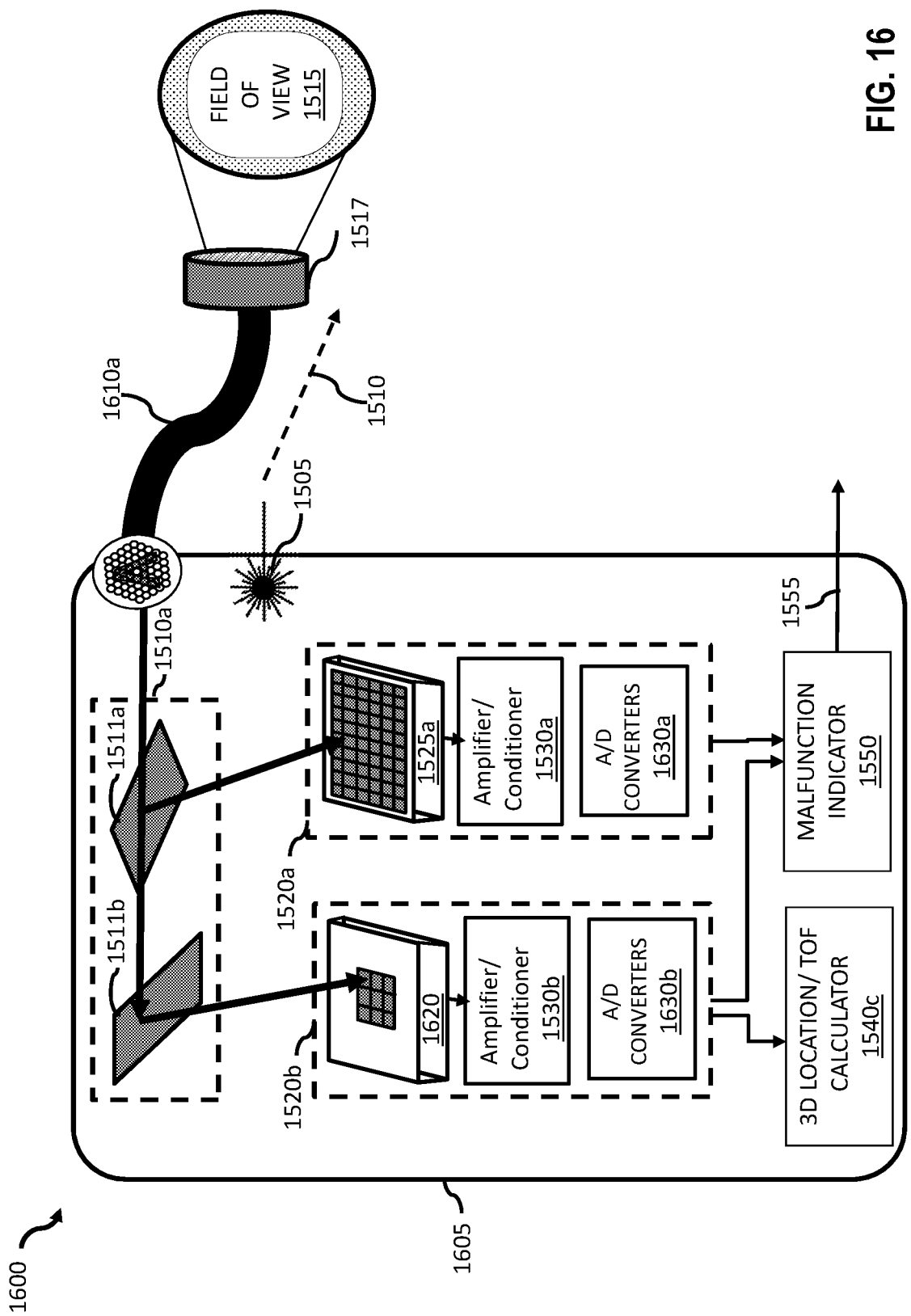

FIG. 16 illustrates several components of a failsafe LIDAR system including a coherent fiber optic image bundle that transfers light reflections from a FOV, in accordance with an embodiment of the present disclosure.

Figure 17A:
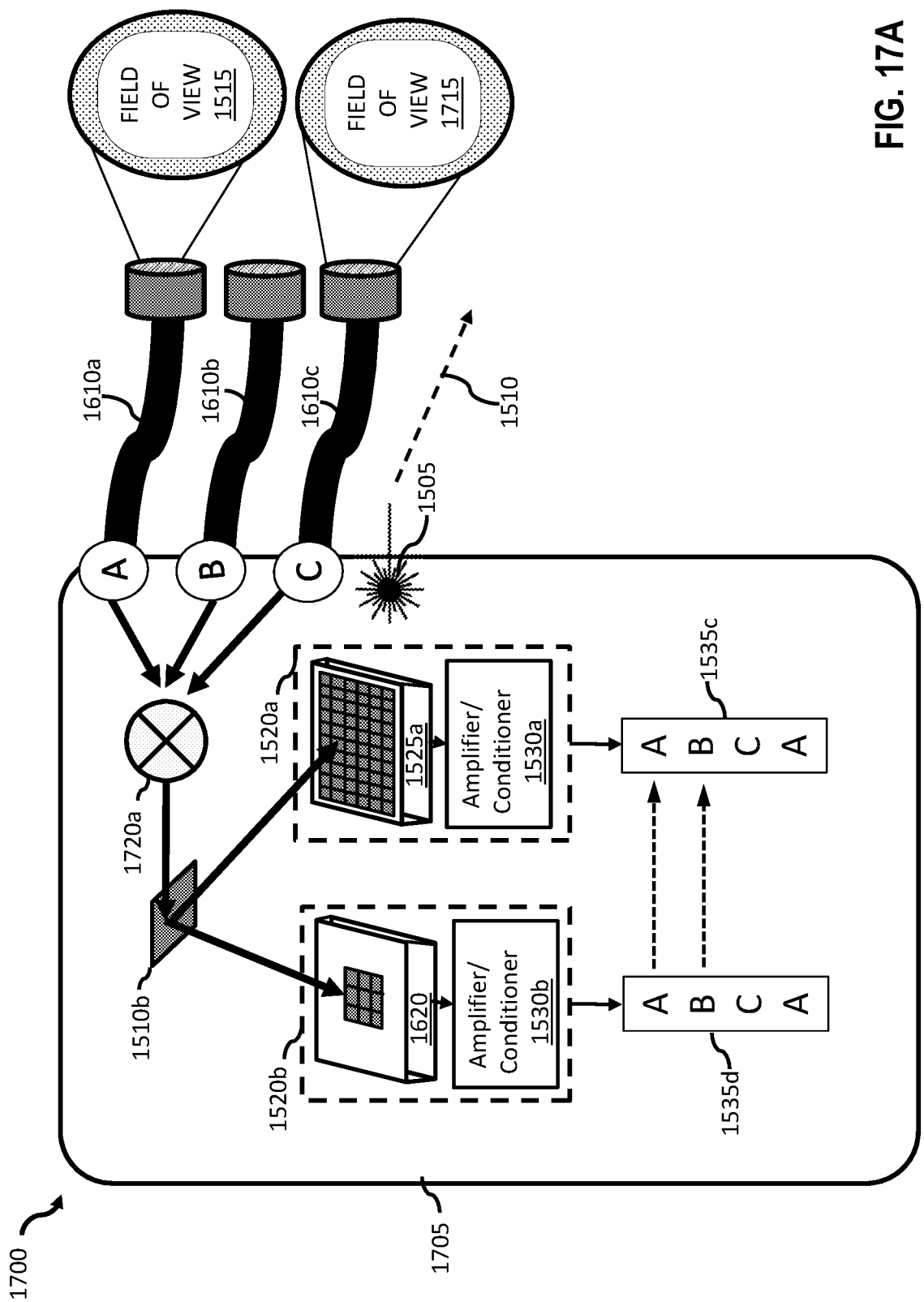

FIG. 17A illustrates several components of a failsafe LIDAR system including a FOV combiner and several coherent fiber optic image bundles, in accordance with an embodiment of the present disclosure.

Figure 17B:
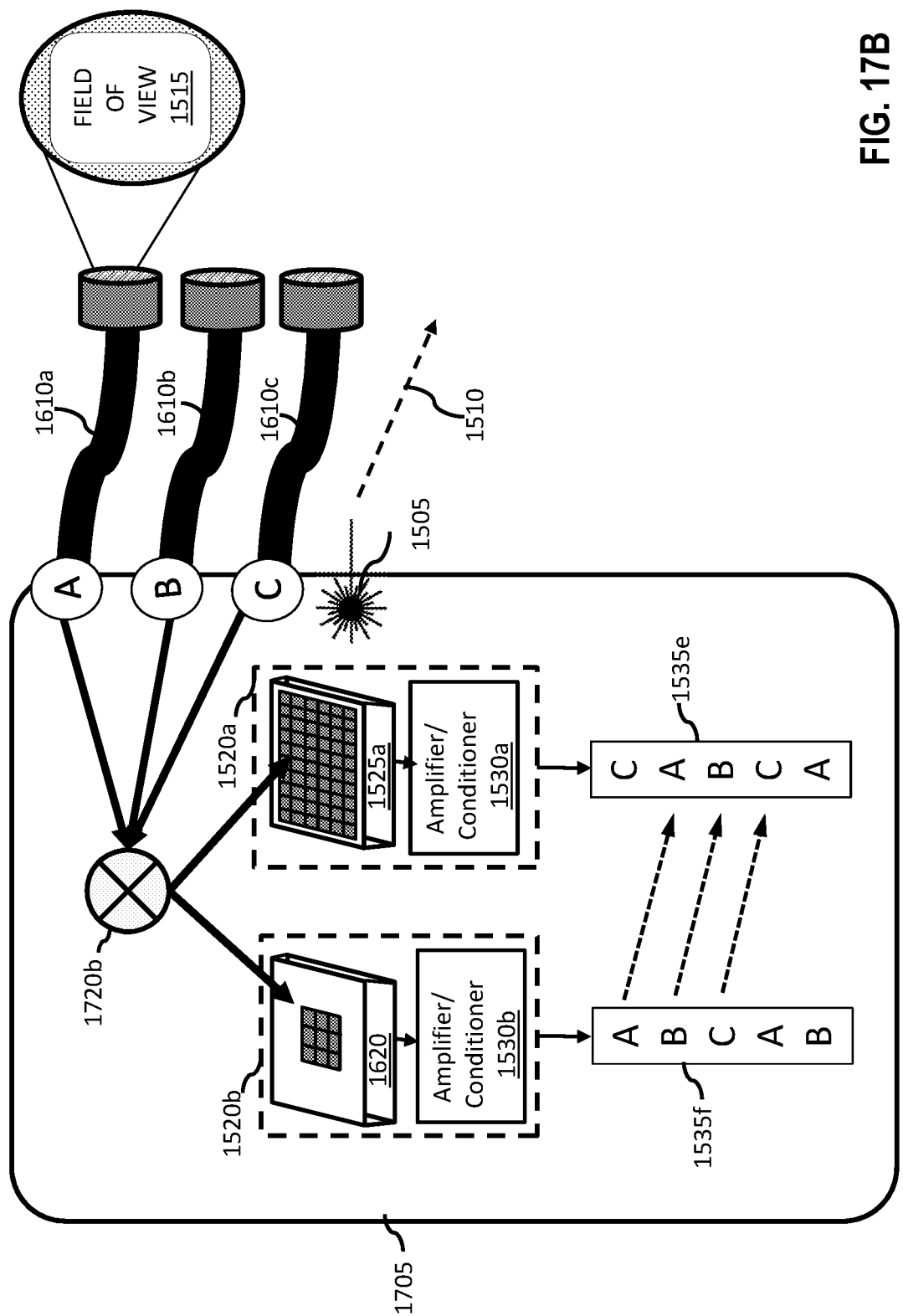

FIG. 17B illustrates several components of a failsafe LIDAR system including a FOV combiner and several coherent fiber optic image bundles, in accordance with an embodiment of the present disclosure.

Figure 18:
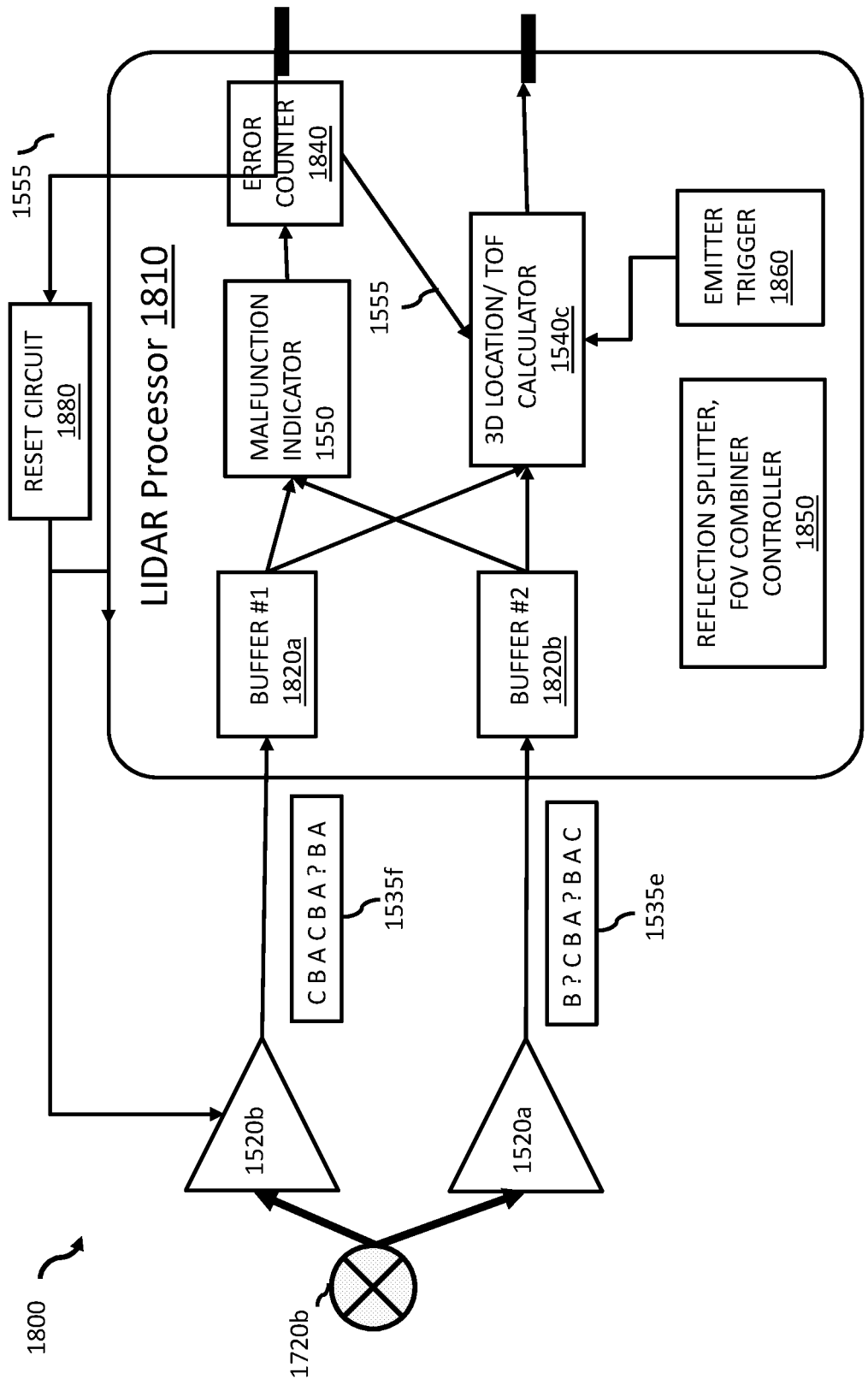

FIG. 18 illustrates several components of a failsafe LIDAR system, in accordance with an embodiment of the present disclosures.

Figure 19A:
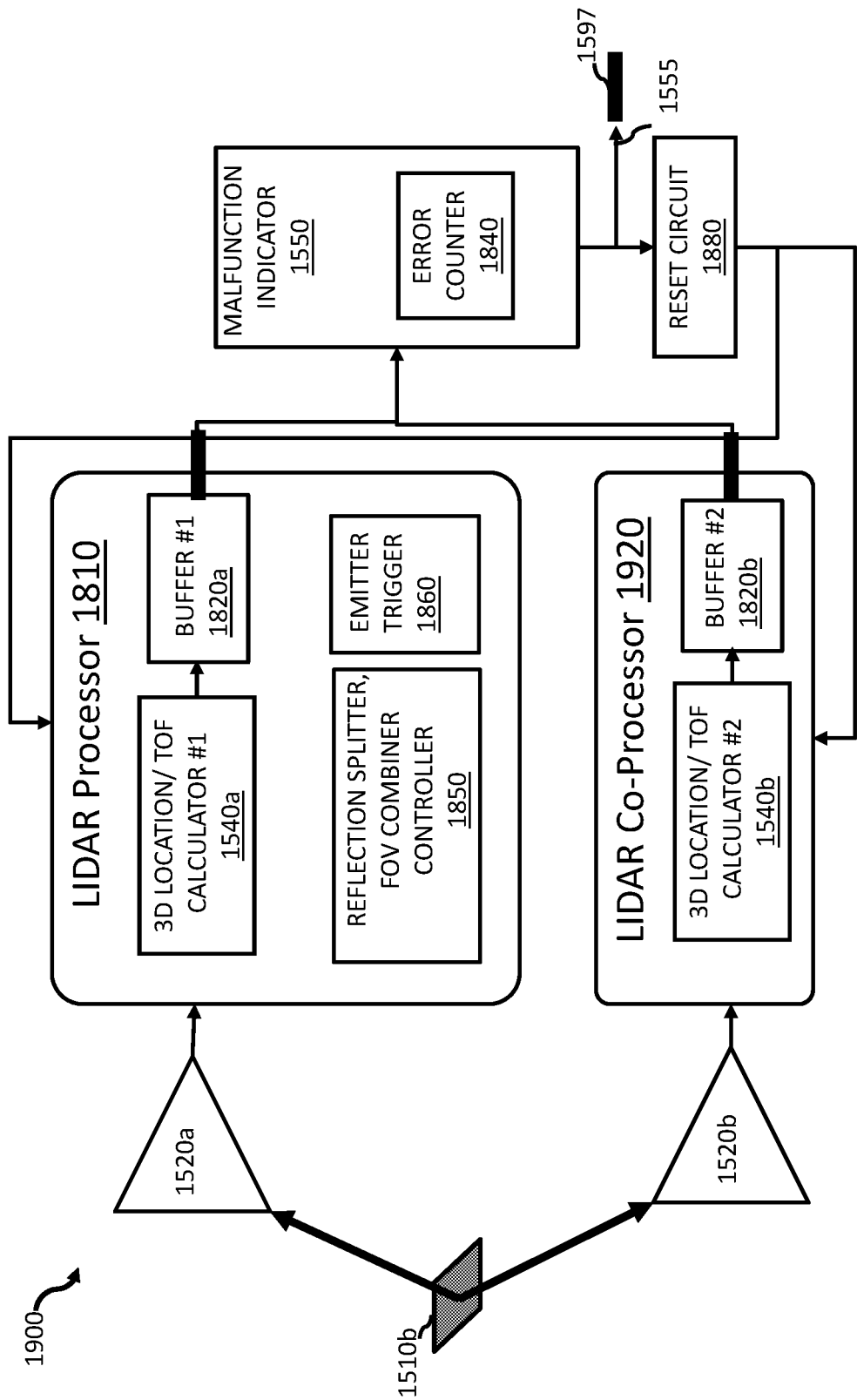
Figure 19B:
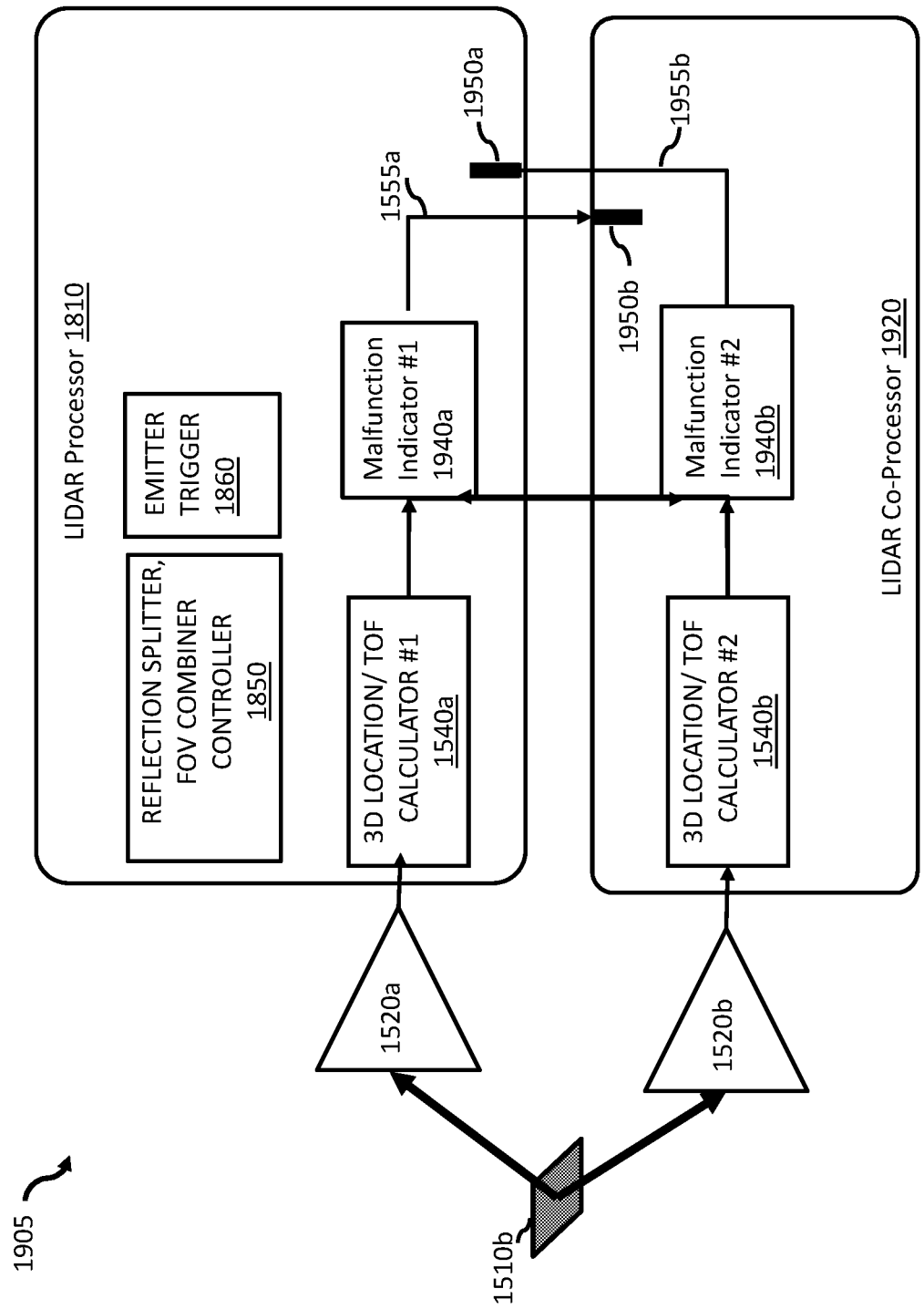

FIGS. 19A and 19B illustrate several components of a failsafe LIDAR system, in accordance with an embodiment of the present disclosures.

Figure 20:
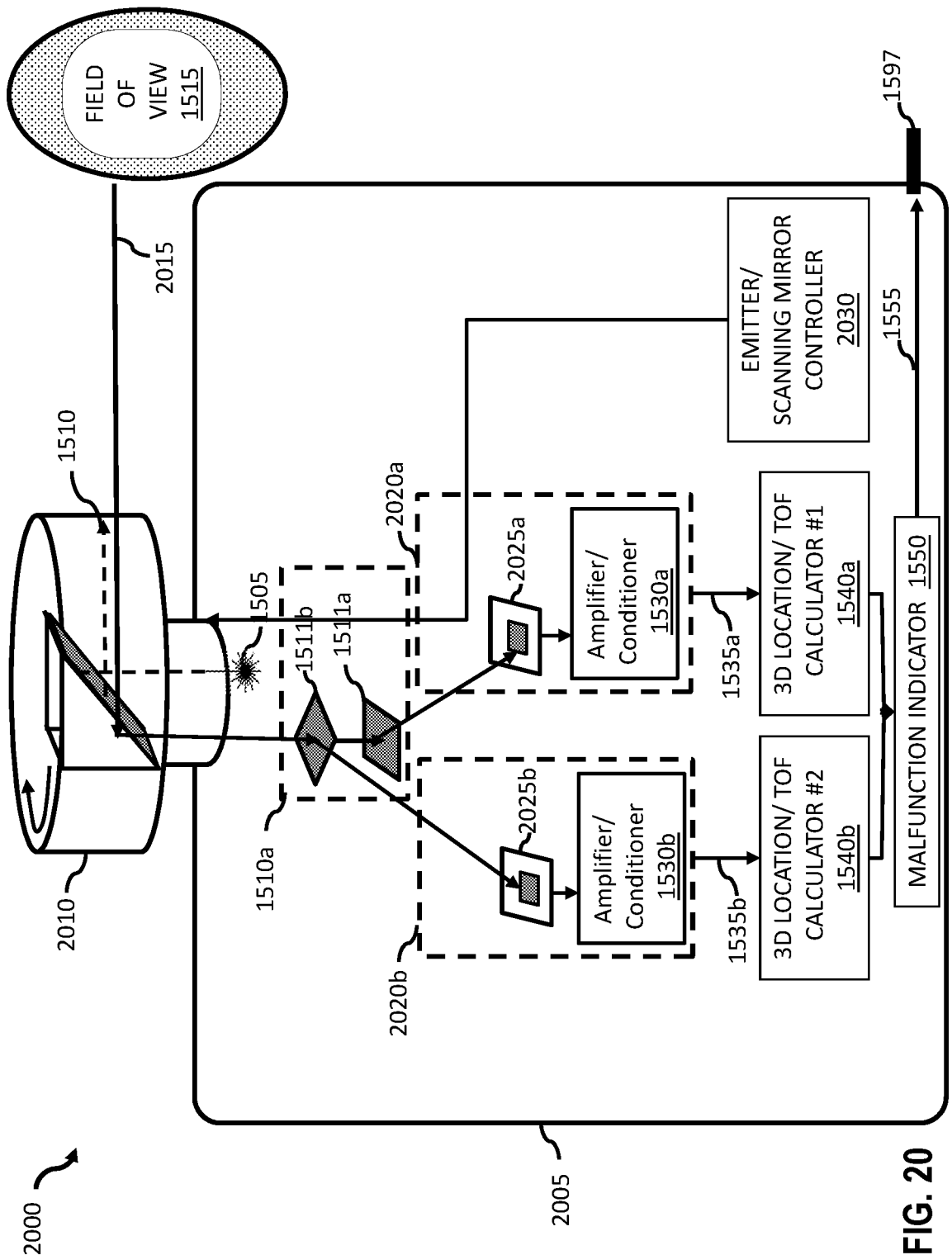

FIG. 20 illustrates several components of a failsafe LIDAR system with a mechanical scanning mirror, in accordance with an embodiment of the present disclosures.

FIG. 21 is a flow diagram illustrating a method for generating a malfunction signal using two detectors in a light-based range finding system.

DETAILED DESCRIPTION

Figure 1A:
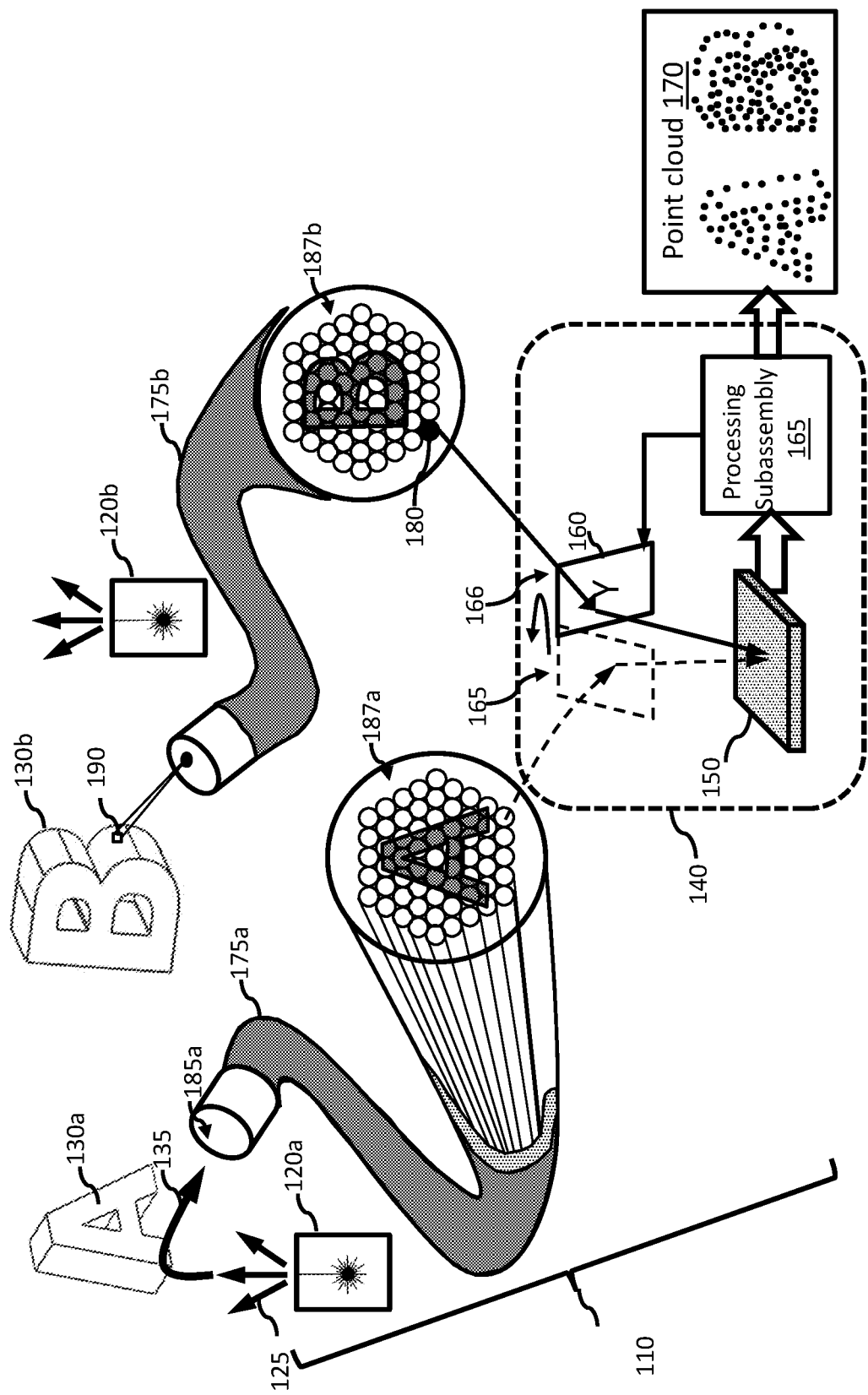
FIG. 1A illustrates a distributed LIDAR system including a remotely located ranging subassembly and two fiber optic image bundles according to an embodiment of the present disclosure.

FIG. 1A illustrates a distributed LIDAR system 110 according to an embodiment of the present disclosure. LIDAR system 110 comprises two light emitters 120a and 120b that can generate outgoing light pulses (e.g., pulse 125) that reflect from objects (e.g., 130a and 130b) in the vicinity of LIDAR system 110. Light emitters can be incoherent light emitting diodes (LEDs) or coherent laser diodes. Light emitters can generate visible, infrared or ultraviolet light.

LIDAR system 110 further comprises a ranging subassembly 140 that is remotely located (e.g., located such that photodetector array 150 does not have direct line-of-site visibility to objects 130a and 130b). Ranging subassembly 140 can function to control the timing of light generators 120a and 120b (e.g., providing a light modulation waveform). Ranging subassembly 140 can further comprise a photodetector array 150 to sense and record the time-of-flight of light reflections from objects such as 130a and 130b thereby generating reflection signals. Ranging subassembly can further comprise a FOV combiner 160 (e.g., an optical multiplexor or a spatial FOV combiner) to share light reflections from multiple FOVs (e.g., from around multiple parts of a vehicle) with the photodetector array 150. The FOV combiner 160 can spatially combine light reflections from multiple FOVs onto different parts of the photodetector array simultaneously; can time multiplex light reflections from different FOVs onto the photodetector array 150, or both spatially and temporally combine light reflections from different FOVs. In one embodiment FOV combiner 150 can be a scanning mirror that rotates or continuously moves along a path, similar to the scanning mirrors found in mechanical LIDAR. In another embodiment FOV combiner 160 can occupy multiple discrete positions (e.g., flipping a mirror from position 165 to position 166. Ranging subassembly 140 can further comprise a processing subassembly 167 (e.g., a computer processor or graphics processing unit) that functions to generate a time-varying 3D point cloud 170 that represents the 3D coordinates of real world surfaces that are within the multiple combined FOVs. For example, FIG. 1A illustrates processing subassembly 167 controlling the position of FOV combiner 160 between position 165 and 166 and thereby gathering reflections from objects 130a and 130b at different times to generate a combined point cloud 170.

One challenge is how to receive light reflections at a remotely located ranging subassembly 140. Specifically, in order to generate 3D point cloud 170 both the timing and incoming direction of each light reflection should be identifiable at the remote ranging subassembly. To address this challenge LIDAR system 110 further comprises two CFOBs 175a and 175b. Unlike single-core fiber optic cables or multifiber optic cables where the incoming direction of a light reflection is lost, the CFOBs are designed to capture and transfer information regarding the 2D input direction of light reflections in their respective FOVs, thereby enabling a remote ranging subassembly to associate a 2D direction with the location of light received from an output end of each CFOB. Each CFOB comprises an input surface, an output surface and a plurality (e.g., often thousands) of elongated optic fibers (e.g., fiber 180) that are closely spaced and have a common sequence of fiber ordering at both the input and output surface. Each CFOB has a corresponding input FOV comprising the range of directions that light (e.g., reflection 135) can enter the bundle at the input surface 185a and be transported to the output surface 187a. Each optic fiber (e.g., fiber 180) functions to transport light reflections from a small portion of a FOV (e.g., angular range of directions 190) at the input surface to the output surface.

In one embodiment, the operation of remote LIDAR 110 is as follows: ranging subassembly 140 instructs light generators 120a and 120b to generate a sequence of light pulses (e.g., laser flashes), thereby illuminating objects 130a and 130b. Light reflections (e.g., 135) from surfaces in the path of the light pulses can be gathered by CFOBs 175a and 175b. The common spatial sequence of optic fibers in each CFOB at both the input and output end can function to preserve a measure of the input direction of each light reflection from the FOV at the output of the CFOB. This preservation of the incoming reflection direction can be maintained through several twists and turns in the CFOB along a path to the remote ranging subassembly 140. At the ranging subassembly 140. FOV combiner 160 can timeshare the photodetector array 150 with the output ends of both CFOBs. In one example, emitter 120a can operate first and FOV combiner 160 can occupy position 165 to transfer reflections from the output surface of CFOB 175a to detector array 150. Subsequently, emitter 120b can emit an outgoing light pulse and FOV combiner 160 can occupy position 166 to transfer reflections from the output surface 187b of CFOB 175b to photodetector array 150. Circuitry in the ranging subassembly, such as a processing subassembly 167 can then generate point cloud 170 indicative of the 3D reflection locations associated with objects 130a and 130b. In one aspect, the spatial relationship between objects in the point cloud (e.g., the points associated with object 130a and 130b) can be determined based in part on a known offset or spatial relation between the respective FOVs of CFOB 175a and 175b). For example, in point cloud 170 the 3D locations for the letter "A" are neighboring the 3D locations for the letter "B" indicating that the FOVs for CFOBs 175a and 175b are neighboring or adjoining. Ranging subassembly can store a database of offsets vectors indicating the placement of local origins for FOVs associated with CFOBs, thereby enabling 3D locations from many FOVs supplied by CFOBs to be transformed (e.g., shifted in space and rotated) for placement on a single point cloud. In one aspect, the CFOBs 175a and 175b can have a coherent arrangement of optical fibers with two or more distinct diameters (e.g., some fibers with 20 micrometer diameter cores and some fibers with 60 micrometer cores) thereby providing regions of higher and lower resolution (e.g., numbers of fibers per angular range subtended in the FOV.)

Exemplary Detectors

FIG. 1B illustrates the operation of an exemplary distributed LIDAR system 105 according to an embodiment of the present disclosure. Distributed LIDAR system 105 comprises a light generator 120a that can generate an outgoing set of light pulses 126. LIDAR system 105 further comprises a CFOB 175a comprising an input surface 185a, an output surface 187a and a coherent bundle of elongated optical fibers connecting the input and output surfaces, the bundle having a common spatial sequence at the input and output surface. For example, a CFOB can have a bundle of 9 fibers identified by the numbers 1-9 and an exemplary spatial sequence can be to arrange the fibers in a 3×3 grid with a sequence from left to right and top to bottom given by 1, 2, 3, 4, 5, 6, 7, 8, 9. In the case of a coherent CFOB the same sequence or ordering of the optical fibers in the bundle is preserved at the input and output surfaces. Finally CFOB 175a has a FOV 188a comprising the set of all directions that a light reflection (e.g., reflection 135) from at least one of the set of outgoing light pulses, can enter the bundle of coherent optical fibers at the input surface 185a. FOV 188a can be a 2-D angular range (e.g., an azimuthal range and an elevation range). Alternatively a FOV can be a 1-D angular range (e.g., an azimuthal angular range at a particular elevation).

CFOB 175a can have one or more expanded ends where some or all of the coherent optical fibers have a larger cross-section than in the center of each elongated fiber, thereby aiding the transmission of light reflections into each CFOB at the input surface or transmission from the output surface. CFOB 175a functions to channel light reflections from the outgoing light pulses into the coherent optical fibers. The specialized structure of each CFOB (discussed in depth later) enables transmission of the light reflections along the length of the CFOB without mixing light between fibers. Therefore, while the output surface may be very small (e.g., 1 mm in diameter) it can contain thousands of non-interacting optical fibers in a known sequence. Hence, the location of a reflection in the sequence at the output surface can be highly indicative of the reflection direction in the corresponding FOV (e.g., 188a).

LIDAR system 105 further comprises a ranging subassembly 140 that can be remotely located from the FOV 188a. This is a distinction from external mounted LIDAR where the ranging subassembly is often placed with direct line-of-sight access to reflections from the outgoing light pulses. Ranging subassembly 140 can contain a photodetector array 150 comprising a 2-D array of detector elements. Photodetector array 150 can be optically coupled to the output surface of CFOB 175a (e.g., coupled through free space, coupled using one or more lenses or FOV combiners). Photodetector array 150 can function to detect a set of light reflections, each with an arrival time and reflection direction within the FOV. Unlike a single core optic fiber cable (e.g., the fiber optic cables disclosed in U.S. Pat. No. 9,069,059) in which the arrival direction of each light reflection is lost as the reflection bounces along the core, the CFOB 175a instead indicates the arrival direction in the FOV of each light reflection by the position of the reflection (e.g., location in the sequence) at the output surface. In this way CFOB 175a can enable a detector array 150 to associate each of the 2D array of detector elements (e.g., element 151) with a portion of a FOV (e.g., portion 152). Detector 150 can detect a corresponding arrival direction associated with each light reflection by identifying the particular detector element (e.g., detector element 151) at which the reflection was detected. The CFOB components can function to create a relationship (e.g., a mathematical transfer function) between each detector element (e.g., element 151) in the photodetector array and a corresponding subset of directions in one or more FOVs (e.g., subset of directions 152). Therefore, the CFOBs enable an arrival direction to be associated with a light reflection at the detector array by identifying the particular detector element that senses the light reflection and a known relationship (e.g., transfer function) between the detector element and a direction or subset of directions in a FOV. Exemplary 2D photodetector arrays can be the 128×128 InGaAs array in TigerEye Flash Lidar from ASC of Santa Barbara Calif. or the Matrix Avalanche Photodiode (APD) array product line from Pacific Silicon Sensors Inc. of Westlake Village. Calif. or Part No. VFCH-GAZA (128× 128 InGaAs array) from Voxtel Inc. of Beaverton Oreg.

Ranging subassembly 140 can comprise a time-of-flight controller 153 (e.g., OPT9221 available from Texas Instruments). In one example controller 153 can generate control signals that instruct emitter to generate light pulses, instruct a FOV combiner to select a CFOB and associated FOV and instruct the photodetector array 150 to select a detector element (e.g., 151). Controller 153 can thereby cause photodetector array 150 to connect detector element 151 to a 3D location calculator 154 that can associate a direction (e.g., based on the selected CFOB and selected detector element) and a range associated with the time-of-flight.

Ranging subassembly 140 further comprises electronic circuitry (e.g., time-of-flight 3D location calculator 154) which computes for each light reflection in the set of light reflections a distance based on the corresponding arrival time, a 3D location indicative of a reflection location corresponding to the each light reflection, based on the distance (e.g., radius or radial distance from the ranging subassembly) and the corresponding arrival direction, 3D location calculator 154 can comprise a time-of-flight calculator coupled to each detector element that can calculate for each light reflection the time difference (e.g., time-of-flight) between when the light reflection was detected by a detector element and when the corresponding output light pulse was generated. The time-of-flight can be multiplied by the speed of light in a vacuum or in air to determine an estimate of the distance or range to a reflection location associated with each light reflection. Finally, a 3-D location estimator circuit 154 can calculate for each light reflection a 3D location according to the detected arrival direction or location of the detecting element in the detector array and the distance. In another aspect, the 3D direction corresponding to each light reflection from a FOV can be determined based in part on a stored value for the location and/or orientation (e.g., forward or rear facing) associated with the FOV (e.g., location: Left Rear Wing, orientation: Forward facing). The location and/or orientation of the corresponding FOV can be used to perform an operation on each light reflection to enable all 3D locations for all FOVs to be plotted in a single point cloud (e.g., a single point cloud representative of 3D locations of all reflection locations relative to a single origin). In yet another aspect, the 3D location calculator can receive initial data indicative of a time-of-flight (e.g., electronic charge data from a photodetector array element) and can correct the initial data based on a known time or distance offset associated with the length of control signal path 149 to the emitter and the length of the CFOB. For example, a distributed LIDAR system 105 can be installed in a vehicle and one or more time or distance offsets can be stored in controller 153 or 3D location calculator 154 to account for portions of the time-of-flight of each light reflection that are due to output pulse generation and transmission of the received light reflection from the input surface of the CFOB to the photodetector array 150.

Figure 1C:
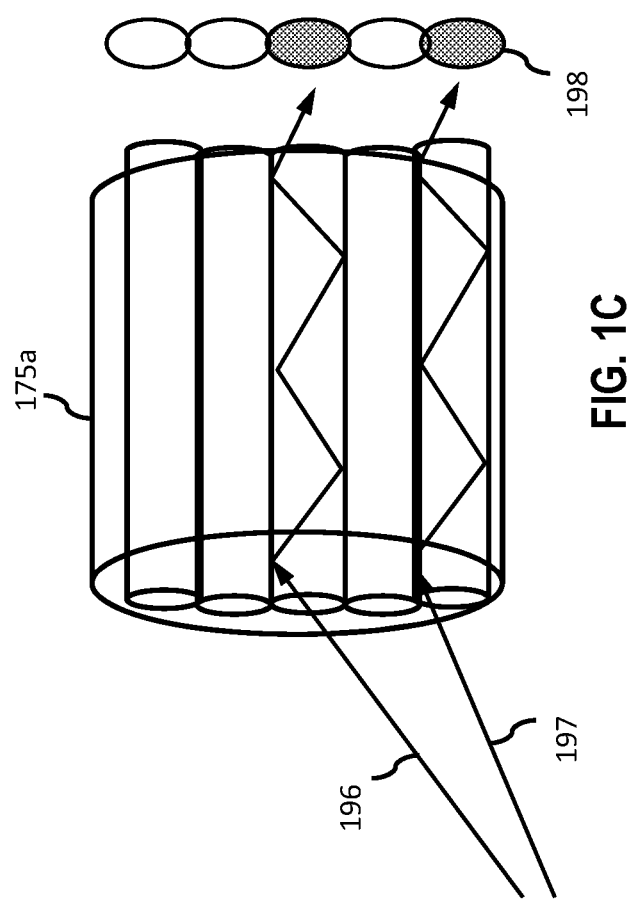
FIG. 1C illustrates a coherent fiber optic image bundle according to an embodiment of the present disclosure.

FIG. 1C illustrates an operating principal of a CFOB. Light rays incident on the input surface in directions 196 and 197 are transmitted in corresponding optical fibers. The sequence of fibers is repeated at the output surface. The light is internally reflected in two of the optical fibers but does not leak into neighboring optical fibers. Hence, while the light is homogenized (e.g., homogenized into uniform intensity spot 198) at the end CFOB the incoming direction can be inferred from the placement of the spot within the sequence.

Figure 2:
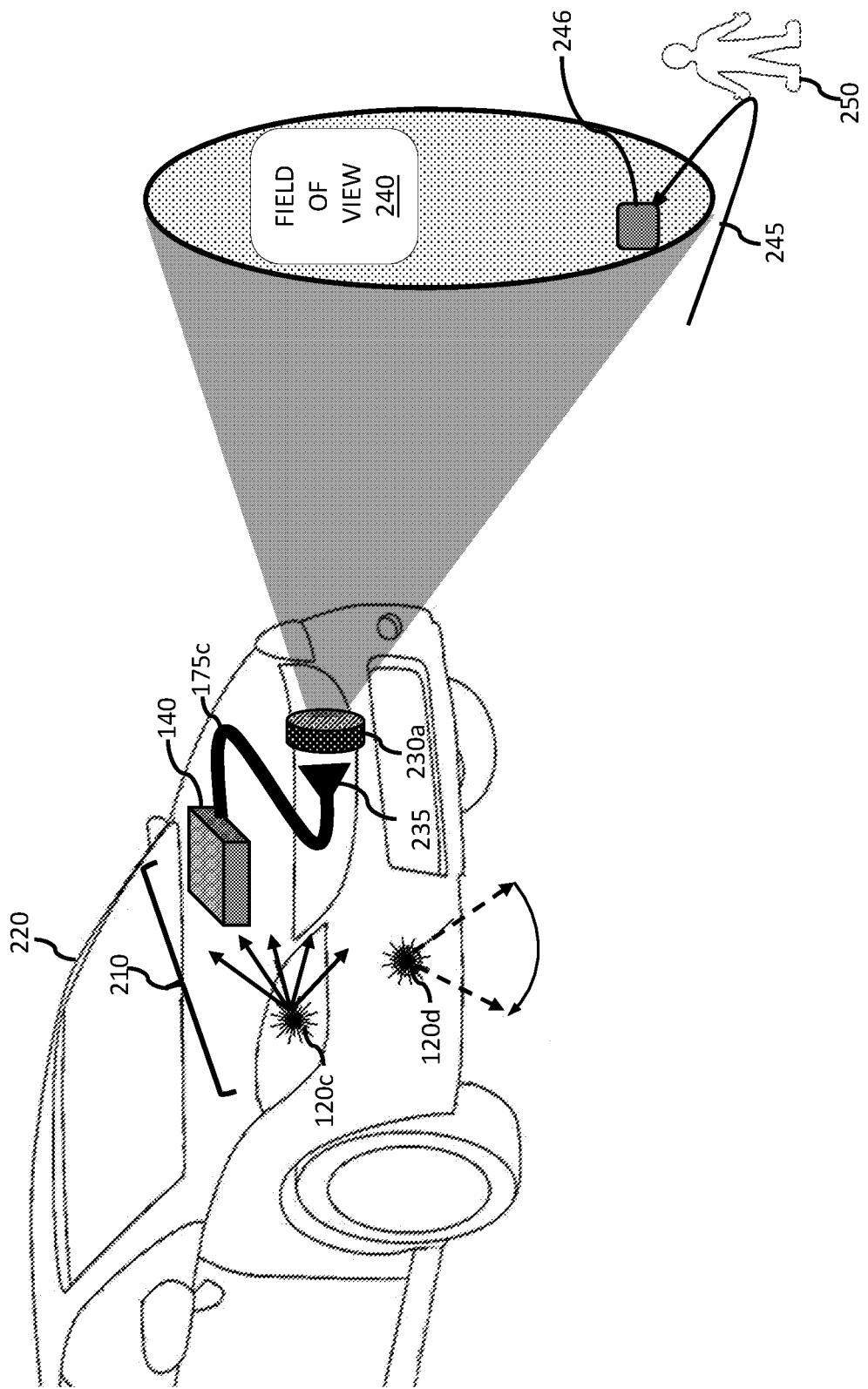
FIG. 2 illustrates a vehicle-based distributed LIDAR system with a remote ranging subassembly and a fiber optic image bundle, according to an embodiment of the present disclosure.

FIG. 2 illustrates another embodiment of a LIDAR system 210 integrated into a vehicle 220. In the embodiment of FIG. 2 remotely located LIDAR system 210 comprise a laser emitter 120c to generate a set of outgoing laser pulses in a plurality of directions simultaneously. Laser emitter 120c can comprise one or more laser diodes and a light diffuser to spread the laser pulses over a range of directions in the vicinity of the vehicle.

LIDAR system 210 further comprises a lens 230a and CFOB 175c to gather laser reflections (e.g., laser reflection 245 from person 250) and transmit the laser reflections to a remotely located ranging subassembly 140. Lens 230a can be a concave lens operable to gather laser reflections from a FOV 240 and focus the laser reflections onto the input end of CFOB 175c. CFOB 175c can have an expanded end 235 designed to gather laser reflections from distinct portions of FOV 240 into CFOB 175*c*. CFOB 175*c* transports laser reflections while keeping them separated thereby preserving an indication of the direction associated with a laser reflection 245, or a range of directions (e.g., illustrated by portion 246 of the FOV 240). Lens 230*a* and the input end of CFOB 175*c* are located with direct optical access to the environment surrounding vehicle 220. Exemplary locations include behind a grille, as part of a headlight or indicator light assembly, behind a window (e.g., a windshield) or located in an opening in a body panel. CFOB 175*c* can be embedded behind a body panel, or can be part of a wiring bundle (e.g., a headlight wiring bundle). Ranging subassembly 140 can be located inside the engine or passenger compartment. For example, ranging subassembly 140 can be located in close proximity to the automotive electronic control unit (ECU). Alternatively ranging subassembly 140 can be located with a processing subassembly (e.g., in a region of the vehicle devoted to computer vision or autonomous vehicle control). This is a departure from traditional LIDAR architectures where the ranging subassembly typically has direct line-of-site access to the FOV and transfers data at high speed to a processing subassembly.

In an alternative embodiment. LIDAR system 210 can comprise a scanning laser emitter 120*d*. Scanning laser generator 120*d* can be similar to the laser generator on a scanned LIDAR and can comprise one or more laser diodes and/or a laser positioner to position the laser beam. The laser positioner can be a mechanical positioner such as a rotating mirror found in mechanical LIDAR (e.g., the HDL-64e LIDAR from Velodyne Inc. of Morgan Hill Calif.)

Coherent Fiber Optic Image Bundles

FIG. 3A illustrates fiber optic cable 305 comprising two optical fibers 310*a* and 310*b*. Fiber optic cable 305 is illustrated for the purpose of comparing and contrasting a fiber optic cable with a coherent optical fiber image bundle. Single and multi-fiber optic cables have been used for optical data transmission. Coherent fiber optic image bundles share some fundamental elements with fiber optic cables (e.g., core optic fiber strands) but have several structural and architectural differences designed to enable image transfer rather than signal transfer. Fiber optic cable 305 comprises two optical fibers 310*a* and 310*b*. Each optical fiber comprises an outer jacket 312 for insulation and environmental protection, a strength member 314 to prevent breakage, a glass or plastic core 318 and cladding 316 to retain light in the core. FIG. 3B illustrates a fused CFOB, comprising a multitude of cores each with cladding material to retain light through internal reflection. The cores and cladding material are fused such that the sequence of fibers at the input surface 322 is repeated at the output surface 324.

In one aspect, the ratio of core material to the total area of the input surface is called the packing fraction. In CFOBs the packing fraction is high (e.g., >60%) since the objective is to transfer a 2D array of light reflections (e.g., an image) from the input end to the output end.

Looking at FIGS. 3A and 3B two distinctions between fiber optic cable 310 and CFOB 320 are apparent. Firstly, a fiber optic cable 310 is designed to protect and isolated one or several cores and hence the packing fraction is low (e.g., <10%), due in part to the thickness of the cladding and strength members. Secondly, fiber optic cable 310 does not conserve the spatial relationship between the positions of the cores at the ends of the fiber optic cable.

To further illustrate differences in the structure of CFOBs a brief overview of CFOB construction is presented and constituent components are illustrated in FIGS. 3C and 3D.

A first step of constructing a CFOB involves assembling of a monofiber. FIG. 3C illustrates a monofiber 330 comprising a core 335 and a cladding 340. In comparison to fiber optic cables for data transport, the packing fraction is important in CFOBs and hence the choice of core shape can improve packing fraction, by reducing the space between fibers. For example, core 335 is approximately a square, resulting a greater packing fraction than a circle of similar cross sectional area. The monofiber 330 is then heated and drawn down to size (e.g., 1-100 um in diameter), thereby fusing the cladding to the core.

FIG. 3D illustrates a second step of constructing a CFOB, comprising a multi-fiber boule 350 made from thousands of monofibers. The multi-fiber boule can further comprise extra-mural absorption fibers. Extra-mural absorption (EMA) fibers are special black absorbing fibers, inserted between (or in place of) mono fibers, which will absorb stray (scattered) light in the fiber optic material. The multi-fiber boule is fused together in a heating process and drawn down to the final elongated shape. Importantly the sequence of monofibers can remain consistent throughout the process. The drawing process can generate rigid fused CFOBs. The ends of the CFOBs can be expanded to enable a larger surface on which to focus light reflections with a lens. FIG. 3E illustrates an incoherent fused fiber bundle 360 for comparison with the coherent bundle 320 in FIG. 3B.

FIG. 3F illustrates a flexible CFOB 370 with rigid fused ends 375 and 380. A flexible CFOB can be advantageous for vehicle (e.g., car) enabling installation in wire bundles, and behind body panels. Flexible CFOB 370 can be constructed by bathing the center section of a fused CFOB in a chemical bath to dissolve the bonds between individual monofiber, thereby causing the center section to be flexible and the ends to remain rigid in order to maintain the coherent light transport properties. For the purpose of this disclosure a flexible CFOB is a fiber optic bundle where the ends are fused in a coherent array and an elongated center section is flexible such that the relative arrangement of the fibers can change.

Dynamically Steerable Laser Range Finder

FIG. 4A illustrates several components of an exemplary dynamically steered laser range finder 405 in accordance with an embodiment of this disclosure. Laser range finder 405 can contain a steerable laser assembly 406. Laser range finder 405 can contain a laser steering parameter generator 410 to receive sensor data and generate laser steering parameters based on the sensor data. Sensor data can be received from sensor data processor 475 or directly from a sensor. Sensor data can indicate one or more aspects of the local environment. Laser steering parameter generator 410 can function to generate laser steering parameters (e.g., instructions) and transmit the parameters to the steerable laser assembly 406. Laser steering parameter generator 410 can transmit the parameters in a timed manner, such that upon receiving each laser steering parameter the steerable laser assembly 406 executes or reacts to the laser steering parameter. Alternatively, laser steering parameters can be transmitted in a batch or instruction file that is executed over a period of time by the steerable laser assembly 406.

Steerable laser assembly 406 can comprise one or more laser generators 420 and a laser positioner 430. The one or more laser generators 420 (often shortened to "lasers") can be laser diodes to produce one or more laser beams (e.g., beam 435) at one or more locations in the FOV determined by the laser positioner 430. Laser positioner 430 functions to steer one or more laser beams (e.g., beam 435) in the FOV based on the laser steering parameters. Laser positioner 430 can mechanically steer a laser beam from laser generator 420. Rotating LIDARs often use a mechanically steered laser positioner. An exemplary mechanically steered laser positioner 430 can include mechanical means such as a stepper motor or an induction motor to move optical components relative to the one or more laser generators. The optical components in an exemplary mechanical laser positioner can include one or more mirrors, gimbals, prisms, lenses and diffraction grating. Acoustic and thermal means have also been used to control the position of the optical elements in the laser positioner 430 relative to the one or more laser generators 420. Laser positioner 430 can also be a solid state laser positioner, having no moving parts and instead steering an incoming laser beam using electronic means to steer the laser beam in an output direction within the FOV. For example, an electronically steerable laser assembly can have a solid state laser position comprising a plurality of optical splitters (e.g., Y-branches, directional couplers, or multimode interference couplers) to split an incoming laser beam into multiple portions. The portions of the incoming laser beam can then be transmitted to a plurality of delay line where each portion is delayed by a selectable amount (e.g., delaying a portion by a fraction of a wavelength). Alternatively the delay lines can provide wavelength tuning (e.g., selecting slightly different wavelengths from an incoming laser beam). The variable delayed portions of the incoming laser beam can be combined to form an output laser beam at an angle defined at least in part by the pattern of delays imparted by the plurality of delay lines. The actuation mechanism of the plurality of delay lines can be thermo-optic actuation, electro-optic actuation, electro-absorption actuation, magneto-optic actuation or liquid crystal actuation. Laser positioner 430 can be combined with one or more laser generators 420 onto a chip-scale optical scanning system such as DARPA's Short-range Wide-field-of-view extremely agile electronically steered Photonic Emitter (SWEEPER). Laser positioner 430 can also be one or more electromechanically mirrors such as the array of electromechanical mirrors disclosed in U.S. Pat. No. 9,128,190 to Ulrich et al. For the purpose of this disclosure a steerable laser assembly (e.g., 406 in FIG. 4A) is considered a dynamically steerable laser assembly if the laser positioner (e.g., positioner 430) can dynamically steer laser pulses in the course of a scan of a field of view. In some embodiments a dynamically steerable laser assembly has a laser positioner that comprises circuitry to process instructions (e.g., laser steering parameters) during a scan of a FOV and a reconfigurable mechanical or electronic tuning portion to direct one or more laser pulses during the scan. For example, a steerable laser assembly can have 64 lasers and a laser positioner comprising a simple rotating mirror. In contrast a dynamically-steerable laser assembly may have 64 lasers and an optical beam steering array operable to steer laser pulses from each of the lasers dynamically based a stream of instructions (e.g., laser steering parameters) provided during a scan of a FOV.

Laser range finder 405 can further comprise a ranging subassembly 438. Ranging subassembly 438 can have a detector 440 that can comprise a photodetector 450 (e.g., photodiodes, avalanche photodiodes, PIN diodes or charge coupled devices CCDs, single photon avalanche detectors (SPADs), streak cameras). Photodetector 450 can also be a 2D photodetector array such as a CCD array or an InGaAs array. Detector 440 can further comprise, signal amplifiers and conditioners 452 (e.g., operational amplifiers or transconductance amplifiers) to convert photocurrent into voltage signals, Ranging subassembly 438 can further comprise circuitry such as a time of flight calculator circuit 455 (e.g., a phase comparator) and an intensity calculator 460. The construction of the steerable laser assembly 406 can co-locate detector 440 and steerable laser assembly 406 such that detector 440 is pointed in the direction of the outgoing laser beam and can focus the detector on a narrow part of the FOV where the reflected light is anticipated to come from.

Steerable laser assembly 406 can contain a time of flight calculator 455 to calculate the time of flight associated with a laser pulse striking an object and returning. The time of flight calculator 455 can also function to compare the phase angle of the reflected wave with the phase of the outgoing laser beam and thereby estimate the time-of-flight. Time of flight calculator 455 can also contain an analog-to-digital converter to convert an analog signal resulting from reflected photons and convert it to a digital signal. Laser range finder 405 can contain an intensity calculator 460 to calculate the intensity of reflected light. Laser range finder 407 can further comprise a 3D location calculator 464 to calculate a 3D location associated with a laser reflection 445.

Laser range finder 405 can contain a data aggregator 465 to gather digitized data from time of flight calculator 455 and intensity calculator 460 or 3D location calculator 464. Data aggregator 465 can group data into packets for transmitter 470 or sensor data processor 475. Laser range finder 405 can contain a transmitter 470 to transmit data packets. Transmitter 470 can send the data to a processing subassembly (e.g., a computer or a remote located sensor data processor) for further analysis using a variety of wired or wireless protocols such as Ethernet, RS232 or 802.11.

Laser range finder 405 can contain a sensor data processor 475 to process sensor data and thereby identify features or classifications for some or all of the FOV. For example, data processor 475 can identify features in the FOV such as boundaries and edges of objects using feature identifier 480. Data processor 475 can use feature localizer 485 to determine a region in which the boundaries or edges lie. Similarly a classifier 490 can use patterns of sensor data to determine a classification for an object in the FOV. For example, classifier 490 can use a database of previous objects and characteristic features stored in object memory 495 to classify parts of the data from the reflected pulses as coming from vehicles, pedestrians or buildings. In the embodiment of FIG. 4A sensor data processor 475 is located close to the steerable laser assembly (e.g., in the same enclosure), thereby enabling processing of the sensor data (e.g., reflection ranges) without the need to transmit the reflection data over a wired or wireless link. FIG. 4A is an example of an embedded processing architecture where the latency associated with a long distance communication link (e.g., Ethernet) is avoided when transmitting range data to the sensor data processor.

FIG. 4B illustrates several components of a dynamically steered laser range finder 407 in accordance with an embodiment of this disclosure. In this embodiment the data processing and laser steering parameter generation components are remotely located from the steerable laser assembly 406. Steerable laser assembly can contain one or more lasers (e.g., laser generator 420), and a positioner 430, that can include circuitry to dynamically steer a laser beam from the laser generator based on processing laser steering parameters. Laser range finder 407 can contain a receiver 415 to receive laser steering parameters from the remotely located laser steering parameter generator 410. Receiver 415 can be a wired or wireless receiver and implement a variety of communication protocols such as Ethernet, RS232 or 802.11. Transmitter 470 can transmit data from the time of flight calculator 455 intensity calculators and 3D location calculator 464 (in FIG. 4A) to a remote located data aggregator 465.

FIG. 5 illustrates several components of a laser range finder 510 according to several embodiment of the present disclosure. Laser range finder 510 can contain a processing subassembly 520, a steerable laser assembly subassembly 505 and a communication link 530 for linking the processing and steerable laser assemblies. Processing subassembly 520 can include one or more processors (e.g., sensor data processor 475 in FIGS. 4A and 4B) one or more transceivers (e.g., a transceiver including receiver 415 and transmitter 470) such as an Ethernet. RS485, fiber optic. Wi-Fi, Bluetooth. CANBUS or USB transceiver. Processing subassembly 520 can also include a computer-readable storage medium (e.g., flash memory or a hard disk drive) operable to store instructions for performing a method to detect and utilize a remote mirror (e.g., a roadside mirror). Steerable laser assembly 505 can include a laser generator 420 and a laser positioner 430 to steer a laser beam at one or more locations in the FOV based on the laser steering parameters. Laser positioner 430 can include one or more optical delay lines, acoustic or thermally based laser steering elements. In a solid state steerable laser assembly laser positioner 430 can function to receive instructions (e.g., laser steering parameters) and thereby delay portions of a laser beam (i.e., create a phase difference between copies of the laser beam) and then combine the portions of the laser beam to form an output beam positioned in a direction in the FOV. A mechanical laser positioner 430 can be a mirror and mirror positioning components operable to receive input signals (e.g., PWM input to a steeper motor) based on laser steering parameters and thereby steer the mirror to position a laser in a direction in the FOV. Steerable laser subassembly 505 can also include a detector 440 comprising components such as light sensor(s) 450, time of flight calculator 455 and light intensity calculator 460 and 3D location. Steerable laser subassembly 505 can include one or more transceivers (e.g., receivers 415 and transmitters 470) such as Ethernet, RS485, fiber optic, Wi-Fi, Bluetooth, CANBUS, or USB transceivers. Communication link 530 can be a wired link (e.g., an Ethernet. USB or fiber optic cable) or a wireless link (e.g., a pair of Bluetooth transceivers). Communication link 530 can transfer laser steering parameters or equivalent instructions from the processing subassembly 520 to the steerable laser assembly 505. Communication link 530 can transfer ranging data from the steerable laser assembly to the processing subassembly 520.

When operable linked to steerable laser assembly 505 the processing subassembly 520 can perform one or more embodiments of the method to find, utilize and correct for a remote mirror in the FOV of laser range finder 510.

Laser steering parameters can be instructions operable to steer a laser beam with a steerable laser assembly in a FOV or steer a controllable magnifier. For example, in an electronically scanned laser range finder (e.g., model S3 from Quanergy Inc. of Sunnyvale, Calif.) a set of laser steering parameters can define aspects of the output laser beam such as the direction, pulse duration, intensity and spot size. Laser steering parameters can function to instruct the laser generator 420 to define aspects such as laser spot size, intensity and pulse duration. Laser steering parameters can instruct laser positioner 430 how to delay portions of the laser beam and combine the delayed portions to define the direction of the output laser beam. A mechanically steered LIDAR can perform dynamic steering by using laser steering parameters to dynamically position the laser in the FOV or to dynamically position a mirror to reflect the laser beam in a desired direction. Laser steering parameters can be operable instruct a steerable laser assembly to steer a laser beam and can be transmitted to the steerable laser assembly as a file. Alternatively laser steering parameters can be stored in a file and can be sequentially processed and used to generate electrical signals operable to generate and guide a laser beam. For example, laser steering parameters similar to the parts of a stereolithography (.STL) file. STL files are commonly used as instruction sets to position extruder heads and cutting heads in 3D printers, cutting tools and laser stereolithography. A set of laser steering parameters can include a start location indicating where one or more other laser steering parameters should be applied. A Start location can be a point in a Cartesian coordinate system with an associated unit of measure (e.g., 20 mm to the right and 20 mm above the lower right corner of the lower left corner of the field of view). In several laser range finders the FOV is described in terms of angular position relative to an origin in the FOV. For example, a starting point could be +30 degrees in the horizontal direction and +10 degrees in the vertical direction, thereby indicating a point in the FOV.

A laser steering parameter can be a region width or a region height. The width and height of can be expressed in degrees within the FOV. One exemplary set of laser steering parameters could include a start location, region width and region height thereby defining a four sided region in the FOV. Other laser steering parameters in the exemplary set of laser steering parameters can indicate how to tailor a scan within this region, such as laser scan speed, laser pulse size or number of laser pulses.

A laser steering parameter can be one or more region boundaries defining the bounds of a region. A laser steering parameter can be one or more laser pulse locations. Pulse locations can provide instructions to a steerable laser to move to corresponding positions in the FOV and generate on or more laser pulses. In some embodiments the laser can be generating a laser beam while being steered from one location to another and can dwell for some time at the laser pulse locations. In other embodiments the steerable laser can use these points to generate discrete pulses the defined locations. In such embodiments the laser beam can be generated at discrete pulse locations and can dwell at the pulse location for some time.

A laser steering parameter can be one or more path waypoints, which define points in a FOV where a steerable laser can traverse or points at which the steerable laser can implement direction changes. It would be obvious to a person of skill in the art that several laser steering parameters can produce equivalent or nearly equivalent regions of non-uniform pulse density.

FIG. 6 illustrates a LIDAR system 610 distributed in a vehicle 620, that uses three CFOBs 175d-f to gather laser reflections from a variety of FOVs (e.g., FOV 620a and 620b) at a shared receiver assembly 140 located remotely from the FOVs. In the embodiment of FIG. 6 emitters 120c and 120e create a set of outgoing light pulses in a plurality of directions. LIDAR system 610 can comprise a set of lenses (e.g., 230b and 230c) that function to gather light reflections from some of the light pulses from within a corresponding FOV (620a and 620b) and focus the laser reflections onto an input surface of a corresponding CFOB (e.g., CFOBs 175d-f). LIDAR system 610 can perform laser ranging in FOV 620a located in front of vehicle 220 using lenses and CFOBs that can be integrated into headlight assemblies. Other flexible CFOBs can be arranged within the structure of vehicle 220 to reach the rear of the vehicle and gather laser reflections from the rear or rear blindspots (e.g., the left and right of the vehicle). In one embodiment CFOB 175*f* and lens 230*d* can be co-located with a backup camera, an ultrasonic backup sensor or located in a rear light assembly. In a related embodiment a distributed LIDAR system in an articulated tractor-trailer vehicle (e.g., an 18-wheel truck) can further comprise one or more fiber-optic connectors to connect one or more CFOBs within a trailer to a receiver assembly 140 in the tractor portion. A fiber-optic connector comprising two connector halves can connect two ends of two CFOBs to form a single continuous CFOB. Alignment features in a fiber-optic connector can align the two CFOBs thereby ensuring the spatial arrangement of reflections in the connected CFOBs is maintained between the input surface of a first CFOB (e.g., located in the trailer) the output end of a second CFOB (e.g., located in the tractor of an articulated vehicle).

FIG. 7 illustrates a distributed LIDAR system 710 in a vehicle 220. In the embodiment of FIG. 7 lens 230*b* and 230*c* can have a wide FOV (e.g., FOV 720*a* and 720*c* can be 60 degrees azimuthal and 60 degrees elevation), thereby providing LIDAR coverage to the sides of vehicle 220. Lens 230*e* can be designed to focus a narrow FOV 720*b* onto the input surface of a CFOB (e.g., 20 degrees azimuthal and 20 degrees elevation), thereby providing greater resolution for detecting objects ahead of vehicle 220. In one aspect, CFOB 175*h* can have a few fused optic fibers (e.g., 500-1000) and can be positioned in a location that can be too small to accommodate a complete LIDAR (e.g., wing mirror or a spoiler) and can transport laser reflections from in a FOV 720*d*. In some embodiments, several small CFOBs can project laser reflections onto a detector array simultaneously. For example, FOV combiner 160 can spatially combine laser reflections from several small CFOBs such as those on wing-mirrors, or in wheel arches and thereby use a single detector array 150 to sense light reflections in multiple FOVs simultaneously. The same FOV combiner 160 can time multiplex the spatially combined smaller FOVs (e.g., 720*d*) with larger FOVs providing more reflections and therefore requiring dedicated access to the photodetector array 150. For example, FOV combiner 160 can combine reflections from 6 small CFOBs (e.g., 100,000 fused fibers) each measuring reflections from a 10×10 degree FOV (e.g., 720*d*). FOV combiner can further timeshare (e.g., time multiplex) the photodetector array 150 between the combined reflections from the smaller CFOBs (e.g., 175*h*) and 3 large CFOBs (e.g., 1 million fibers) that gather reflections from important broad FOVs (e.g., 720*c*) or high resolution reflections from a narrow FOV (e.g., FOV 720*b*). Smaller CFOBs can provide lower resolution LIDAR coverage than larger CFOBs in areas such as blindspots, wheel arches, doors and bumpers. In this way CFOBs can be supplied to replace backup sensors or blindspot warning sensors.

FIG. 8 illustrates several components of LIDAR system 810 according to an embodiment of the present disclosure. A ranging subassembly 140 is located remotely from several FOVs (e.g., FOVs 720*a-c*) and functions to determine 3D locations corresponding to light reflections from light pulses in a set of outgoing light pulses (e.g., pulse 125) within one of the FOVs. Ranging subassembly 140 can comprise electronic circuitry (e.g., controller 820) to transmit signals 825 to light generators (e.g., flash light generator 120*a* or scanned light generator 120*d*). Signals 825 cause the light generators to generate a set of one or more outgoing light pulses (e.g., pulse 125). Light pulses can be coherent light (e.g., laser light) or incoherent light (LED flashes). Controller 820 can comprise signal generation and transmission circuitry such as a memory, and an output transistor to generate signals 825. Controller 820 can further comprise a timing circuit to measure the time between the generation of signal 825 and the detection of corresponding reflections. Alternatively, controller 820 can send a timing signal to other circuitry (e.g., time-of-flight calculator 455 or 3D location calculator 464. The timing signal can indicate that a signal 825 has been sent to one or more light generators.

Reflections from light pulses (e.g., reflections 245 and 850*a*) can be focused by lenses (e.g., 230*c*) onto the input surfaces of CFOBs 175*d*, 175*e* and 175*i*. In one aspect. CFOB 175*i* and lens 230*e* can gather reflections 850*a* in a FOV 720*f* that is narrow subset of a wider FOV 720*e*. This is useful because LIDAR system 810 can thereby alternate between ranging at a first resolution (e.g., 2 degrees azimuth per detector element) in a wide FOV 720*e* and ranging with a second finer resolution (e.g., 0.1 degrees of azimuthal angular range per detector element) in a narrower FOV 720*f*. LIDAR system 810 can further comprise one or more FOV positioners 860 that can control the mechanical position or relative spatial arrangement of a CFOB (e.g., 175*i*) and lens (e.g., 230*e*) to dynamically alter the properties of a corresponding FOV 720*f*. For example, lens 230*e* can be a zoom-lens comprising a set of three lens forming an a-focal zoom system or a vari-focal lens. FOV positioner 860 can receive signals from the ranging subassembly 140 can convert the signals to mechanical movements operable to pan tilt or zoom lens 230*e* and thereby position FOV 720*f*.

In another aspect, ranging subassembly 140 can further comprise an enclosure with separable optical connectors (e.g., connector 815). Optical connector 815 enables a CFOB to be attached and detached from the ranging subassembly. The optical connector can contain an optical pass-through (e.g., a piece of glass) and can contain a feature to register the CFOB relative to the ranging subassembly enclosure, thereby ensuring a precise orientation for the CFOB that can be related to the input FOV. For example, the registration feature an be a detent or a pin that ensures the optical connector connects to the CFOB to the ranging subassembly enclosure in only one specific orientation of the CFOB, thereby ensuring a specific orientation of the output surface and alignment of the fiber bundle relative to the photodetector array 150. Detachable optical connectors (e.g., 815) provide for replacement of either the associated CFOB or the range subassembly 140, should either component require replacement. Optical connectors further enable the ranging subassembly to be sealed (e.g., potted or permanently sealed to avoid water ingress) similar to sealing requirements on automotive electronics in the engine compartment (e.g., ingress protection standard 67 or IP67). Optical connectors 815 can be part of or optically aligned with a FOV combiner 160 in ranging subassembly 140. In another aspect, ranging subassembly 140 can contain a fiber optic taper 840 comprising an expanded section of fused optic fibers similar to a CFOB, which functions to magnify or reduce the light reflections coming from the FOV combiner 160.

FIG. 9 illustrates several exemplary FOV combiners 160 that can function to share several FOVs with a photodetector array, using either spatial combination of FOVs, time multiplexing of FOVs or both spatial and time multiplexing. Exemplary FOV combiners can be a spatial FOV combiner 910, a solid-state electronically switchable mirror multiplexor 920, mechanical optical multiplexor 930 or a micromirror array 940.

FIG. 10A illustrates a spatial FOV combiner 1010 that accepts light reflections from a plurality of CFOBs and reduces or condenses the light reflections in order to project light reflections from several FOVs simultaneously onto a detector or detector array. In one embodiment spatial FOV combiner can comprise a fiber optic taper while in another embodiment spatial FOV combiner can be a magnifying lens. Spatial FOV combiner 1010 can receive light reflections from several FOVs at the output surfaces 1020*a-c* of a plurality of CFOBs 175*h-j*. Spatial FOV combiner can be arranged such that light reflections from several FOVs are operable to arrive at several portions 1030*a-c* of an input surface 1040 and are reduced or in some cases magnified and transmitted to an output surface 1050. This configuration can enable light reflections from several input CFOBs to be simultaneously sensed by a photodetector array 150. It this embodiment portions 1030*a-c* of input surface 1040 align directly with the output surfaces of the CFOBs. In other embodiment various components can act as intermediaries guiding the light reflections from each CFOB to a corresponding input surface or portion of an input surface e.g., 1030*a* in the spatial FOV combiner 910. Exemplary intermediary components can include optical connectors, optical windows, lenses or fiber tapers or optical filters. In one aspect, a fiber optic taper reduces or increases the cross-section of each constituent optic fiber between the input and output surfaces.

One challenge with a spatial FOV combiner comprising a fiber optic taper or a lens is that the space between the portions 1030*a-c* at the input surface (e.g., surface 1040) is often recreated at the output surface 1050. Hence the ratio of portions 1030*a-c* to total area of surface 1040 is transferred to the output surface and thereby determines, and in some cases limits, the utilization of the detector array (e.g., percentage of the detector array that is used for range detection). FIG. 10B illustrates a spatial FOV combiner 1060 that address this challenge by individually routing multiple CFOB output surfaces 1020*a-c* to the output surface 1050, thereby increasing the utilization of the detector array 150 to sense light reflections from multiple FOVs simultaneously. Spatial FOV combiner 1060 can comprise several light conduits each comprising an input surface e.g., 1030*a* an output surface e.g., 1070*a* and an optically transmitting portion between the input and output surfaces. Exemplary conduits can be glass or plastic pass-through or optical connectors. The conduits function to increase utilization of the detector array 150 by arranging the light reflections from the plurality of CFOBs close together in a shape corresponding to the shape of the detector array. In one alternative embodiment spatial FOV combiner 1060 can comprise an input surface 1040 that simply holds the output surfaces of CFOBs 175*h-j* at an orientation such that at the output surface 1050 the light reflections from the various CFOBs generate a dense arrangement with a shape similar to the shape of the detector array.

FIG. 11 illustrates a FOV combiner embodied as a solid state switchable mirror multiplexer 920 that functions to time multiplex light reflections from a plurality of CFOBs onto a photodetector array 150. Recent advancements in reflective liquid crystal materials have made electronically switchable mirrors possible (e.g., the e-Transflector product line available from Kent Optoelectronics of Hopewell Junction, N.Y.). Solid-state switchable mirror multiplexer 920 can comprise a plurality of switchable mirrors 1110*a* and 1110*b* and mirror control circuitry 1120 to select one or more mirrors. In the unselected state switchable mirror 1110*a* can be transparent and can transmit light reflection(s) 1130*a* from CFOB 175*k* without deflecting the light reflections towards detector array 150. Conversely, in the selected state, switchable mirror 1110*b* can be reflective thereby deflecting light reflections 1130*b* from the FOV corresponding to CFOB 175*l* towards photodetector array 150. In this way mirror control circuitry 1120 can make none, one, some or all of a set of electronically switchable mirrors transparent or reflective and thereby time share the reflected or transmitted light refection's from a plurality of CFOBS onto a common detector array.

FIG. 12 illustrates an exemplary mechanical optical multiplexor 930 comprising a rotating mirror 1210 that rotates in direction 1220, thereby periodically deflecting laser reflections (e.g., reflections 1230) from a plurality of CFOBs 175*n* and 175*o* onto a detector array 150. In an alternative embodiment of a mechanical optical multiplexor a mirror positioner such as a stepper motor or an actuator can switch the position of a movable mirror, thereby periodically alternating between a plurality of CFOBs and thereby time multiplexing light reflections from a plurality of FOVs.

FIG. 13 illustrates a micromirror array 1310 placed in the field of view 1325 of a photodetector 1315 that can operate to multiplex light reflections from the output ends of two CFOBs 175*n* and 175*o* onto the photodetector array 1315. Exemplary micromirror arrays include the DLP6500FLQ DLP chip available from Texas Instruments Inc. of Santa Clara Calif. Modern micromirror array chip can comprise over 4 million electronically positioned micromirrors (e.g., mirror 1320). Reflection positioner 1330 can be similar to an LCD driver chip and can signal individual micromirrors or groups of micromirrors to change position. In the position shown in FIG. 13 the micromirror array deflects light reflections from CFOB 175*n* onto photodetector 1315, while light reflections from CFOB 175*o* are not deflected towards the photodetector array 1315.

The micromirror array 1310 can be used to dynamically select inputs for the FOV 1325 of detector 1315. Micromirror array 1310 can occupy the entire FOV 1325 of a detector or photodectector array 1315. In various configurations the micromirror can then present to the detector 1315 light reflections from one of multiple CFOBs, light reflection multiple CFOBs simultaneously with light reflections from each CFOB directed to different parts of the detector. Alternatively, micromirror 1310 can then present to the detector 1315 light reflections from multiple CFOBs simultaneously with light from each CFOB directed to overlapping parts of the detector. Mirrors (e.g., 1320) in some of all of the micromirror array can be arranged at different angles to form angled reflectors to focus light reflections from all or portions of a CFOB onto a single detector element or a few detector elements. This can be useful for detecting if any optical fiber in a portion of the output surface of a CFOB is carrying a light reflection. Alternatively micromirrors can form a convex mirror arrangement, thereby spreading light reflections from a portion of the CFOB output surface over a wider portion of the detector (e.g., a wider range of elements in a detector array). In this way the micromirror array can magnify, combine, select and overlap portions of one or multiple CFOBs onto a photodetector 1315. The usefulness of the micromirror array is enhances by available light reflections from multiple FOVs based on the plurality of CFOBs Lidar with a Micromirror Array for Dynamic Reflection Distribution In a related group of embodiments, a flash LIDAR can use a micromirror array to dynamically select one or more subsets of a FOV to transmit to a detector or detector array, and thereby improve the LIDAR resolution. While 2D digital cameras and 3D time-of-flight cameras are similar in some aspects, the different objectives makes scaling detector array in LIDARs challenging. Specifically, 2D digital cameras integrate the charge (photon current) at each pixel on the CCD array over a relatively large acquisition time (e.g., 10-100 milliseconds) often with little regard for when photons arrive within the acquisition time window. Subsequently, a readout circuit can read the charge stored on many pixels in a serial or parallel manner. Advances in the speed of readout circuitry have enables the resolution of 2D cameras (e.g., number of pixels) to outpace the complexity of the corresponding readout circuitry. For example, readout circuits in 2D cameras are servicing increasing numbers of pixels per readout circuit, thereby enabling higher resolution 2D digital camera. Conversely, 3D time-of-flight cameras are designed to determine when light reflection arrive at the detector array and thereby determine distance to a reflection source. Each pixel often has associated electronics (e.g., transimpedance amplifiers, phase comparators or timing circuits). Hence LIDAR resolution (numbers of pixels per array) has lagged behind that of 2D digital cameras and ways to increase this resolution remain a challenge.

FIG. 14A illustrates an embodiment of a flash LIDAR using a micromirror array to dynamically select subsets of the reflected FOV and thereby improve the resolution. Consider the following example: many state-of-the-art focal plane arrays for IR wavelengths have 128×128 elements (e.g., the TigerCub Flash Lidar available from Advanced Scientific Concepts Inc. or Santa Barbara Calif.). Consider that for a 64 degree azimuthal FOV each element receives laser reflections from 0.5 degrees of the FOV. This may seem like a high resolution but consider that at 100 m distance from such a flash lidar a 0.5 degree FOV resolution results in a 1 meter capture area (e.g., 100×Tan(0.5 degrees). Hence an unaided 128×128 element detector array has a 1 square meter resolution at 100 m. A challenge is to enhance this resolution and one way to achieve this is to only accept laser reflections from a portion of each 0.5×0.5 degree region of the FOV that serves each element in the array.

FIGS. 14A and 14B illustrate an embodiment where a micromirror array 1310 selects a sequence of portions of an incoming FOV to present to a detector 1405. In one example micromirror 1310 has 8 million micromirrors. Hence, the ratio of micromirrors to detector elements can be large (e.g., 488 micromirrors per detector element for a 128×128 element detector array and an 8M mirror DLP chip). Turning to FIG. 14A, micromirror array 1310 can be positioned in the FOV of a detector array 1405. Micromirror array 1310 can also have a FOV 1420 comprising the set of all directions that a light reflection can reach the micromirror array 1310. In one operating mode, portions 1430a and 1430b of the micromirror FOV 1420 can be focused using input lens 1440 onto corresponding portions 1450a and 1450b of micromirror array 1310. In one example the portions 1450a and 1450b can each comprise 488 micromirrors (corresponding to 8 million total mirrors divided by 128×128 total detector elements).

In one aspect, reflection positioner circuitry 1330 can function to adjust the 488 micromirrors in each of the portions 1450a and 1450b to focus light reflections from the corresponding portions of the micromirror FOV onto corresponding detector elements 1460a and 1460b respectively. For example, reflection positioner circuitry 1330 can instruct the 488 micromirrors in portion 1450a to form a concave reflector with a focal distance equal to the detector array. This can provide operation similar to direct illumination of the detector element by laser reflections from a portion of the FOV. This mode can be useful for detecting weak reflections, since many micromirrors can combine laser reflections from a single part of the FOV (e.g., a 0.5×0.5 degree portion corresponding to 488 micromirrors).

FIG. 14B illustrates another related operating mode in which a micromirror array utilizes only a fraction of the micromirrors in the portions 1450a and 1450b to deflect light reflections from corresponding portions of the FOV 1420 towards the detector array 1405. In the embodiment of FIG. 14B electronic circuitry 1480 can comprise reflection positioner circuitry 1330 and can instruct micromirror array 1310 to direct a first quarter of each group of 488 micromirrors (e.g., subsets 1470a and 1470b within portions 1450a and 1450b) towards the detector array. A controller 820 in electronic circuitry 1480 can instruct emitter 120a to emit a flash or beam of light, thereby illuminating some or all of FOV 1420. The detector array 1405 can measure and record the light reflections on the detector elements (e.g., a 128×128 array). Electronic circuitry 1480, including reflection positioner circuitry 1330 can subsequently instruct the micromirror array 1310 to position a second quarter of the 488 micromirrors in each portion (e.g., portion 1450a and 1450b) towards corresponding detector elements 1460a and 1460b. Controller 820 can instruct the light emitter to generate a second light pulse operable to illuminate some or all of a scene visible in FOV 1420. Detector array 1405 can again detect a second set of light reflections from the 128×128 detector elements. The electronic circuitry can generate several configurations thereby positioning a plurality of subsets of the micromirror in each portion of the array towards the detector array. Following each configuration of the micromirror the electronic circuitry can instruct the light emitter to generate one or more light pulses. Following each light pulse a set of light reflections are detected by detector array 1405. Detector array 1405 can detect the time of arrival of reflections and an arrival direction. The arrival direction can be indicated by the detector element (e.g., 1460a or 1460b) in the detector array that detects each light reflection. Electronic circuitry 1480 can further comprise a 3D location calculator 464. For the set of reflections corresponding to each micromirror array configuration the detected times of arrival and directions of arrival can be conveyed from the detector to the 3D reflection positioner using signals.

In one aspect, the 3D location calculator 464 can also receive data indicative of the configuration of the micromirror array 1310. For each light reflection in the set of light reflections the 3D location calculator can generate a 3D location indicative of a reflection location corresponding to the light reflection. The 3D location can be based on a detector element (e.g., the position in a detector array where the reflection was sensed) and further based on the configuration of the micromirror array (i.e., the subset of directions in the FOV being deflected towards the detector array). For example, a detected light reflection at detector element 1460a can indicate a reflection at a location encompasses by region 1430a in the FOV 1420. The micromirror array configuration can further refine the portion of the FOV to indicate the reflection came from the upper left portion 1435 of region 1430a. The time-of-flight between the corresponding emitted light pulse and a light reflection can indicate the range to the reflection location within region 1435. Hence the various micromirror array configurations enable more unique 2D locations (i.e., 2D reflection directions) to be generated (i.e., measured) in a corresponding 3D point cloud, than the number of photodetector elements in array 1405. For example the configuration of FIG. 14B enables 4 discrete configurations of the mircomirror array 1310 and a 128×128 detector array to sense reflections in 4×128×128 unique directions.

Remote Lidar with Malfunction Detection

An increasing trend in modern automobiles is the automation of control systems and safety features. Within this environment, an active challenge is the timely identification of malfunctioning equipment and failsafe operation of vehicles in the event of a malfunction. For example, modern automotive electronic control units (ECUs) control acceleration and braking. Techniques such as redundancy, fault tolerance and failsafe modes are used to prevent and safely react to malfunctions. Computer vision system (e.g., cameras. RADARs and LIDARs) pose some unique reliability challenges, in part because they often involve placing sensors and processors on the exterior of the vehicle where they can be subject to undetected or unreported damage, dirt and degradation (e.g., weather related wear).

A LIDAR with remote located ranging (e.g., remote from the FOV being detected) is advantageous because it can gather sets of light reflections from a plurality of FOVs around a vehicle, thereby reducing the number of detectors required. However a shared remotely-located ranging subassembly and in particular the associated shared photodetector electronics can represent a single point of failure. For example, imagine that for six distinct fields of view around a self-driving car light-based ranging is performed by a single remote-located single photon avalanche detector (SPAD) array. If the SPAD were to malfunction ranging capability in all six FOVs could be lost. Some failure modes of a distributed remotely-located LIDAR are more easily detected than others. For example, a blocked or broken light emitter can be indicated by the absence of light reflections. Similarly, a stuck mechanical component (e.g., a scanning detector or emitter) can be sensed by position feedback. However, other failure modes such as degraded photonic efficiency of a photodetector array or temperature related drift in a time-of-flight calculation circuit can be more difficult to identify. In-system verification of optical ranging system performance can be advantageous considering the critical nature of vision systems for autonomous vehicles.

Within examples, LIDAR systems and methods are provided to generate a malfunction signal when a measure of difference in the performance of two detectors (e.g., avalanche detector arrays) is greater than a threshold value, in response to receiving similar subsets of reflections from a common input set of reflections, gathered from one or more FOVs. In one aspect, of several embodiment, a set of reflections gathered by a failsafe LIDAR is divided into two representative subsets by a reflection splitter (e.g., each sensing light from a similar range of directions in a common FOV). Each of the representative subsets is then directed to at least one of two separate detectors. In one aspect, the two detectors function to provide a measure of redundancy in generation of a 3D point cloud corresponding to the original set of reflections and a method to compare the perform of the two detectors and associated ranging circuitry. Distributing substantially similar subsets of a common set of reflections further provides a measure of failsafe performance in the event that one of the detectors or associated 3D ranging circuitry fails (e.g., continued performance with half of the data). In another aspect the two representative subsets of light reflections can each be detected and processed to form 3D locations. A measure of difference between the processed subsets of reflections can be compared and a measure of difference between the subsets calculated. When the measure of difference exceed a threshold value, circuitry in the LIDAR can generate a malfunction signal.

In a first embodiment, a failsafe LIDAR comprises one or more emitters which produce an outgoing set of light pulses over one or more fields of view (FOVs), and further comprises means to gather light reflections corresponding to the outgoing set light pulses (e.g., lenses, mirrors, a field of view combiner or CFOBs). The failsafe LIDAR can further comprise a reflection splitter to direct a first plurality of the light reflections to a first detector and thereby generate first reflection signals. The reflection splitter can further function to direct a second plurality of the light reflections to a second detector and thereby generate second reflection signals. In the first embodiment the reflection splitter can function such that the first and second pluralities of light reflections originate within overlapping 2D angular ranges in the one or more FOVs. Finally, the failsafe LIDAR can comprise electronic circuitry operably coupled to the first and second detectors, which generates a measure of difference between at least some of the first and second reflection signals, and generates at an output from the LIDAR a malfunction signal when the generated measure of difference is greater than a threshold value.

In a second embodiment, the failsafe LIDAR can comprise a primary LIDAR processor to generate 3D locations corresponding to a first plurality of reflections directed to a first detector by a reflection splitter and further comprise a LIDAR co-processor to generate 3D locations corresponding to a second plurality of reflections directed to a second detector by the reflection splitter. The failsafe LIDAR can further comprise a malfunction comparator (e.g., digital comparator) coupled to receive the 3D locations from the LIDAR processor and LIDAR co-processor and to generate a malfunction signals if a difference value indicating a measure of difference between the 3D locations received from each processor is greater than a threshold value. For example, the malfunction circuit can receive a 3D point clouds (e.g., sets of 100,000 3D locations) covering a similar FOV from both the LIDAR processor and co-processor. The malfunction circuit could identify a systematic range or distance error (e.g., a consistent range difference of 3 meters between objects appearing in both point clouds) and thereby generate a malfunction signal.

Embodiments of the present disclosure are operable to provide the following exemplary advantages: A failsafe LIDAR according to embodiment of the present disclosure can provide continued operation if one of the two detectors malfunctions. A failsafe LIDAR can identify a malfunction in one or both detectors by calculating a measure of difference based on 3D locations generated from overlapping pluralities of light reflections detected by two detectors. Several embodiments can identify a malfunction of a 3D location calculator used to calculate some or all of the 3D locations corresponding to the first and second plurality of light reflections. For example, first 3D locations based on reflections from a first detector can be calculated by a LIDAR processor. Second 3D locations corresponding to reflections detected by a second detector can be processed by a co-processor and a malfunction indicator circuit process both the first and second 3D locations based on an expected similarity to determine a measure of difference between the sets of 3D locations. The malfunction indicator circuit can reset one or other of the processors if a processor ceases to produce 3D locations, indicates a systematic error (e.g., a systematic range error) or if the measure of difference exceeds a threshold.

Embodiments of the failsafe LIDAR can detect malfunctions earlier than a single detector LIDAR design by calculating the measure of difference based on detecting and processing similar sets of light reflections. The proposed failsafe LIDAR can more effectively differentiate between common-mode malfunction causes that effect all calculated 3D location (e.g., indicating a blocked FOV) and differential-mode malfunction causes that effect one of the detectors or associated 3D location calculators. This can significantly improve root-cause determination (e.g., identify the malfunctioning component). Similarly, the failsafe LIDAR can indicate malfunction data in a malfunction signal, indicating the type of malfunction (e.g., no input light reflections, a systematic range error associated with one processor, no data from one processor or a damaged detector such as a dead detector element). In another advantage, one of the two detectors can be used to calibrate the second detector. For example, one of the detectors can be very accurate designed to act as a calibration standard for another detector (e.g., a larger detector with many more elements but periodically in need of calibration.

FIG. 15A illustrates a LIDAR system 1500 with two detectors and a malfunction indicator circuit according with an embodiment of the present disclosure. LIDAR 1500 comprises an emitter 1505. Emitter 1505 functions to generate one or more pulses of light 1510 into field of view 1515. Emitter 1505 can be a stationary emitter such as a fixed position LED or laser diode. Emitter 1505 can also be a steerable emitter such as steerable laser assembly 505 in FIG. 5. Outgoing set of light pulses 1510 can be a set of discrete light pulses or a continuous or semi-continuous beam of light that is modulated to create the outgoing set of pulses based on the modulation. For example, continuous wave (CW) light-based range finding can modulate a continuous or semi-continuous beam of light and each period of the modulation frequency can be considered an outgoing light pulse. In the embodiment of FIG. 15A LIDAR 1500 can gather a set of light reflections from reflection locations in the FOV 1515 at input lens 1517.

Reflection Splitter

LIDAR 1500 comprises a reflection splitter 1510a which functions to direct a first plurality of the set of reflections to a first detector 1520a and a second plurality to a second detector 1520b. Unlike a scanning mirror that directs reflections from a plurality of directions (e.g., spanning a FOV) towards a single detector (e.g., often in a single output direction aimed at the detector), the reflection splitter can direct subsets of a set of light reflections with a common 2D angular range to different distinct detectors (e.g., each of 2 detectors receive light reflections a 20×20 degree 2D angular range in the center of a FOV 1515). Therefore, each of the two detectors can see a similar set of reflections. By directing two pluralities of reflections, each with substantially similar angular ranges in the FOV to different detectors reflection splitter 1510a can enable LIDAR 1500 to compare the performance of the two detectors and/or the associated 3D location calculation circuitry.

Unlike a multi-transceiver LIDAR system with multiple laser transceiver pairs that simultaneously scan distinct exclusive portions of a FOV (e.g., different elevation angles in a 360 azimuthal range such as measured with model HDL-64E from Velodyne Lidars), the reflection splitter can receives light reflections spanning one or more FOVs and distributed distinct pluralities of the light reflections spanning a common 2D angular portions to different detectors (i.e., presenting subsets of light reflections with overlapping 2D angular portions in a FOV to two distinct detectors).

Exemplary reflection splitters can be time multiplexed, such as a mirror that oscillates back and forth and thereby directs a common input range of light reflections onto one of two detectors in repeating sequence. This approach is useful because while neither detector experiences exactly the same reflections as the other (e.g., separated in time by at least one transition of the reflection splitter) the close time correlation ensures similar reflection locations are reported to both detectors (e.g., with a 100 millisecond time difference). For the purpose of this disclosure a reflection splitter is time-multiplexed if the reflection splitter provides light reflections from a common 2D angular range in one or more FOVs to each detector in a set of detectors (e.g., two detectors) in a repeating time sequence such that only one detector in the set receives the reflections at any given time. In the embodiment of FIG. 15A reflection splitter 1510a comprises two mirrors 1511a and 1511b. Mirror 1511a can be an imperfect reflector or semitransparent mirror that functions to deflect a first plurality of the set of light reflections towards detector array 1525a while permitting a second plurality of light reflection to pass through and be deflected by mirror 1511b towards detector array 1525b.

Other exemplary reflection splitters can be spatially multiplexed, and thereby direct light reflections from different spatial locations in the FOV to different detectors. One challenge with this approach is that different portions of the FOV can naturally contain reflections from different ranges and hence can complicate the use of deflected subsets of the reflections for comparing the performance of the detector hardware. One solution to address this challenge is a micromirror array (e.g., micromirror array 1310 in FIG. 13) operable to divide the light reflections into two pluralities at a microscopic level. For example, a micromirror array can have two interdigitated array of mirrors (e.g., in a checkerboard pattern) each arranged to deflect each incident light reflection in one of two directions. Such an arrangement can split the set of reflections into two distinct pluralities in two different directions, each representative of the same range of angles in the FOV.

A reflection splitter based on an electronically controller micromirror array or electronically controlled time multiplexed mirror offers some additional advantages: such as the ability to periodically perform the time or spatial multiplexing such as during a test of the LIDAR functionality. Conversely, when the functionality of the LIDAR is not being tested the reflection splitter 1510a can direct all of the set of light reflections towards one of the detectors. In one aspect, the LIDAR can enter a malfunction testing mode and instruct the reflection splitter to discontinue directing all of the light reflection to a single detector and instead direct a subset representative of a 2D angular portion of the one or more input FOVs to a second detector.

Detectors

LIDAR 1500 can further comprise two detectors 1520a and 1520b each located to receive a separate plurality of the set of light reflections from reflection splitter 1510a. Each detector can function to detect a separate plurality of the set of light reflections and generate a corresponding set of reflection signals. Each detector can further amplify and signals condition the reflections signals. A first detector 1520a can generate a first set of reflection signals 1535a in response to detecting a first plurality of the set of light reflections. Similarly a second detector 1520b can generate a second set of reflection signals 1535b in response to detecting a second plurality of the set of light reflections. Each of the detectors can comprise a photodetector (1525a and 1525b) coupled to amplifier conditioner circuitry (1530a and 1530*b*). In the embodiment of FIG. 15A photodetector 1525*a* and 1525*b* are illustrated as 2D arrays of photodetector elements. The individual elements in the 2D array can be CCDs, photodiodes, avalanche photodiodes or phototransistors. Exemplary photodetectors comprising 2D detector arrays for LIDAR ranging include OPT8241 from Texas Instruments or Part No. VFCH-GAZA (128×128 InGaAs array) from Voxtel Inc. of Beaverton Oreg. Amplifier conditioner circuitry 1530*a* and 1530*b* can include a transimpedance amplifier to convert current associated with detected photons of light into reflection signals (e.g., voltage signals).

In one architecture each detector element in the 2D photodetector array 1525*a* can be connected to corresponding dedicated amplifier and conditioner circuit (e.g., transimpedance amplifier and signal filter). In this architecture the reflection signal is associated with a sub-circuit in the amplifier conditioner circuitry 1530*a* and hence a direction can be associated with each reflection signal in the first and second set of signal reflections based on the associated sub-circuit. In another embodiment, amplifier and conditioner circuits 1530*a* and 1530*b* can be shared (e.g., time multiplexed) among a 2D array of detector elements (e.g., 1525*a*). In this architecture a 3D location calculator (e.g., 1540*a* and 1540*b*) can instruct a detector array (1525*a* and 15325*b*) to readout each of the 2D array of detector elements to the amplifier circuitry (1520*a* and 1530*b*) in a timed sequence. In this way the first and second set of reflection signals (1535*a* and 1535*b*) can be associated with unique detector elements and thereby the reflection signals can be associated with directions in the FOV 1515. Each of the set of reflection signals can include amplified voltage waveforms from each of the detector elements corresponding to the timing (e.g., phase) and amplitude of reflected light pulses corresponding to the outgoing set of pulses 1510.

LIDAR 1500 can further comprise two 3D location calculators (1540*a* and 1540*b*), each corresponding to a detector (1520*a* and 1520*b*). Each 3D location calculator can be part of a LIDAR controller microchip (e.g., OPT9221 from Texas Instruments). In particular, 3D location calculators can precisely control or receive precise indications of the timing of the outgoing set of light pulses. The 3D location calculators 1540*a* and 1540*b* can then receive a corresponding set of reflection signals or corresponding phase data and measure the time difference between outgoing pulses and light reflections. The time difference corresponding to each reflection signal can be multiplied by the speed of light (e.g., 300 meters per microsecond) to calculate a range (e.g., distance) to a reflection location associated with each light reflection and reflection signal. A location in the 2D field of view 1515 can be calculated by identifying the detector element responsible for the corresponding light reflection. In this way a 3D location can be calculated as a distance along a 2D direction in the FOV provided by corresponding detector element. In various embodiments the 3D location calculators 1540*a* and 1540*b* can be part of a single microchip or in separate microchips. A common architecture in automotive ECUs is to use a master controller (e.g., a master LIDAR controller such as OPT9221 from Texas instruments) in conjunction with a co-processor microchip operable to perform some of the same calculations for verification and validation purposes.

LIDAR 1500 can further comprise a malfunction indicator 1550 that functions to determine a measure of difference based on the first and second signals. Malfunction indicator 1550 can be a dedicated circuit or can be instructions periodically performed by a circuit that performs a variety of operations including determining the measure of difference between the first and second signals. The measure of difference between the first and second signals can be calculated by comparing the first and second sets of signals directly (e.g., an analog comparison of the phases or amplitudes or arrival times). Alternatively, as illustrated in FIG. 15A the malfunction indicator 1550 can calculate a difference value indicative of a measure of difference between the set of first signals 1535*a* and the set of second signals 1535*b* by processing some or all of the corresponding 3D location calculated by 3D location calculators 1540*a* and 1540*b*. In this way the 3D location calculators can process the first and second sets of reflection signals to generate 3D locations and the malfunction indicator circuit 1550 can determine a measure of difference between the reflection signals based on the 3D locations. Malfunction indicator circuit 1550 can generate a malfunction signal when the measure of difference is greater than a threshold value. For example, consider that one of the detectors (1520*a* or 1520*b*) develops a damaged region of the photodetector array. Malfunction indicator 1550 provides the capability to compare 3D locations derived from the first and second sets of reflection signals from substantially similar angular ranges. Over the course of a few seconds sufficiently large first and second sets of reflections can be gathered to remove sporadic variations between the first and second sets of reflection signals and thereby indicate a systematic difference in the 3D locations reported by the two 3D location calculators 1540*a* and 1540*b*. The malfunction indicator circuit can therefore quickly identify that the calculated measure of difference is greater than a threshold and generate the malfunction signal. Malfunction indicator 1550 is operable to indicate differences between the photodetectors arrays such as temperature drift, damage, or differences between the respective amplifier circuitry or differences between the 3D location calculators (e.g., a processor crash, latchup or reboot).

The measure of difference can further be used to differentiate internal malfunctions (e.g., related to LIDAR circuitry) from external causes (e.g., dirt on the lens 1517). For example, a systematically reported ranging error for a portion of the 3D locations from one detector can indicate a problem with the detector while a systematic error reported by both detectors can indicate an environment problem or issues with optical components (e.g., lenses, emitters or CFOBs).

LIDAR 1500 can transmit malfunction signal 1555 to a malfunction monitoring circuit 1560. The malfunction monitoring circuit can be part of the onboard diagnostic system (OBDII) and can function to monitor for malfunction signals from a variety of systems in addition to LIDAR 1500. Malfunction monitoring circuit 1560 can function to generate a malfunction code corresponding to malfunction signal 1555. The malfunction signal can comprise data indicating the type of malfunction (e.g., a processor reset or an inconsistent range measurement between the two detectors). The malfunction signal and data in the malfunction signal can be used to cause malfunction monitoring circuit 1560 to store a specific error code in a malfunction code memory 1570.

FIG. 15B illustrates a failsafe LIDAR system 1501 that uses a reflection splitter to direct light reflections to one of two detectors and comprises a malfunction indicator circuit, in accordance with an embodiment of the present disclosure. In the embodiment of FIG. 15B the first and second sets of reflection signals (1535*a* and 1535*b*) are transmitted to the malfunction indicator circuit 1550 instead of transmitting the processed 3D locations. Malfunction indicator 1550 can be an analog circuit operable to compare the sets of signals and thereby generate a measure of difference (e.g., a voltage value indicating the integrated difference from the previous 1000 signals from each detector array or a voltage pulse whose width or duration in seconds is proportional to sum of the phase differences between the first and second signals in the previous 1 second). The measure of difference between the first and second sets of reflections can be a difference result or value. For example, the measure of difference can be a difference result calculated in an arithmetic logic unit or dedicated logic circuit in a malfunction indicator circuitry and stored in memory. The result can be a binary number representing the measure of difference (e.g., 10011100), a pass/fail indication (e.g., 0=a difference result that is a below a threshold and a difference result of 1 is the result of a calculation that indicates a difference greater than some threshold). Similarly, a measure of difference can be a difference value such as an analog value from a differential amplifier (e.g., 0.1243V). In the embodiment of FIG. 15B a single 3D location calculator can receive one or both sets of reflection signals 1535*a* and 1535*b* and calculate corresponding 3D locations. In the embodiment of FIG. 15B the malfunction indicator can diagnose differences between the sets of reflection signals (e.g., indicative of a malfunctioning detector) but may not indicate malfunctions in the subsequent processing of the reflection signals to generate 3D locations.

FIG. 15C illustrates an exemplary malfunction indicator circuit 1551, in accordance with an embodiment of the present disclosure. In the embodiment of FIG. 15C a set of control wires 1502 carry control signals 1503*a* and 1503*b* to the detectors 1520*a* and 1520*b*. Control wires 1502 can be used to implement one of several standard communication protocols between a LIDAR controller and the detectors to select a detector element to provide reflection signals from a 2D photodetector array (e.g., 1525*a* or 1525*b*). Exemplary communication protocols include inter-integrated circuit (I2C), serial peripheral interface (SPI) and universal serial bus (USB).

In one aspect, control signals 1503*a* and 1503*b* can select equivalent detector elements in each of two detector 1520*a* and 1520*b*. When the reflection splitter provides highly correlated or overlapping pluralities of reflections to each detector array the reflection signals from equivalent detector elements should also be similar (or correlated). For example, a modulated light beam, comprising several modulation pulses, that is detected by equivalent detector elements in detectors 1520*a* and 1520*b*, each receiving equivalent control signals should output light reflection signals 1535*a* and 1535*b* with equivalent timing (e.g., the phase relation of the pulses or charge associated with a pixel in a TOF pixel array with built-in demodulation). Malfunction indicator circuit 1551 can comprise a difference amplifier 1580*a* (e.g., an operational amplifier or an instrumentation amplifier) that amplifies the difference between reflection signals 1535*a* and 1535*b*. Malfunction indicator circuit 1551 can further comprise a summation component 1585 to gather the output of difference amplifier 1580*a* over a period of time during which different control signals 1503*a* and 1503*b* select a sequence of detector elements. Summation component 1585 can be a summation amplifier circuit or an integrator circuit. The function of summation component 1585 can be to generate the measure of difference 1596 in the form of a difference value (e.g., 0.1243V). The measure of difference (e.g., difference value or difference result) indicative of the difference between a corresponding plurality of reflection signals can be transmitted to an output pin 1598 (e.g., an input/output pin or an electrical contact pad). In this way, the malfunction indicator circuit 1550 can make the measure of difference available at output pin 1598 to other circuitry within LIDAR 1501 or other diagnostic systems in the host platform (e.g., autonomous vehicle or robot).

Malfunction indicator circuit 1551 can further comprise a threshold value generator 1590. Threshold value generator 1590 can function to provide a threshold value or basis of comparison for the measure of difference (e.g., difference result). Exemplary threshold value generators 1590 can include a programmable digital-to-analog voltage generator or a voltage reference generator. Each of these is operable to generate a reference voltage that can be compared with the measure of difference (e.g., difference value) in a comparator circuit 1595. Comparator 1595 can be configured such that when the measure of difference 1596 is greater than the threshold value supplied by the reference generator the comparator 1595 generates a malfunction signal 1555. Malfunction indicator circuit 1551 can make the malfunction signal 1555 available at a malfunction indicator pin 1597.

FIG. 15D illustrates another exemplary malfunction indicator circuit 1550 operable to receive a plurality of reflection signals from two detectors simultaneously. The 2D photodetector arrays 1525*a* and 1525*b* can generate several reflection signals simultaneously. In the example of FIG. 15C the detector elements can be sequentially connected to the malfunction indicator circuit. Conversely, in the embodiment of FIG. 15D several reflection signals are simultaneously generated and transmitted to the malfunction indicator circuit 1551. Malfunction indicator circuit 1551 can comprise a plurality of difference amplifiers (e.g., 1580*a* and 1580*b*) to amplify the difference between corresponding pairs of output signals. Summation component 1585 can be a summing amplifier operable to sum (or integrate) the output from the plurality of difference amplifiers simultaneously.

FIG. 16 illustrates a LIDAR system 1600 that enables a ranging subassembly 1605 to be remotely located relative to FOV 1515 using a CFOB 1610*a* and to further provide failsafe capability by using a reflection splitter 1510*a* and a malfunction indicator 1550. LIDAR 1600 comprises optical components (e.g., lens 1517), reflection transmission components (e.g., CFOB 1610*a*) and a ranging subassembly 1605 with a failsafe architecture. The components of LIDAR 1600 can be distributed such that the ranging subassembly 1605 is remotely located from the FOV 1515 (e.g., located in the engine bay, or behind the dashboard of a car). Optical components (e.g., lens 1517 and emitter 1505 can be positioned on the exterior of a car or robot, with direct line-of-sight access to FOV 1515 and can thereby gather light reflections from a 2D angular range within FOV 1515, corresponding to an outgoing set of light pulses. CFOB 1610*a* can function to transfer the gathered reflections to the reflection splitter while preserving an indication of the relative placement of each light reflection in the FOV based on the coherent nature of the fiber bundle.

Reflection splitter 1510*a* can direct pluralities of the set of light reflections from CFOB 1610*a* to two detectors 1520*a* and 1520*b*. In the embodiment of FIG. 16 photodetector array 1620 can be different in size, shape, density, and composition from the corresponding photodetector array 1525*a* in the other detector 1520*a*. For example, photodetector array 1525*a* can be a large array (e.g., a 320×420 array of silicon CCD elements in a 2D array) and photodetector array 1620 can be a smaller more sensitive array (e.g., a 4×4 arrays of InGaAs infrared elements or single photon avalanche photodiodes). The smaller detector array 1620 can be designed to detect a second plurality of the set of light reflections that is only representative of a subset of the angular range of light reflections transferred to the larger detector array 1525a. For example, detector 1520a can receive a plurality of light reflections with an azimuthal range of +60 to −60 degrees and elevation angular range of +30 to −30 degrees. Mirror 1511b in reflection splitter 1510a can direct a second plurality of light reflections representative of light reflections in the range +/−10 degrees azimuthal and elevation to detector array 1620. Malfunction indicator 1550 can be designed to only compare the reflection signals from both detectors in the +/−10 degree range for which comparable reflection signals exist. In an alternative embodiment detector array 1620 can detect reflections from the same angular range as detector 1525 but with lower angular resolution (i.e., due to fewer detector elements than the larger array 1525a). The malfunction indicator 1550 can be designed to generate the measure of difference between the corresponding reflection signals, based in part on the aggregated light reflections at the smaller photodetector array 1620. For example, detector 1520b can have a single element photodetector 1620 that receives a second plurality of reflections representative of the same angular range as the reflection provided to detector 1520. The single detector element can cause reflection signals 1535b from detector 1520b can have all of the timing information of reflection signals 1535a but have none of the directional specificity (e.g., direction data) contained in reflection signals 1535a. Hence malfunction indicator circuit 1550 can generate the measure of difference between the two sets of reflection signal even though one set has no directional information. In the embodiment of FIG. 16 the reflection signals can be digitized by analog-to-digital converter circuits 1630a and 1630b before they are sent to the 3D location calculator 1540c and malfunction indicator circuit 1550.

FIG. 17A illustrates several components of a failsafe LIDAR system 1700 with a shared remotely located ranging subassembly 1705 (e.g., remotely located in an engine bay) that receives light reflections from several FOVs using a plurality of CFOBs. CFOBs 1610a-c can gather light reflections from a plurality of distinct FOVs (e.g., 1515 and 1715). The FOVs can be distributed at strategic locations around a vehicle (e.g., searching for objects in front of the vehicle and scanning blindspots at the side of the vehicle). The plurality of FOVs can also be overlapping and have a variety of magnifications (e.g., different resolution of angular range per fiber in the CFOBs). Each of the CFOBs can transport light reflections corresponding to outgoing emitter light pulses while retaining an indication of the directions associated with the light reflections. LIDAR 1700 can comprise a FOV combiner to gather light reflections from the plurality of CFOBs and generate a time-multiplexed or spatially multiplexed output set of light reflections. In the embodiment of FIG. 17A FOV combiner 1720a time shares (e.g., time multiplexes) light reflections from 3 FOVs to generate a set of reflections that is a time varying sequence of the light reflections from each of the 3 FOVs (e.g., a time sequence comprising reflections from FOVs A followed by FOV B followed by FOV C). A reflection splitter 1510b can oscillate a mirror to direct pluralities of the light reflections to two detectors 1520a and 1520b. Each of the detectors can generate a sequence of reflection signals 1535c and 1535d that are corresponding to light reflections from the sequence of FOVs. For example, detectors 1520a and 1520b can both generate reflection signals from FOV A (e.g., 1515) simultaneously. At some time later the FOV combiner switches to providing light reflections from FOV B and hence reflection splitter directs subsets of light reflection representative of a common or overlapping 2D angular range of FOV B to the detectors. In this way a malfunction indicator can receive comparable sets of reflection signals (e.g., 1535c and 1535d) from multiple FOVs or can receive 3D locations corresponding to comparable sets of light reflections from multiple FOVs.

FIG. 17B illustrates a related embodiment in which the reflection splitter is combined into the FOV combiner 1720b. In this embodiment three FOVs provide light reflections to the remote shared ranging subassembly 1705. The FOV combiner 1720b can be a rotating mirror assembly or a switching micromirror array and can function to generate time multiplexes output providing light reflections from each of the FOVs in sequence. However unlike FOV combiner 1720a that outputs light reflections from a single input FOV at a time, instead FOV combiner 1720b can output light reflections from 2 FOVs at a time. Therefore FOV combiner 1720b can accept 3 input FOVs and directs each of two output FOVs to a corresponding detector 1520a or 1520b. For example, detector 1520a can receive light reflections from FOVs A-C in a sequence given by A, B, C, A while detector 1520b can receive light reflections from FOVs A-C in sequence C, A, B, C. In this way the FOV combiner includes the functionality of the reflection splitter to direct pluralities of light reflections from equivalent or overlapping angular rangers to the two detectors. While it is true that the light reflections received by detector 1520a from FOV A are not exactly the same as those received at detector 1520b from FOV A a short time later the difference can be quite small and therefore enable a measure of difference to indicate the performance of the associated detectors. Each detector generates a corresponding set of reflection signals 1535e and 1535f that can be time-delayed comparable copies of one another.

FIG. 18 illustrates several components of a failsafe LIDAR system 1800, in accordance with an embodiment of the present disclosures. LIDAR system 1800 can comprise a FOV combiner 1720b that directs FOVs to two detectors 1520a-b and a LIDAR processor 1810 that computes 3D locations, controls the modulation of emitters and monitors for malfunctions by comparing incoming sets of reflection signals. LIDAR processor 1810 can comprise circuitry such as phase comparators, arithmetic logic units and instruction memories that store instructions which when executed cause the processor 1810 to calculate 3D locations from at least one incoming set of reflection signals. The instructions can further cause the circuitry in the LIDAR processor 1810 to compare data indicative of two sets of reflections signals from two distinct detectors 1520a and 1520b to thereby determine a measure of difference between the reflection signals. In response to sensing a measure of difference between the data indicative of the sets of reflection signals that is greater than a threshold value, generating a malfunction signal. LIDAR processor 1810 can comprise one or more signal buffers 1820a and 1820b store reflection signals in a digital or analog format. Buffers 1820a and 1820b can serve to delay some of the reflection signals so as to provide reflection signals from each detector for a common FOV to malfunction indicator circuitry. Alternatively in an embodiment where circuitry in the processor 1810 is common to both the malfunction indication and 3D location calculation functions the buffers can store data indicating aspects of the reflection signals until it can be processed.

In the embodiment of FIG. 18 processor 1810 can receive two sequences of reflection signals 1535e and 1535f. Both sequences can have a degree of correlation when time synchronized (e.g., when one of the sequences is delayed at processor 1810 to coincide with the arrival of reflections from the same FOV detected by the second detector a short time later). Malfunction indicator 1550 can generate an error signal each time a measure of difference is greater than a threshold value. A small number of errors may be acceptable. Error counter 1840 can generate an error signal if the number of errors exceeds a predetermined number in a period of time, 3D location calculator can further receive both reflection signal sequences and calculate a corresponding 3D point cloud. The malfunction signal can be transmitted to the 3D location calculator circuit and can serve to cause the 3D calculator to use one or other or both of the sequences of reflection signals 1535e or 1535f. For example, initially 3D location calculator can use both sequences of reflection signals 1535a and 1535b to provide a full resolution point cloud (e.g., 200,000 points per scan). Subsequently, detector 1520a can malfunction and the malfunction can be identified by malfunction indicator 1550. The malfunction signal 1555 can cause 3d location calculator to discontinue using reflection signals 1535a when calculating 3D locations and instead rely on sequence 1535b from detector 1520b. One advantage of several embodiments is that each of the two detectors can provide reflection signals representative of the same 2D angular range in a FOV, thereby providing a resolution point cloud that enables a host vehicle (e.g., autonomous car) to operate in a safe manner in response to the malfunction. Additionally, the shared FOV capability enables continued operation at reduced capability for all FOVs. (i.e., a malfunctioning detector can partially degrade performance for several FOVs but provide ranging in all FOVs.)

LIDAR processor 1810 can further comprise emitter trigger circuitry 1860 and a controller 1850 for the FOV combiner and reflection splitter. LIDAR system 1800 can further comprise reset circuitry 1880 operable to reset the LIDAR processor or one or more detectors in the event of a malfunction signal 1555.

FIG. 19 illustrates several components of a failsafe LIDAR system, including a LIDAR processor and a LIDAR co-processor. LIDAR 1900 is designed to operate safely while providing a malfunction signal in the event that a detector or associated LIDAR processor (e.g., primary processor 1810 or co-processor 1920) malfunctions. LIDAR 1900 comprises a reflection splitter 1510b, two detectors (1520a and 1520b) a LIDAR processor 1810, a LIDAR co-processor 1920, a malfunction indicator 1550 and a reset circuit 1880. In this embodiment the LIDAR processor 1810 can control one or more light emitters, FOV combiners, s reflection splitter as well as calculating 3D locations using reflection signals 1535a. The co-processor calculated 3D locations for a second set of reflection signals 1535b from a substantially similar 2D angular range as signals 1535a. A 3D location calculator (1540a and 1540b) in each of the processor and co-processor calculates a set of 3D locations. Two buffers 1820a and 1820b can temporarily store the 3D locations in order to identify sets of 3D locations from the same FOV. 3D locations can be transmitted from each of the processor 1810 and co-processor 1920 to the malfunction indicator c 1550 including error counter 1840. Malfunction indicator 1550 can calculate a measure of difference between the first and second sets of reflection signals based on the 3D data. For example, the malfunction circuit can receive a 3D point clouds (e.g., sets of 100,000 3D locations) covering a similar FOV from both the LIDAR processor and co-processor. The malfunction circuit can function to identify a systematic range or distance error (e.g., a consistent range difference of 3 meters between objects appearing in both point clouds) and thereby generate a malfunction signal. Alternatively, malfunction indicator can identify that either processor 1810 or co-processor 1920 have ceased to provide 3D locations indicating a processor error. When the measure of difference between inputs from the processor 1810 and co-processor 1920 are greater than a threshold value malfunction indicator 1550 can generate a malfunction signal 1555 at a malfunction output pin 1597 of LIDAR 1900. In a related embodiment error counter 1840 can count the number of time in a particular time interval (e.g., in the last hour or since the vehicle has been running) that a measure of difference calculated by the malfunction indicator 1550 has exceeded a threshold value. Malfunction signal 1555 can be used to cause a reset circuit to reset the processor, co-processor or one or more detectors. One common reset circuit design is a capacitor and a resistor in series that charges the capacitor to a value operable to keep an attached from resetting. The malfunction signal can function to drain the capacitor, thereby causing the voltage at the reset pin of an attached processor to become low and thereby resetting the processor.

FIG. 19B illustrates another embodiment of a failsafe LIDAR 1905. In LIDAR 1905 both the LIDAR processor 1810 and LIDAR co-processor 1920 each contain a malfunction indicator (1940a and 1940b) and a reset pin (1950a and 1950b). In this embodiment each of the malfunction indicators is designed to receive 3D locations from both the processor and co-processor and to generate a corresponding malfunction signal when a measure of difference is greater than a threshold. In one interesting aspect malfunction indicator 1940a is designed to assume identified in the LIDAR processor can indicate that the corresponding co-processor has malfunctioned and therefore the malfunction signal from the LIDAR processor can be used to reset the co-processor. Conversely malfunction indicator 1940b is designed to assume that a malfunction can be caused by a malfunction in the LIDAR processor and hence resets LIDAR processor 1810 using malfunction signal 1955b. In this way the LIDAR processor and co-processor monitor one another's operation. In one example, a malfunction indicator 1940a can be operable coupled to receive 3D location data from two different processors (e.g., 1810 and 1920) and upon recognizing that one of the processors has ceased to transmit 3D location data can generate a malfunction signal that causes a detector or processor to reset. In a related embodiment the LIDAR processor and co-processor can each comprise a program memory and shared circuitry that executes instructions from the corresponding program memory to perform the steps of controlling the emitter, the FOV combiner, the reflection splitter, commanding one of the detectors to transmit reflection signals, calculating a ranges associated with reflection signals, calculating 3D locations associated with the ranges, receiving 3D locations from the other processor (e.g., the co-processor), comparing the 3D locations from both processors to generate a difference value, evaluate a malfunction condition (e.g., a threshold value comparison) on the difference value and generate a malfunction signal when the malfunction condition is met.

FIG. 20 illustrates a failsafe LIDAR 2000 that uses a scanning mirror assemble 2010 attached to a ranging sub-assembly 2005 with two detectors 2020a and 2020b. Mechanically scanned LIDARs are useful because a single emitter 1505 and detector 2020a can form a transceiver pair that scans a multitude of direction in a FOV 1515 as a scanning mirror assembly 2010 rotates. An exemplary scanning LIDAR with a rotating mirror assembly is the HDL-64E from Velodyne Lidars of Morgan Hill Calif. In the embodiment of FIG. 20 light pulses from a single emitter 1505 are deflected by a scanning mirror in rotating assembly 2010 and thereby distributed into FOV 1515. Corresponding light reflections 2015 are deflected by the scanning mirror in the rotating assembly and then split by reflection splitter 1510a into two pluralities of light reflections. A first plurality of the light reflections can be directed towards detector 2020a comprising a single element photodetector 2025a (e.g., avalanche photon photodiode), while a similar second plurality of the light reflections can be directed towards detector 2020b comprising a second single element photodetector 2025b. The speed of rotating assembly 2010 can be controlled by scanning mirror controller 2030. Scanning mirror controller 2030 can be performed by software running on a LIDAR processor (e.g., 1810 in FIG. 19A) or can be dedicated circuitry. Similarly scanning mirror controller 2030 can sense the position of rotating assembly 2010 and can thereby associate a position (e.g., angular position in the azimuthal plane) with reflection signals 1535a and 1535b from detectors 2020a and 2020b. 3D location calculators 1540a and 1540b can receive position indications from scanning mirror controller 2030 or directly from the rotating assembly 2010 and thereby generate a set of 3D locations from each of the sets of reflection signal 1535a and 1535b. Malfunction indicator 1550 can receive the sets of 3D locations and thereby generate a measure of difference between two sets of inputs. When the measure of difference is greater than a threshold value malfunction indicator can generate a malfunction signal.

FIG. 21 illustrates a method 2100 for generating a malfunction signal with a LIDAR according to an embodiment of the present disclosures. At block 2110 one or more emitters generate an outgoing set of light pulses in at least one (FOV). At block 2120 a first detector generates first reflection signals by detecting a first plurality of light reflections. At block 2120 a second detector generates second reflection signals by detecting a second plurality of light reflections, wherein the first and second pluralities of light reflections, each comprise light reflections from overlapping 2D angular ranges in the at least one FOV, and correspond to at least some of the outgoing set of light pulses. At block 2130 at least some of the first reflection signals are processed to generate first data and at least some of the second reflection signals are processed to generate second data. At block 2140 a difference value is calculated by comparing at least some of the first and second data. At block 2015 a malfunction signal is generated at an output pin of the LIDAR based at least in part on a magnitude of the difference value.

Exemplary approaches to calculating the measure of difference (e.g., difference value) between data representative of two pluralities of light reflections include (a) comparing ranges at a specific number of equivalent or similar locations in a FOV reported in two sets of location data (b) establishing a test region in a FOV and comparing the average, peak or distribution of ranges for locations in the test region reported in both sets of 3D location data (c) identifying features (e.g., a range associated with an object in the foreground) and comparing the range of identified features reported in two sets of range data or 3D location data.

While the above description contains many specificities, these should not be construed as limitations on the scope of any embodiment, but as exemplifications of various embodiments thereof. Many other ramifications and variations are possible within the teachings of the various embodiments. Thus the scope should be determined by the appended claims and their legal equivalents, and not by the examples given.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower". "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A light detection and ranging system comprising:
a. one or more emitters to generate an outgoing set of light pulses;
b. a plurality of coherent fiber optic image bundles (CFOBs) each comprising:
a plurality of optical fibers;
an input surface; and
an output surface;
wherein the plurality of optical fibers have a common spatial sequence at both the input surface and the output surface, and
wherein each of the plurality of CFOBs is positioned to transport at least some of a set of light reflections corresponding to the outgoing set of light pulses, from the corresponding input surface to the corresponding output surface;
c. one or more lenses to focus light on the input surface of each of the plurality of CFOBs; and
d. a ranging subassembly comprising:
a detector that functions to detect the set of light reflections;
a field of view combiner positioned relative to the output surface of each of the plurality of CFOBs to combine the set of light reflections at the detector;
electronic circuitry to compute for the set of light reflections a corresponding set of 3D reflection locations; and
a controller to instruct the one or more emitters to generate the outgoing set of light pulses.

2. The light detection and ranging system of claim 1 wherein the detector is a 2D detector array; and
wherein the field of view combiner is a spatial field of view combiner that functions to transmit for each CFOB in the plurality of CFOBs, the corresponding at least some of the set of light reflections from the corresponding output surface to a corresponding portion of the 2D detector array dedicated to the each CFOB.

3. The light detection and ranging system of claim 1 wherein the field of view combiner is a solid state switchable mirror multiplexor.

4. The light detection and ranging system of claim 1 wherein the field of view combiner is a mechanical optical multiplexor.

5. The light detection and ranging system of claim 1 wherein the field of view combiner is a micromirror array multiplexor.

6. The light detection and ranging system of claim 1 wherein the field of view combiner is a fiber optic taper.

7. The light detection and ranging system of claim 1 wherein a first subset of the set of light reflections are carried exclusively by a first CFOB from the plurality of CFOBs and a second subset of the set of light reflections are carried exclusively by a second CFOB from the plurality of CFOBs and wherein the field of view combiner functions to time multiplex the detector between receiving the first and second subsets of set of light reflections.

8. The light detection and ranging system of claim 7 wherein the detector comprises a plurality of detector elements arranged in 2D array; and wherein the field of view combiner is positioned relative to the detector such that each of the plurality of detector elements is operable to receive a light reflection from the first subset of the set of light reflections and a light reflection from the second subset of the set of light reflections.

9. The light detection and ranging system of claim 1 wherein for a first CFOB in the plurality of CFOBs the plurality of optical fibers comprises at least some optical fibers with a first cross-section area and at least some optical fibers with a second cross-section area distinct from the first cross-section area thereby providing variable resolution from the first CFOB.

10. The light detection and ranging system of claim 1 wherein a first CFOB of the plurality of CFOBs extends a length between the input surface and output surface; and further comprises at least one expanded end wherein at least some of the plurality of optical fibers have a larger cross-section at the expanded end than at a point along the length.

11. The light detection and ranging system of claim 1 wherein the CFOB has a packing fraction at the input surface of at least 50 percent.

12. The light detection and ranging system of claim 1 wherein the plurality of CFOBs functions to transmit the set of light reflections to the ranging subassembly with positions at the output surfaces of the plurality of CFOBs that indicate the set of reflection directions at the input surfaces of the plurality of CFOBs.

13. The light detection and ranging system of claim 1 further comprising an optical connector to connect a first CFOB in the plurality of CFOBs to the ranging subassembly and wherein the optical connector comprises a registration feature to align the output surface of the first CFOB relative to the ranging subassembly in a specific orientation.

14. A light detection and ranging system comprising:
a. one or more emitters that generate an outgoing set of light pulses;
b. a first and a second coherent fiber optic image bundle (CFOB) each comprising:
an input surface,
one or more lenses,
an output surface, and
a plurality of optical fibers, fused together in a common spatial arrangement at both the input surface and the output surface,
wherein the plurality of optical fibers transfer, at least some of a set of light reflections corresponding to the outgoing set of light pulses from the input surface to the output surface;
wherein each of the set of light reflections is from a corresponding reflection location in a set of reflection locations; and
c. a ranging subassembly comprising:
a detector array that detects the set of light reflections,
a field of view combiner that combines the set of light reflections from the output surfaces of the first and second CFOBs at the detector array;
electronic circuitry coupled to the detector array that computes, for each light reflection in the set of light reflections a 3D location, indicative of the corresponding reflection location; and
a controller to instruct the one or more emitters to generate the outgoing set of light pulses.

15. The light detection and ranging system of claim 14 wherein the detector comprises a plurality of detector elements arranged in 2D array; and
wherein the field of view combiner is positioned relative to the detector such that each of the plurality of detector elements receives at least one light reflection in the set of light reflections from the first CFOB and at least one light reflection in the set of light reflections from the second CFOB.

16. The light detection and ranging system of claim 14 wherein the detector comprises a plurality of detector elements arranged in 2D array; and
wherein the field of view combiner is positioned relative to the detector such that each of the plurality of detector elements is operable to receive light reflections from the first CFOB and the second CFOB.

17. The light detection and ranging system of claim 14 wherein the first CFOB is a flexible CFOB, such that the plurality of optical fibers are arranged in a common spatial arrangement at the input surface and the output surface; and wherein the plurality of optical fibers have a variable spatial arrangement along an elongated center section between the input surface and the output surface of the first CFOB.

18. The light detection and ranging system of claim 14 wherein the detector array further comprises a first detector element operable to receive light reflections in the set of light reflections from both the first and second CFOBs and wherein the field of view combiner functions at least in part to alternate between providing the light reflections in the set of light reflections from the first CFOB and providing the light reflections in the set of light reflections carried by the second CFOB to the first detector element.

19. The light detection and ranging system of claim 14 wherein the detector array generates a set of reflection signals indicating for each light reflection in the set of reflections a corresponding arrival time;
wherein at least some of the electronic circuitry computes for each light reflection in the set of light reflections a corresponding distance to the corresponding reflection location using the corresponding arrival time and uses the corresponding distance to compute the corresponding 3D location indicative of the corresponding reflection location.

20. The light detection and ranging system of claim 14 wherein for at least one of the first and second CFOBs the corresponding plurality of optical fibers is elongated and has a length of at least one meter between the input and output surface.

21. The light detection and ranging system of claim 14 wherein each of the first and second CFOBs has a corresponding field of view (FOV) comprising a set of directions in which the each of the first and second CFOBs can receive at the corresponding input surface light reflections corresponding to the outgoing set of light pulses, and wherein for each of the first and second CFOBs the ranging subassembly is remotely located from the corresponding FOV.

22. The light detection and ranging system of claim 21 wherein for the second CFOB the corresponding FOV is a narrower subset of the FOV corresponding to the first CFOB, wherein the first CFOB provides a first subset of the set of light reflections to the ranging subassembly; and wherein the second CFOB provides to the ranging subassembly a second subset of the set of light reflections that has a higher resolution than the first subset of the set of light reflections.

23. The light detection and ranging system of claim 14 further comprising;

a lens that functions for the first CFOB to focus light onto the input surface and a positioning mechanism that positions the lens and input surface of the first CFOB and thereby determines a field of view for the first CFOB.

24. A method comprising:

a. generating with one or more emitters an outgoing set of light pulses;

b. for each of a plurality of coherent fiber optic image bundles (CFOBs), each comprising an input surface, an output surface and a plurality of optical fibers:

focusing at least some of a set of light reflections corresponding to the outgoing set of light pulses on the input surface using a lens and transporting in the plurality of optical fibers, from the input surface to the output surface, the at least some of the set of light reflections corresponding to the outgoing set of light pulses, comprising the step of:

maintaining, using a common spatial ordering of the plurality of optical fibers at the input surface and the output surface, a common spatial ordering of the at least some of the set of light reflections at both the input surface and the output surface;

c. combining with a field of view (FOV) combiner, the set of light reflections from the output surfaces of the plurality of CFOBs;

d. detecting with a detector coupled to the field of view combiner the set of light reflections, wherein the detector comprises a 2D array of detector elements, and wherein combining the set of light reflections further comprises condensing the set of light reflections to fit onto the 2D array of detector elements; and e. with electronic circuitry coupled to the detector, computing for each of the set of light reflections a corresponding 3D location indicative of a corresponding reflection location.

25. Method claim of claim 24 wherein the FOV combiner functions to alternate between transmitting a first some of the set of light reflections from the first CFOB to the detector with a first angular resolution and transmitting a second some of the set of light reflections from the second CFOB to the detector with a second finer angular resolution.

26. The method of claim 24 further comprising the step of controlling a position of a subassembly comprising the lens and the input surface of a first CFOB from the plurality of CFOBs to control at least one aspect of at least a first subset of the set of light reflections, from a group of aspects consisting of an angular range of the first subset of the set of light reflections, the angular resolution of the first subset of the set of light reflections, or the field of view corresponding to the first subset of the set of light reflections.

27. The method of claim 24 further comprising the steps of:

configuring the field of view combiner to transmit a first plurality of the set of light reflections from a first CFOB of the plurality of CFOBs to the detector;

computing for each light reflection in the first plurality of the set of light reflections the corresponding 3D location using a first local origin corresponding to the first CFOB; and subsequently, reconfiguring the field of view combiner to transmit a second plurality of the set of light reflections from a second CFOB of the plurality of CFOBs to the detector; and computing for each light reflection in the second plurality of the set of light reflections the corresponding 3D location using a second local origin corresponding to the second CFOB.

28. The method of claim 24 further comprising the steps of:

computing for each light reflection in a first subset of the set of light reflections, from a first CFOB of the plurality of CFOBs, the corresponding 3D location using a first local origin indicative of a location of the input surface of the first CFOB; and computing for each light reflection in a second subset of the set of light reflections, from a second CFOB of the plurality of CFOBs, the corresponding 3D location using a second local origin indicative of a location of the input surface of the second CFOB.

* * * * *